US011576059B2

(12) United States Patent
Kimura

(10) Patent No.: US 11,576,059 B2
(45) Date of Patent: Feb. 7, 2023

(54) COMMUNICATION DEVICE, COMMUNICATION METHOD, AND COMMUNICATION SYSTEM

(71) Applicant: Sony Corporation, Tokyo (JP)

(72) Inventor: Ryota Kimura, Tokyo (JP)

(73) Assignee: SONY CORPORATION, Toyko (JP)

(*) Notice: Subject to any disclaimer, the term of this patent is extended or adjusted under 35 U.S.C. 154(b) by 47 days.

(21) Appl. No.: 16/772,173

(22) PCT Filed: Dec. 5, 2018

(86) PCT No.: PCT/JP2018/044638
§ 371 (c)(1),
(2) Date: Jun. 12, 2020

(87) PCT Pub. No.: WO2019/124067
PCT Pub. Date: Jun. 27, 2019

(65) Prior Publication Data
US 2021/0076236 A1    Mar. 11, 2021

(30) Foreign Application Priority Data

Dec. 19, 2017 (JP) .............................. JP2017-242423

(51) Int. Cl.
*H04W 24/08* (2009.01)
*H04W 40/04* (2009.01)
*H04W 4/40* (2018.01)

(52) U.S. Cl.
CPC ............ *H04W 24/08* (2013.01); *H04W 4/40* (2018.02)

(58) Field of Classification Search
CPC .................... H04W 24/08; H04W 4/40–48
See application file for complete search history.

(56) References Cited

U.S. PATENT DOCUMENTS

2017/0280344 A1* 9/2017 Siomina ............. H04L 41/0803
2018/0294935 A1* 10/2018 Uchiyama ........... H04L 25/0202
(Continued)

FOREIGN PATENT DOCUMENTS

WO    2016/185986 A1    11/2016
WO    2017/171895 A1    10/2017

OTHER PUBLICATIONS

International Search Report and Written Opinion dated Feb. 5, 2019 for PCT/JP2018/044638 filed on Dec. 5, 2018, 10 pages including English Translation of the International Search Report.

(Continued)

*Primary Examiner* — Brian P Cox
(74) *Attorney, Agent, or Firm* — Xsensus LLP

(57) ABSTRACT

The present technology relates to a communication device, a communication method, and a communication system for enabling collection of a communication quality measurement value regarding a sidelink.

A communication device is provided, which includes a control unit configured to control measurement of communication quality of a sidelink between the communication device and another communication device on the basis of information with which communication quality of wireless communication between the communication device and the another communication device is measurable, thereby enabling collection of the communication quality measurement value regarding a sidelink. The present technology can be applied to, for example, a communication device built in or externally mounted to a vehicle.

18 Claims, 44 Drawing Sheets

(56) References Cited

U.S. PATENT DOCUMENTS

2019/0150032 A1\* 5/2019 Takeda .............. H04W 72/0453
                                                    370/329
2019/0190687 A1\* 6/2019 Yi ....................... H04L 27/2628

OTHER PUBLICATIONS

Intel Corporation, "FS_eV2X 802.11p-based RSU Measurements," 3GPP TSG-SA WG1 Meeting #75, S1-162354, revision of S1-162114, San Francisco, USA, Aug. 22-26, 2016, 1 page.

\* cited by examiner

FIG. 11

| FREQUENCY BAND TYPE | SYSTEM TYPE | LINK TYPE | | |
|---|---|---|---|---|
| | | UPLINK | DOWNLINK | SIDELINK |
| LICENSED FREQUENCY BANDS (Licensed bands) | 4G LTE | A | B | C |
| | 5G NR | D | E | F |
| UNLICENSED FREQUENCY BANDS (Unlicensed bands) | 4G LTE | G | H | I |
| | 5G NR | J | K | L |
| | Wi-Fi | M | N | O |
| | MulteFire | P | Q | R |
| | DSRC | S | T | U |

FIG. 16

| MEASUREMENT TIME | AREA ID (OR BASE STATION ID) | MEASUREMENT POSITION (OR BASE STATION POSITION) | MEASUREMENT FREQUENCY BAND | 4G LTE (CARRIER A) | 4G LTE (CARRIER B) | 4G LTE (CARRIER C) | 5G NR (CARRIER A) | 5G NR (CARRIER B) | 5G NR (CARRIER C) | Wi-Fi | DSRC | MulteFire |
|---|---|---|---|---|---|---|---|---|---|---|---|---|
| YYYYMMDD, HH:mm:ss | AREA A | (xA, yA, zA) | 2GHz | THROUGHPUT, DELAY | THROUGHPUT, DELAY | THROUGHPUT, DELAY | THROUGHPUT, DELAY | THROUGHPUT, DELAY | THROUGHPUT, DELAY | THROUGHPUT, DELAY | THROUGHPUT, DELAY | THROUGHPUT, DELAY |
| YYYYMMDD, HH:mm:ss | AREA A | (xA, yA, zA) | 3.5GHz | THROUGHPUT, DELAY | THROUGHPUT, DELAY | THROUGHPUT, DELAY | THROUGHPUT, DELAY | THROUGHPUT, DELAY | THROUGHPUT, DELAY | THROUGHPUT, DELAY | THROUGHPUT, DELAY | THROUGHPUT, DELAY |
| YYYYMMDD, HH:mm:ss | AREA A | (xA, yA, zA) | 60GHz | THROUGHPUT, DELAY | THROUGHPUT, DELAY | THROUGHPUT, DELAY | THROUGHPUT, DELAY | THROUGHPUT, DELAY | THROUGHPUT, DELAY | THROUGHPUT, DELAY | THROUGHPUT, DELAY | THROUGHPUT, DELAY |
| YYYYMMDD, HH:mm:ss | AREA B | (xB, yB, zB) | 2GHz | THROUGHPUT, DELAY | THROUGHPUT, DELAY | THROUGHPUT, DELAY | THROUGHPUT, DELAY | THROUGHPUT, DELAY | THROUGHPUT, DELAY | THROUGHPUT, DELAY | THROUGHPUT, DELAY | THROUGHPUT, DELAY |
| YYYYMMDD, HH:mm:ss | AREA B | (xB, yB, zB) | 3.5GHz | THROUGHPUT, DELAY | THROUGHPUT, DELAY | THROUGHPUT, DELAY | THROUGHPUT, DELAY | THROUGHPUT, DELAY | THROUGHPUT, DELAY | THROUGHPUT, DELAY | THROUGHPUT, DELAY | THROUGHPUT, DELAY |
| YYYYMMDD, HH:mm:ss | AREA B | (xB, yB, zB) | 60GHz | THROUGHPUT, DELAY | THROUGHPUT, DELAY | THROUGHPUT, DELAY | THROUGHPUT, DELAY | THROUGHPUT, DELAY | THROUGHPUT, DELAY | THROUGHPUT, DELAY | THROUGHPUT, DELAY | THROUGHPUT, DELAY |
| ...... | ...... | ...... | ...... | ...... | ...... | ...... | ...... | ...... | ...... | ...... | ...... | ...... |

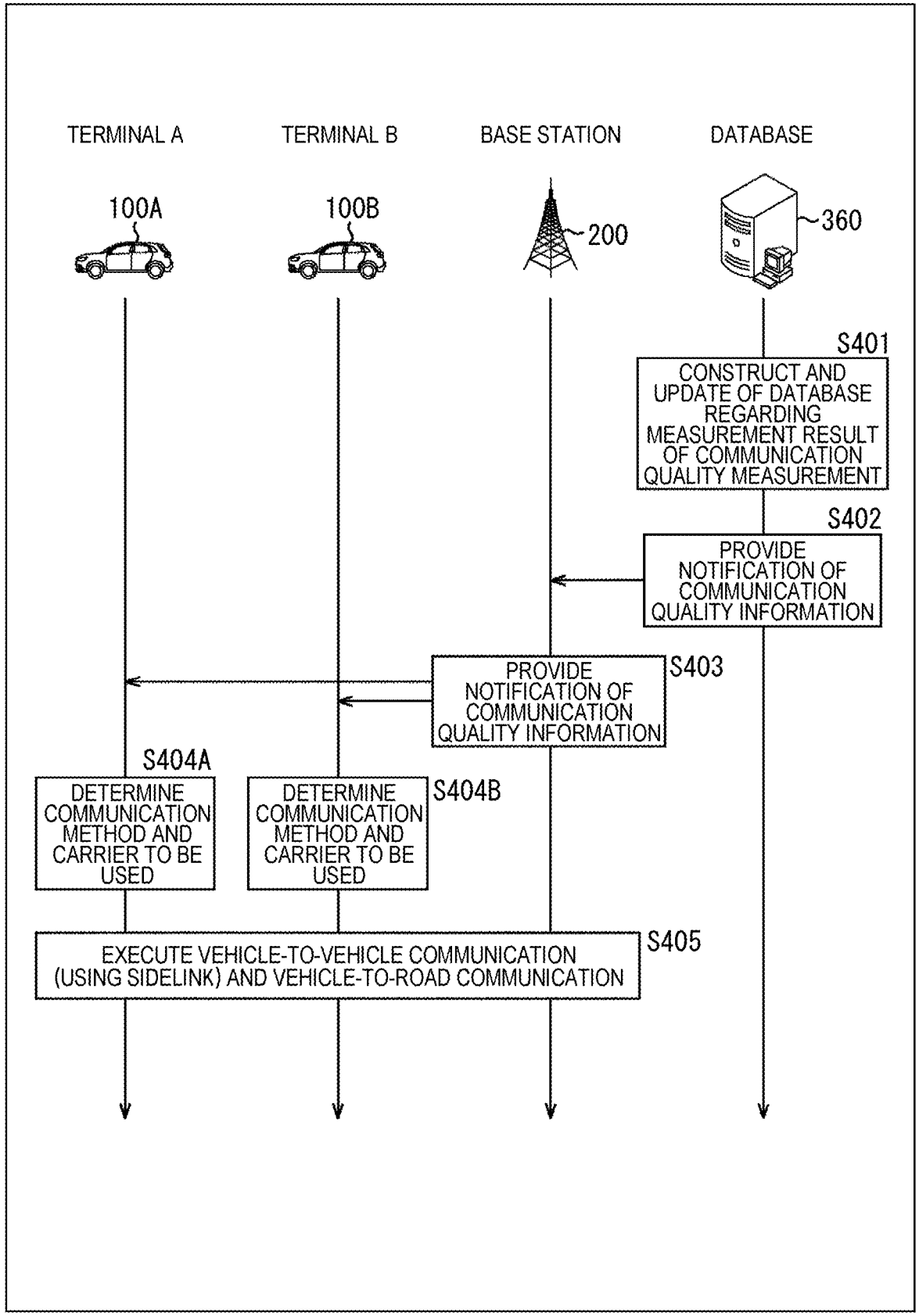

FIG. 23

| | SUBCARRIER INTERVAL | MAXIMUM BANDWIDTH OF COMPONENT CARRIER | CP LENGTH TYPE | NUMBER OF SYMBOLS PER SUBFRAME | SUBFRAME LENGTH | RADIO FRAME LENGTH | NUMBER OF SUBCARRIERS PER RESOURCE BLOCK IN NR CELL |
|---|---|---|---|---|---|---|---|
| PARAMETER SET 0 | 15kHz | 20MHz | TYPE 1 | 14 | 1ms | 10ms | 12 |
| PARAMETER SET 1 | 7.5kHz | 1.4MHz | TYPE 1 | 70 | 10ms | 10ms | 24 |
| PARAMETER SET 2 | 30kHz | 80MHz | TYPE 1 | 7 | 0.25ms | 10ms | 6 |
| PARAMETER SET 3 | 15kHz | 20MHz | TYPE 2 | 12 | 1ms | 10ms | 12 |
| ... | ... | ... | ... | ... | ... | ... | ... |

COMMUNICATION DEVICE, COMMUNICATION METHOD, AND COMMUNICATION SYSTEM

CROSS-REFERENCE TO RELATED APPLICATIONS

The present application is based on PCT filing PCT/JP2018/044638, filed Dec. 5, 2018, which claims priority to JP 2017-242423, filed Dec. 19, 2017, the entire contents of each are incorporated herein by reference.

TECHNICAL FIELD

The present technology relates to a communication device, a communication method, and a communication system, and more particularly to a communication device, a communication method, and a communication system for enabling collection of a communication quality measurement value regarding a sidelink.

BACKGROUND ART

In a case of a communication system that provides a communication area (coverage) in a planar manner with, in particular, a plurality of base station devices, such as a cellular system or a mobile phone system, the quality of provided communication may vary depending on location and weather.

It is favorable for a user side who uses the communication system to predict in advance the difference in communication quality depending on the location and weather. Meanwhile, it is required for an operator side who provides the communication system to find out a place with poor communication quality and make use of it for measures for improving the communication quality in that place, for example.

For example, Patent Document 1 discloses a technology of arranging a measurement device for measuring the communication quality in a communication system and recording a bit error rate (BER) characteristic of a communication link between a base station device in a measurement place and the measurement device while moving the measurement device, further recording weather/meteorological conditions at measurement time and the measurement place, and constructing a database.

By constructing such a database, prediction information as to how much communication quality is obtainable from the place and the meteorological conditions can be provided to the user (and a terminal device of the user).

Furthermore, it is also conceivable to collect such communication quality measurement values via a user terminal device (for example, a mobile phone, a smartphone, or the like) instead of the dedicated measurement device as described above.

This is standardized in, for example, third generation partnership project (3GPP) that is a standardization project for mobile communication systems, as minimization of drive tests (MDT) (for example, see Non-Patent Document 1). By using a mechanism such as the MDT, the operator of the communication system can collect the communication quality measurement value from normal use of the user without preparing the measurement device on its own.

CITATION LIST

Patent Document

Patent Document 1: Japanese Patent Application Laid-Open No. 7-66764

Non-Patent Document

Non-Patent Document 1: J. Johansson, W. A. Hapsari, S. Kelley and G. Bodog, "Minimization of Drive Tests in 3GPP Release 11," IEEE Communications Magazine, November 2012.

SUMMARY OF THE INVENTION

Problems to be Solved by the Invention

In recent communication systems, not only a communication link between a base station device and a terminal device (uplink (UL) or downlink (DL)) but also a communication link between terminal devices (sidelink (SL)) has been newly added, and its necessity is increasing.

This sidelink is a link for implementing, for example, vehicle-to-vehicle communication (V2V), vehicle-to-road communication (vehicle-to-infrastructure (V2I), vehicle-to-network (V2N), or the like), vehicle-to-pedestrian communication (V2P or the like), or communication involving vehicle (vehicle-to-anything (V2X) or the like), and thus collection of communication quality measurement values regarding the sidelink is required.

The present technology has been made in view of such a situation, and enables collection of a communication quality measurement value regarding a sidelink.

Solutions to Problems

A communication device according to one aspect of the present technology is a communication device including a control unit configured to control measurement of communication quality of a sidelink between the communication device and another communication device on the basis of information with which communication quality of wireless communication between the communication device and the another communication device is measurable.

In the communication device according to one aspect of the present technology, measurement of communication quality of a sidelink between the communication device and another communication device is controlled on the basis of information with which communication quality of wireless communication between the communication device and the another communication device is measurable.

A communication method according to one aspect of the present technology is a communication method including measuring communication quality of a sidelink between a first communication device and a second communication device on the basis of information with which communication quality of wireless communication between the first communication device and the second communication device is measurable, and collecting a measurement result of the measured communication quality of the sidelink.

In the communication method according to one aspect of the present technology, communication quality of a sidelink between a first communication device and a second communication device is measured on the basis of information with which communication quality of wireless communication between the first communication device and the second communication device is measurable, and a measurement result of the measured communication quality of the sidelink is collected.

A communication system according to one aspect of the present technology is a communication system including a first communication device, a second communication device configured to measure communication quality of a sidelink between the first communication device and the second communication device on the basis of information with which communication quality of wireless communication between the first communication device and the second communication device is measurable, and a server device configured to collect a measurement result of the measured communication quality of the sidelink.

In the communication system according to one aspect of the present technology, communication quality of a sidelink between a first communication device and a second communication device is measured by the second communication device on the basis of information with which communication quality of wireless communication between the first communication device and the second communication device is measurable, and a measurement result of the measured communication quality of the sidelink is collected by a server device.

Note that the communication device according to one aspect of the present technology may be an independent device or may be internal blocks constituting one device.

Effects of the Invention

According to one aspect of the present technology, a communication quality measurement value regarding a sidelink can be collected.

Note that effects described here are not necessarily limited, and any of effects described in the present disclosure may be exhibited.

BRIEF DESCRIPTION OF DRAWINGS

FIG. 11 is a diagram illustrating an example of combination of communication quality measurement targets.

FIG. 16 is a diagram illustrating a configuration example of a database based on a measurement result of communication quality measurement and the like.

FIG. 17 is a diagram illustrating an example of a procedure for providing communication quality information.

FIG. 23 is a diagram illustrating an example of a parameter set regarding a transmission signal in an NR cell according to the embodiment of the present technology.

MODE FOR CARRYING OUT THE INVENTION

Hereinafter, embodiments of the present technology will be described with reference to the drawings. Note that the description will be given in the following order.

1. Embodiment of Present Technology
(1) System Configuration
(2) Communication Quality Measurement and Collection Procedures 2. Configuration of Wireless Communication System
3. Configuration of Computer
<1. Embodiment of Present Technology>
(1) System Configuration First, an example of a configuration of a communication system to which the present technology is applied will be described with reference to FIGS. 1 to 8.

(Configuration Example of Communication System)

Figure 1:
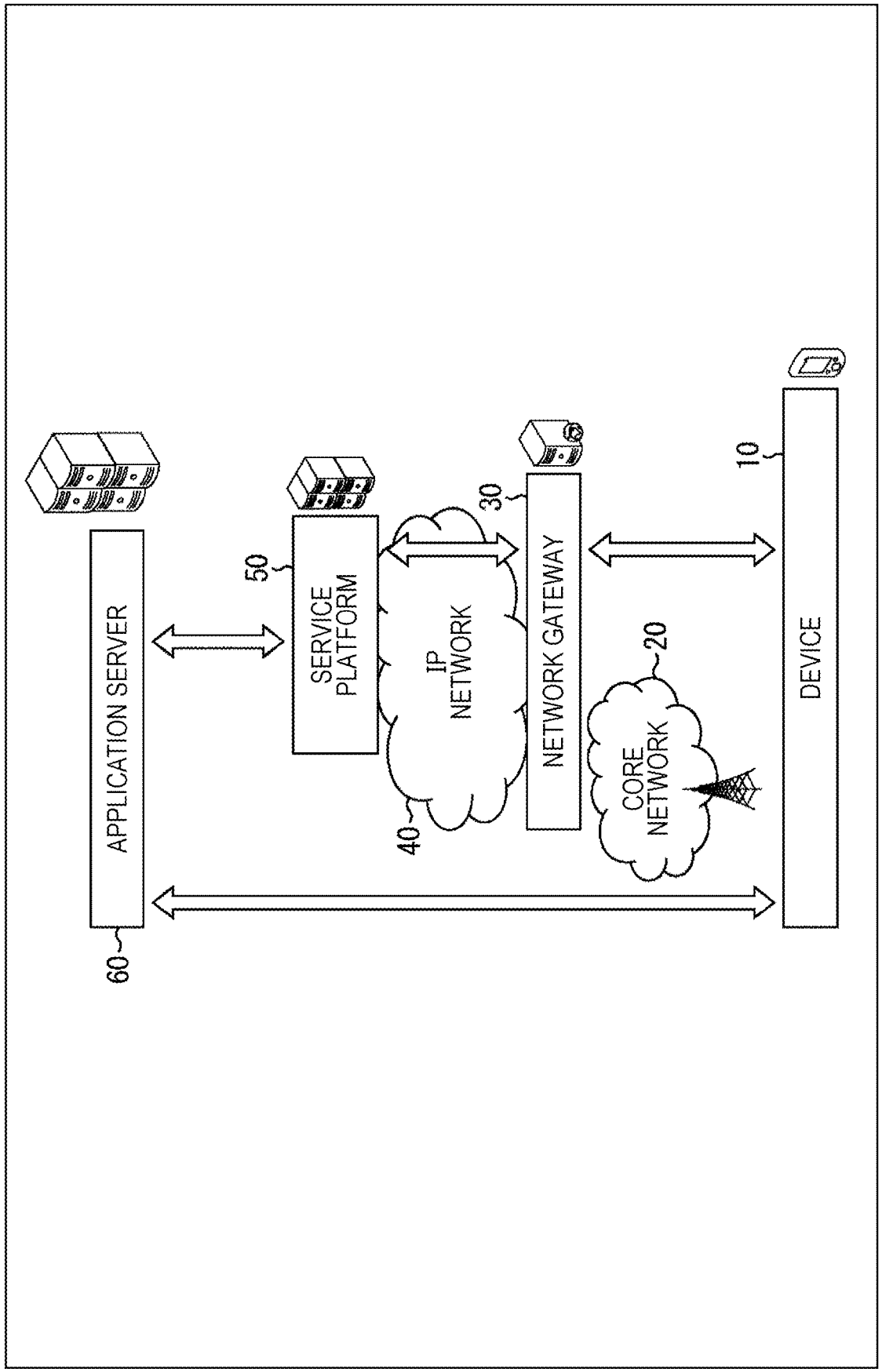
FIG. 1 is a diagram illustrating a configuration example of an embodiment of a communication system to which the present technology is applied.

FIG. 1 is a diagram illustrating a configuration example of an embodiment of a communication system to which the present technology is applied.

In FIG. 1, a device layer 10 is a layer of a communication device that performs wireless communication. The device layer 10 includes not only a terminal device (communication device) having a function as a communication terminal but also a communication device having a wireless communication function such as a base station device.

Furthermore, the terminal device and the base station device may be further divided into different layers. In that case, it is desirable that the base station device is close to a core network 20. In 3GPP, the terminal device is sometimes called user equipment (UE) and the base station device is sometimes called evolved node B (eNB). Furthermore, the base station device includes not only the eNB but also a node B (NB), an access point, and the like.

In this example, a case is assumed in which the terminal device belonging to the device layer 10 uses a service provided by an application server 60 via a network. A logical session can be considered as an exchange between the terminal device and the application server 60.

Meanwhile, considering connection of network layers, a network configuration can be further considered in addition to the logical session. As an example, in a case where the communication device of the device layer 10 constitutes a cellular system, one or more base station devices are connected to cellular system control/user network called core network 20. Then, the communication device is connected to a public internet protocol (IP) network 40 via a network gateway 30 in the core network 20.

Furthermore, the application server 60 can be considered as one element constituting a service platform 50 together with a plurality of other servers, such as a cloud system, for example. In such a case, a communication device corresponding to a gateway may be provided on the service platform 50 side to have a function of being connected to the IP network 40.

Insides of the core network 20, the IP network 40, and the service platform 50 can be further configured by physical communication devices. Here, for example, a virtualization device for virtualizing a network such as a router, a switch, and a router switch, a network virtualization control device, a cable, and the like are assumed.

Figure 2:
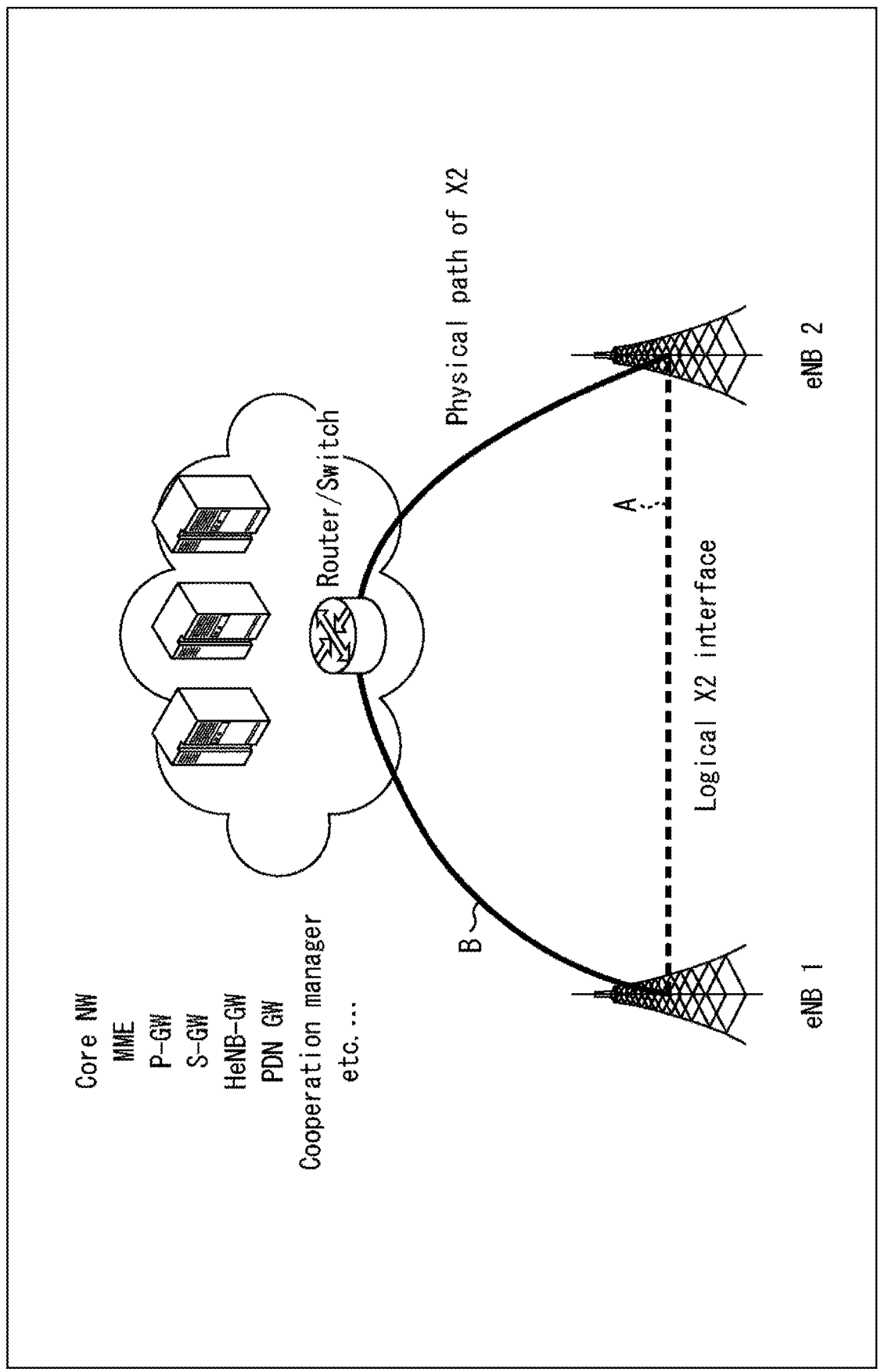
FIG. 2 is a diagram illustrating an example of a difference between a logical entity and a physical network.

Here, FIG. 2 illustrates a difference between a logical entity and a physical network. In FIG. 2, an interface called X2 interface is present between base station devices (eNB1 and eNB2) but this interface is a logical interface. Attention is required in that the base station devices are not necessarily physically directly connected in practice (the dotted line A in FIG. 2). In practice, it is conceivable that the base station devices (eNB1 and eNB2) are physically connected via a plurality of entities (the solid line B in FIG. 2).

A radio access technology (RAT) in the embodiment of the present technology is a technology for implementing, in particular, wireless connection between communication devices belonging to the device layer 10 in FIG. 1.

(Another Configuration Example of Communication System)

Figure 3:
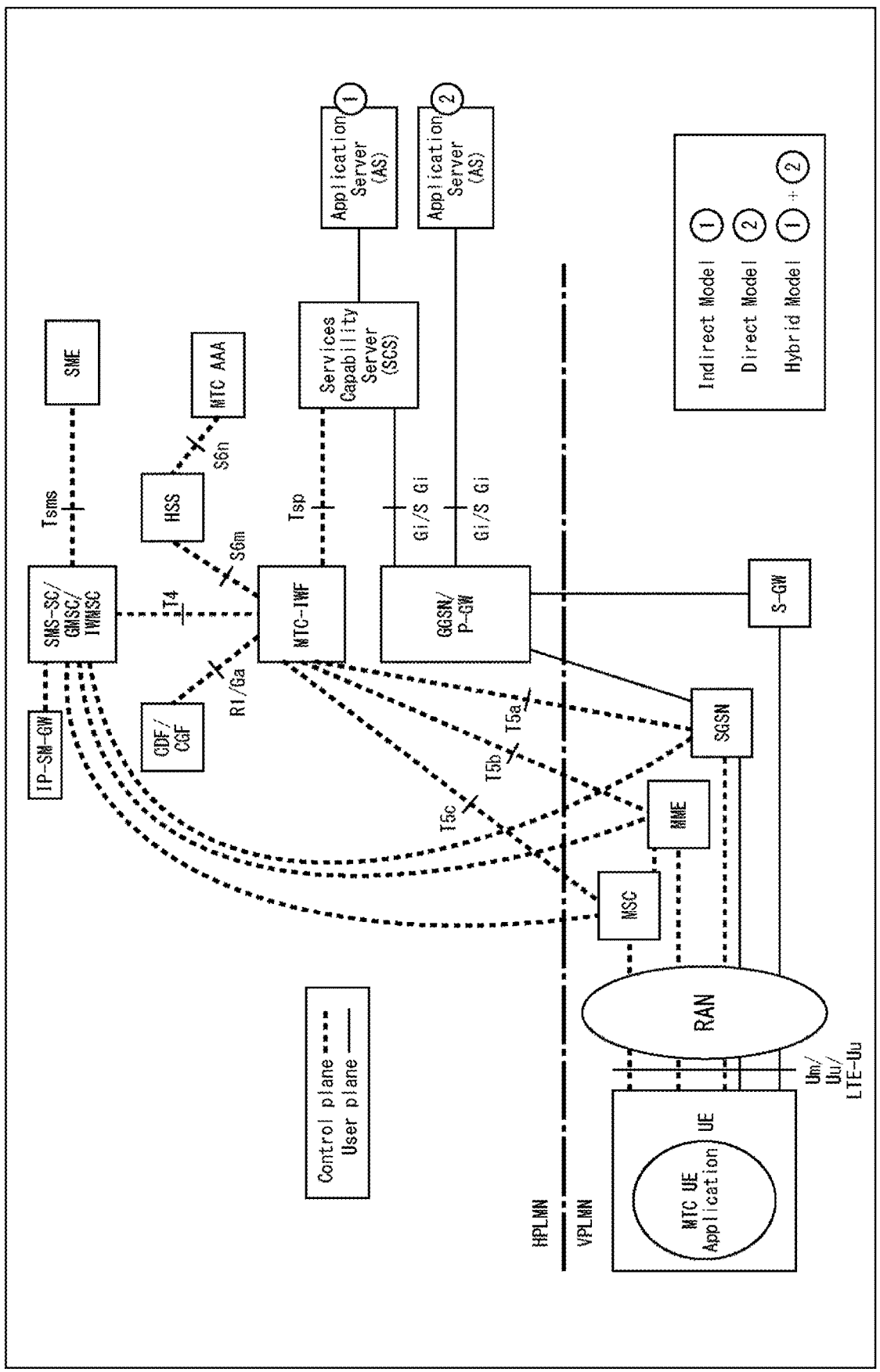
FIG. 3 is a diagram illustrating another configuration example of the embodiment of the communication system to which the present technology is applied.

FIG. 3 is a diagram illustrating another configuration example of the embodiment of the communication system to which the present technology is applied.

This communication system illustrates a network configuration in machine type communications (MTC). Note that FIG. 3 illustrates entities and communication paths among the entities in the communication system, and thus illustrates logical entities and logical paths.

The radio access technology (RAT) in the embodiment of the present technology corresponds to an access method used in a radio access network (RAN)) in FIG. 3. User equipment (UE) corresponds to a terminal device and it is assumed that an MTC application is running on the UE.

Although not explicitly illustrated in FIG. 3, it is assumed that a base station device is present in the RAN and has a connection with the UE.

Furthermore, FIG. 3 illustrates "home public land mobile network (HPLMN)" and "visited public land mobile network (VPLMN)", which are configurations in a case of roaming different carriers.

The HPLMN is the network on the carrier side to which a target communication device (for example, a UE) originally belongs whereas the VPLMN corresponds to a network to roam of the communication device. Although not explicitly illustrated in FIG. 3, a public IP network may relay the HPLMN and the VPLMN. During roaming, in particular, data in a control plane is relayed from the VPLMN to an entity in the HPLMN, as illustrated in FIG. 3.

This is because control information of the target UE needs to be managed on the home carrier side. Meanwhile, user plane data is relayed from a gateway on the VPLMN side to a gateway on the HPLMN side and is then relayed and transferred to an application server. Note that, here, the user plane data can be transferred via the public IP network or an entity of the service platform. If it is a normal time when roaming does not occur, there is no boundary between the HPLMN and the VPLMN.

In a case of providing a service by the application server (AS), a services capability server (SCS) may be further provided to enable appropriate selection of an available service. As an example, in providing a certain service, in a case where monitoring and sensing are required in the target UE in advance, the SCS requests the UE to have a trigger for the monitoring and sensing, thereby smoothly starting provision of the service.

Note that the SCS does not need to be provided for all application servers (ASs). For example, as illustrated in FIG. 3, a hybrid configuration can be adopted according to a provided service, such as a configuration with the SCS or a configuration without the SCS, as illustrated in FIG. 3.

(Another Configuration Example of Communication System)

Figure 4:
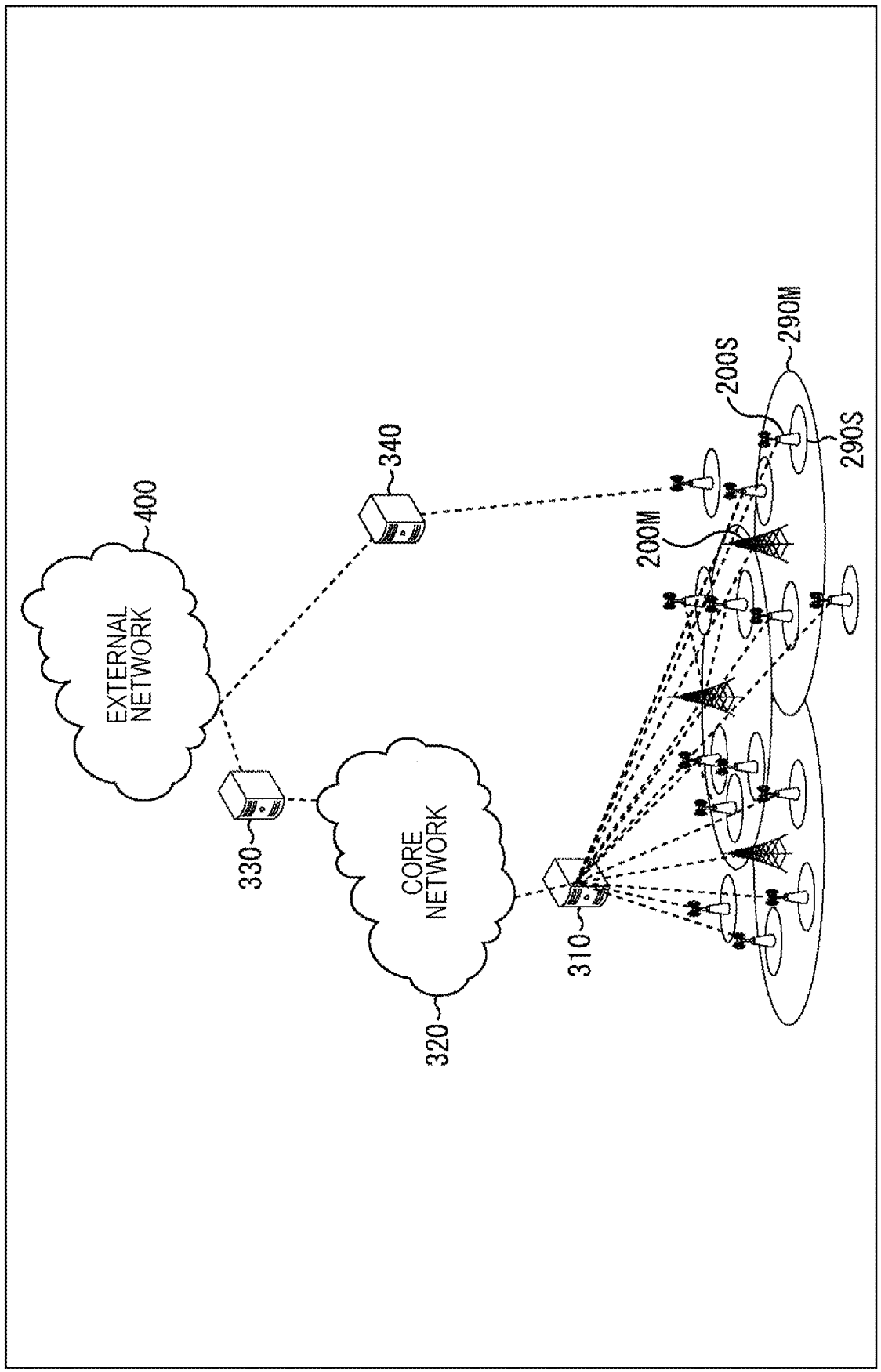
FIG. 4 is a diagram illustrating still another configuration example of the embodiment of the communication system to which the present technology is applied.

FIG. 4 is a diagram illustrating still another configuration example of the embodiment of the communication system to which the present technology is applied.

This communication system illustrates a heterogeneous network (HetNet) or a network configuration of small cell enhancement (SCE) including small cells. Note that, In FIG. 4, lines illustrated by the broken lines indicate logical connections and are not necessarily physically connected.

A communication area includes cell areas 290M and 290S where a plurality of base station devices 200M and 200S respectively provide services. Here, the macro-cell base station device 200M provides the macro-cell cell area 290M, and the small-cell base station device 200S provides the small-cell cell area 290S. Note that one base station device 200M or 200S may provide a plurality of cell areas.

The base station devices 200M and 200S can communicate with each other via a backhaul regardless of wired or wireless means and mainly exchange the control information. As the backhaul, for example, exchange of information using a protocol of the X2 interface or an S1 interface may be adopted. As a backhaul topology, any topology of a mesh type, a star type, a ring type, or the like may be adopted.

Furthermore, the base station devices 200M and 200S have a backhaul with a system core network 320. At that time, the base station devices 200M and 200S may have a connection with the core network 320 by being connected with a control entity 310. That is, the control entity 310 may be regarded as one of elements of the core network 320.

Moreover, the base station devices 200M and 200S may be connected with the core network 320 via an external network 400 instead of via the control entity 310. A femtocell base station device that can be laid indoors or at home or a home enode (HeNB) device corresponds to such an example. In this case, a gateway device 330 is provided for the external network 400, and a gateway device 340 is provided for the HeNB device.

The small-cell cell area 290S is basically arranged to overlap with the macro-cell cell area 290M. Note that, as another layout, the small-cell cell area 290S may be partially identically arranged with or completely outside the macro-cell cell area 290M A radio resource to use may have characteristics of the macro cell and the small cell. For example, the macro cell and the small cell may use the same frequency resource F1 (or time resource T1). With the configuration, the radio resource use efficiency of the entire system can be improved.

Meanwhile, the macro cell may use the frequency resource F1 (or the time resource T1) and the small cell may use a frequency F2 (or a time resource T2). With the configuration, the interference between the macro cell and the small cell can be avoided.

Moreover, the both types of cells may use both the frequency resources F1 and F2 (or time resources T1 and T2). This is a concept equivalent to carrier aggregation (CA), especially when applied to the frequency resources.

(Configuration Example of Terminal Device)

Next, configuration examples of a terminal device (communication device) to which the present technology is applied will be described with reference to FIGS. 5 and 6. The terminal device to which the present technology is applied may be a vehicle having a communication function, in addition to devices such as a mobile phone, a smartphone, and a tablet computer used by an end user.

The vehicle having a communication function can be implemented by, for example, incorporating or externally attaching (the communication function of) the terminal device to which the present technology is applied into or to a vehicle such as an automobile, an electric vehicle, or a hybrid electric vehicle.

Figure 5:
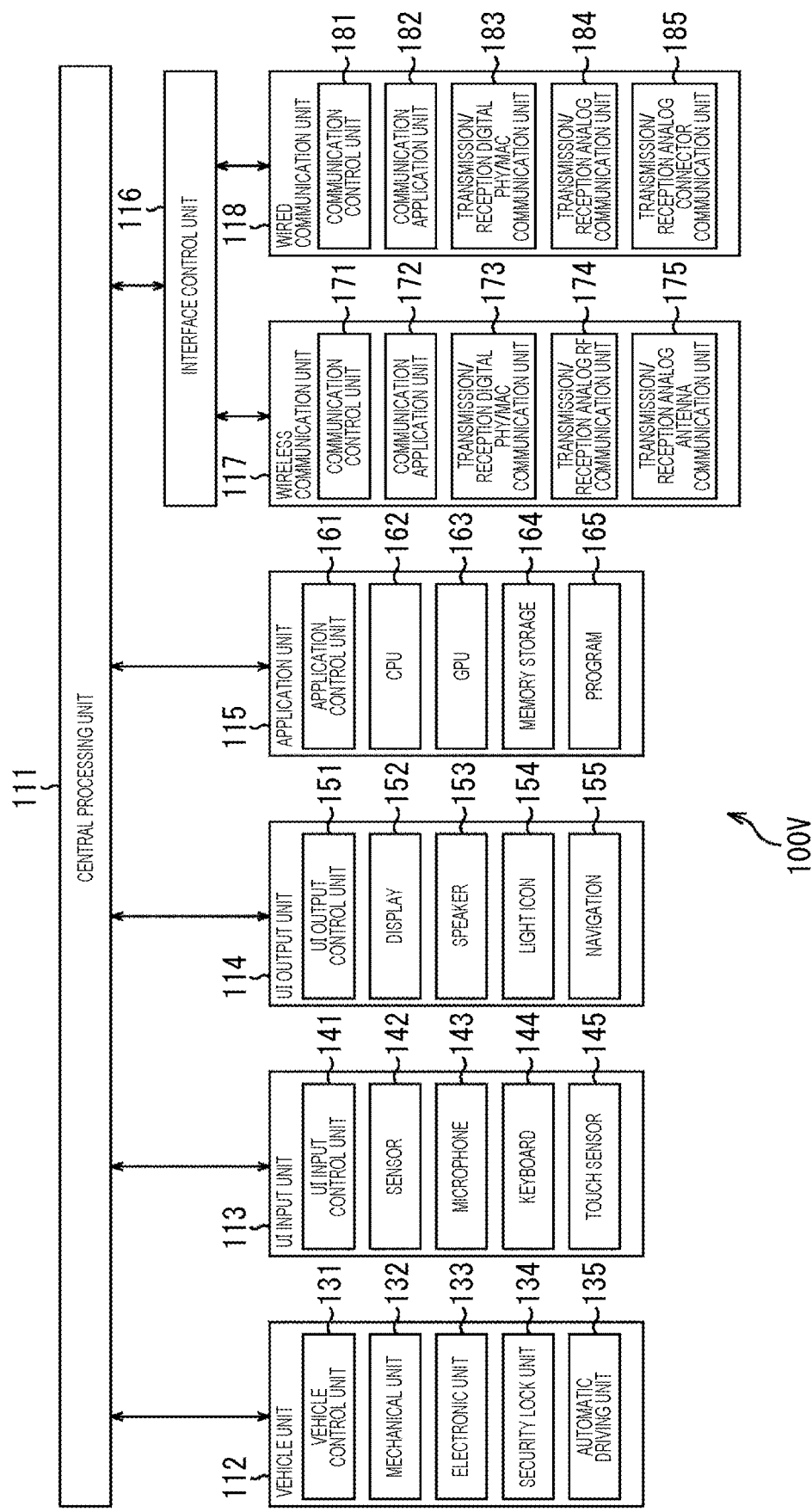
FIG. 5 is a diagram illustrating a first configuration example of a terminal device to which the present technology is applied.

FIG. 5 illustrates a configuration example of a terminal device 100V configured as a vehicle (vehicle device) having a communication function as a first example of the terminal device to which the present technology is applied. The terminal device 100V incorporates (the communication function of) the terminal device to which the present technology is applied.

In FIG. 5, the terminal device 100V includes a central control unit 111, a vehicle unit 112, a UI input unit 113, a UI output unit 114, an application unit 115, an interface control unit 116, a wireless communication unit 117, and a wired communication unit 118.

The central control unit 111 includes, for example, a central processing unit (CPU) and the like, and controls operation of each unit of the terminal device 100V.

The vehicle unit 112 is, for example, a vehicle such as an automobile, an electric vehicle, or a hybrid electric vehicle. The vehicle unit 112 includes a vehicle control unit 131, a mechanical unit 132, an electronic unit 133, a security lock unit 134, and an automatic driving unit 135.

The vehicle control unit 131 controls the operation of each unit of the vehicle unit 112. The mechanical unit 132 includes, for example, a drive system such as a drive force generation device for generating drive force of the vehicle, such as an internal combustion engine or a drive motor, a drive force transmission mechanism for transmitting drive force to wheels, and a steering mechanism that adjusts a steering angle of the vehicle, and the like. The electronic unit 133 includes, for example, an electronic control unit that electronically controls an engine, a transmission, and the like.

The security lock unit 134 controls security, lock, and the like of a door lock of the vehicle and the like. The automatic driving unit 135 performs control for the purpose of automatic driving in which the vehicle autonomously travels without depending on the operation of a driver. Note that the vehicle unit 112 is not limited to have the above-described configuration and may include other functions regarding the vehicle.

The UI input unit 113 provides various input interface functions. The UI input unit 113 includes a UI input control unit 141, a sensor 142, a microphone 143, a keyboard 144, and a touch sensor 145.

The UI input control unit 141 controls the operation of each unit of the UI input unit 113. The sensor 142 includes sensor devices such as various sensors, and performs sensing of inside or outside of the vehicle. The microphone 143 collects sounds (audio) inside and outside the vehicle. The keyboard 144 outputs an operation signal according to a key operation. The touch sensor 145 outputs an operation signal corresponding to a touch operation for a display on a screen of a display.

Here, the sensor 142 can include, for example, an image sensor, an acceleration sensor, a three-axis sensor, a temperature sensor, a humidity sensor, an ambient light sensor, and the like. Furthermore, the sensor 142 may include, for example, a sensor (module) for detecting position information such as a global positioning system (GPS) signal. Note that the UI input unit 113 is not limited to the above-described input interface and may include another input interface.

The UI output unit 114 provides various output interface functions. The UI output unit 114 includes a UI output control unit 151, a display 152, a speaker 153, a light icon 154, and a navigation 155.

The UI output control unit 151 controls the operation of each unit of the UI output unit 114. The display 152 includes, for example, a liquid crystal display, an organic EL display, or the like, and displays various types of information such as images and letters. The speaker 153 outputs sounds such as music and sound effects in addition to audio. The light icon 154 includes, for example, a lighting device and the like, and emits light. The navigation 155 provides route guidance to a current position and a destination when the vehicle travels.

Note that the UI output unit 114 is not limited to the above-described output interface and may include another output interface.

The application unit 115 provides various application functions. The application unit 115 includes an application control unit 161, a central processing unit (CPU) 162, a graphics processing unit (GPU) 163, a memory storage 164, and a program 165.

The application control unit 161 controls operations of various applications. The CPU 162 and the GPU 163 are both processors and execute processing according to the program 165. The CPU 162 executes various types of processing regarding applications whereas the GPU 163 executes processing specialized for image processing. The memory storage 164 includes, for example, a storage device such as a semiconductor memory and a hard disk drive (HDD), and temporarily or permanently records various data.

Note that the application unit 115 is not limited to have the above-described configuration and may include other functions regarding the applications.

The interface control unit 116 is an interface between the central control unit 111 and the wireless communication unit 117 or the wired communication unit 118.

The wireless communication unit 117 provides a wireless communication function such as a cellular function, a wireless local area network (LAN) and Bluetooth (registered trademark), for example. The wireless communication unit 117 includes a communication control unit 171, a communication application unit 172, a transmission/reception digital PHY/MAC communication unit 173, a transmission/reception analog RF communication unit 174, and a transmission/reception analog antenna communication unit 175.

The communication control unit 171 controls the operation of each unit of the wireless communication unit 117. The communication application unit 172 performs processing of a communication application of an upper layer. The transmission/reception digital PHY/MAC communication unit 173 performs processing for a physical (PHY) layer and a media access control (MAC) layer. The transmission/reception analog RF communication unit 174 processes a radio frequency (RF) signal. The transmission/reception analog antenna communication unit 175 is a transmission/reception antenna.

Note that the wireless communication unit 117 is not limited to have the above-described configuration and may have another function (for example, a module or the like) regarding wireless communication. Furthermore, a detailed configuration of the wireless communication unit 117 will be described below with reference to FIG. 7.

The wired communication unit 118 provides wired communication functions of universal serial bus (USB), a wired LAN, Thunderbolt, high definition multimedia interface (HDMI (registered trademark)), and the like for example. The wired communication unit 118 includes a communication control unit 181, a communication application unit 182, a transmission/reception digital PHY/MAC communication unit 183, a transmission/reception analog communication unit 184, and a transmission/reception analog connector communication unit 185.

The communication control unit 181 controls the operation of each unit of the wired communication unit 118. The communication application unit 182 performs processing of a communication application of an upper layer. The transmission/reception digital PHY/MAC communication unit 183 performs processing for a PHY layer and an MAC layer. The transmission/reception analog communication unit 184 performs analog signal processing. The transmission/reception analog connector communication unit 185 is a transmission/reception connector.

Note that the wired communication unit 118 is not limited to have the above-described configuration and may include another function (for example, a module or the like) regarding wired communication.

The terminal device 100V is configured as described above.

Figure 6:
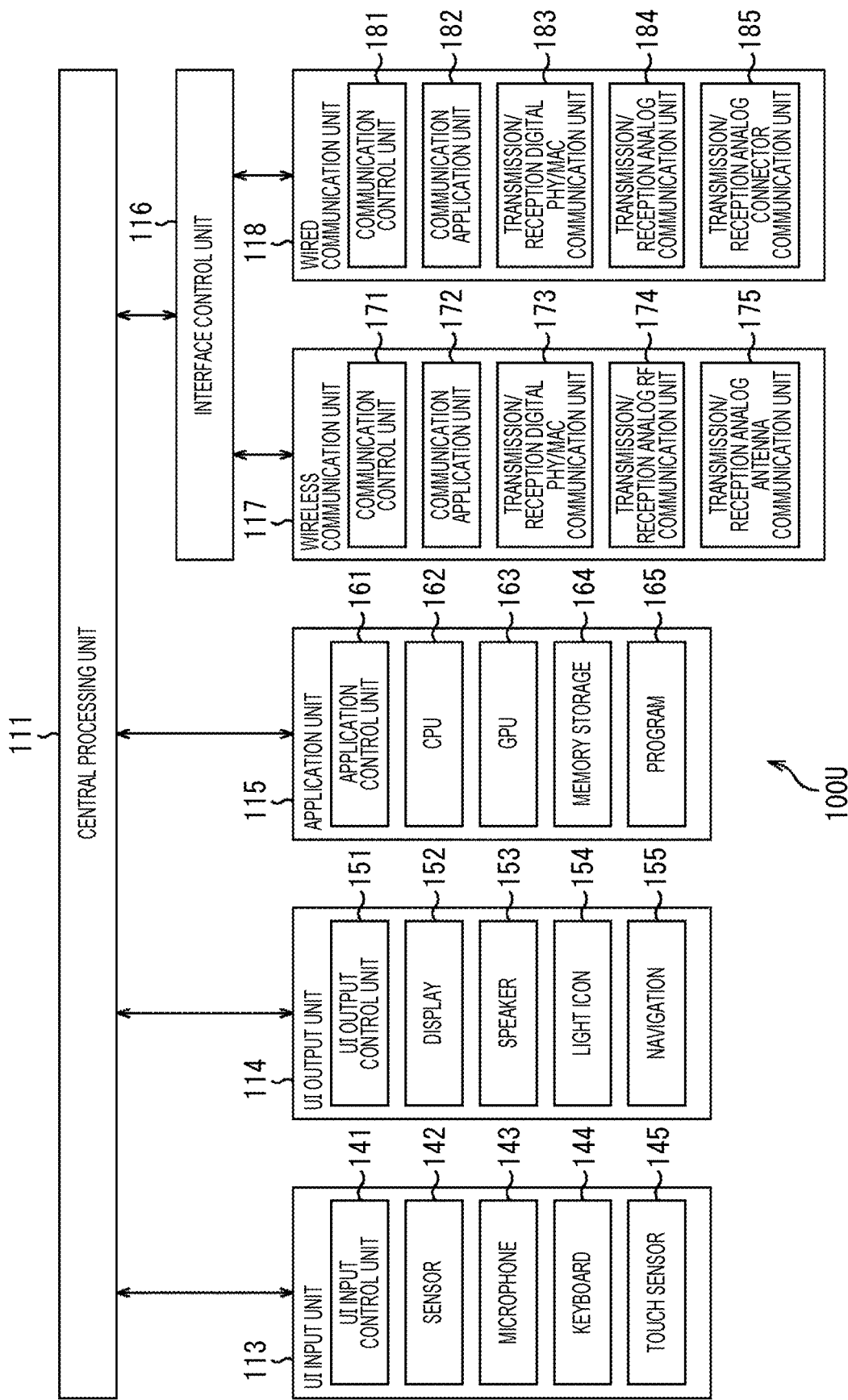
FIG. 6 is a diagram illustrating a second configuration example of the terminal device to which the present technology is applied.

FIG. 6 illustrates a configuration example of a terminal device 100U configured as an external device externally mountable to a vehicle as a second example of the terminal device to which the present technology is applied. The terminal device 100U is configured as, for example, a device such as a mobile phone, a smartphone, or a tablet computer.

In FIG. 6, the terminal device 100U has a different configuration from the configuration of the terminal device 100V illustrated in FIG. 5, in removing the vehicle unit 112 and performing communication with a vehicle to which the terminal device 100U is mounted (such as an automobile, for example) via the wireless communication unit 117 or the wired communication unit 118.

Furthermore, in FIG. 6, the terminal device 100U includes a central control unit 111, a UI input unit 113, a UI output unit 114, an application unit 115, an interface control unit 116, a wireless communication unit 117, and a wired communication unit 118, and the same reference numerals are given to units corresponding to the terminal device 100V in FIG. 5 and description thereof is omitted.

The terminal device 100U is configured as described above.

Note that, in the following description, the terminal device 100V and the terminal device 100U will be simply described as terminal device(s) 100 unless discrimination is particularly required.

(Configuration Example of Wireless Communication Unit)

Figure 7:
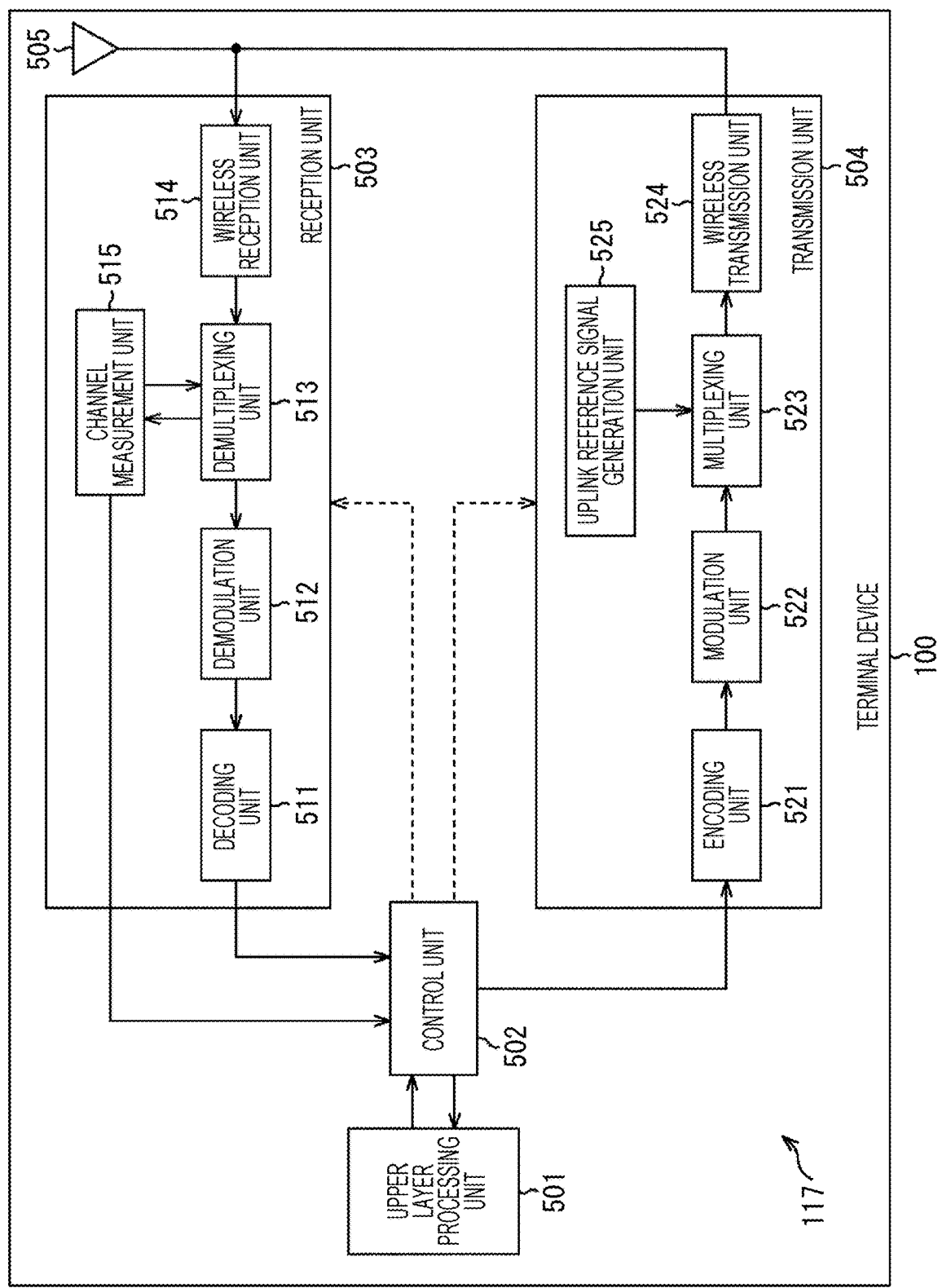
FIG. 7 is a diagram illustrating a configuration example of a wireless communication unit of the terminal device to which the present technology is applied.

FIG. 7 is a diagram illustrating a configuration example of the wireless communication unit 117 of the terminal device 100 in FIG. 5 or 6.

In FIG. 7, the wireless communication unit 117 of the terminal device 100 includes an upper layer processing unit 501, a control unit 502, a reception unit 503, a transmission unit 504, and a transmission/reception antenna 505. Note that the functions of the upper layer processing unit 501 to the transmission/reception antenna 505 correspond to the functions provided by the communication control unit 171 to the transmission/reception analog antenna communication unit 175 in FIG. 5 or 6.

The reception unit 503 includes a decoding unit 511, a demodulation unit 512, a demultiplexing unit 513, a wireless reception unit 514, and a channel measurement unit 515. Furthermore, the transmission unit 504 includes an encoding unit 521, a modulation unit 522, a multiplexing unit 523, a wireless transmission unit 524, and an uplink reference signal generation unit 525.

The terminal device 100 can support one or more radio access technologies (RATs). Some or all of the units included in the terminal device 100 can be individually configured according to a radio access technology (RAT). For example, the reception unit 503 and the transmission unit 504 are individually configured according to long term evolution (LTE) and new radio (NR).

Furthermore, in an NR cell, some or all of the units included in the terminal device 100 can be individually configured according to a parameter set regarding a transmission signal. For example, in a certain NR cell, the wireless reception unit 514 and the wireless transmission unit 524 can be individually configured according to a parameter set regarding a transmission signal.

The upper layer processing unit 501 outputs uplink data (transport block) to the control unit 502. The upper layer processing unit 501 performs processing for a medium access control (MAC) layer, a packet data convergence protocol (PDCP) layer, a radio link control (RLC) layer, and a radio resource control (RRC) layer.

Furthermore, the upper layer processing unit 501 generates control information for controlling the reception unit 503 and the transmission unit 504 and outputs the control information to the control unit 502.

The control unit 502 controls the reception unit 503 and the transmission unit 504 on the basis of the control information from the upper layer processing unit 501. The control unit 502 generates control information for the upper layer processing unit 501 and outputs the control information to the upper layer processing unit 501.

The control unit 502 receives a decoded signal from the decoding unit 511 and a channel estimation result from the channel measurement unit 515. Furthermore, the control unit 502 outputs a signal to be encoded to the encoding unit 521. Note that the control unit 502 may be used for controlling the whole or part of the terminal device 100.

The upper layer processing unit 501 performs at least one piece of processing and management regarding RAT control, radio resource control, subframe setting, scheduling control, and channel state information (CSI) report control. The processing and management in the upper layer processing unit 501 are performed on the basis of predetermined setting or setting based on control information set or given in notification from the base station device 200.

For example, the control information from the base station device 200 includes an RRC parameter, a MAC control element, or DCI. Furthermore, the processing and management in the upper layer processing unit 501 may be individually performed according to the RAT. For example, the upper layer processing unit 501 individually performs the processing and management in the LTE and the processing and management in the NR.

In the RAT control in the upper layer processing unit 501, management regarding the RAT is performed. For example, in the RAT control, at least one of the management regarding the LTE or the management regarding the NR. The management regarding the NR includes setting and processing of the parameter set regarding a transmission signal in an NR cell.

In the radio resource control in the upper layer processing unit 501, management of setting information in the terminal device 100 is performed. In the radio resource control in the upper layer processing unit 501, generation and management of uplink data (transport block), system information, RRC message (RRC parameter), or MAC control element (CE) are performed.

In the subframe setting in the upper layer processing unit 501, subframe setting in the base station device 200 or in another base station device different from the base station device 200 is managed. The subframe setting includes uplink or downlink setting for a subframe, subframe pattern setting, uplink-downlink setting, uplink reference UL-DL setting, or downlink reference UL-DL setting. Note that the subframe setting in the upper layer processing unit 501 is also called terminal subframe setting.

In the scheduling control in the upper layer processing unit 501, control information for controlling scheduling for the reception unit 503 and the transmission unit 504 is generated on the basis of the DCI (scheduling information) from the base station device 200.

In the CSI report control in the upper layer processing unit 501, control regarding a CSI report to the base station device 200 is performed. For example, in the CSI report control, setting regarding a CSI reference resource assumed for calculating CSI in the channel measurement unit 515 is controlled. In the CSI report control, a resource (timing) to be used for reporting CSI is controlled on the basis of the DCI or the RRC parameter.

The reception unit 503 receives a signal transmitted from the base station device 200 via the transmission/reception antenna 505 under the control of the control unit 502, performs reception processing such as demultiplexing, demodulation, and decoding, and outputs processed information to the control unit 502. Note that the reception processing in the reception unit 503 is performed on the basis of predetermined setting or notification or setting from the base station device 200.

The wireless reception unit 514 performs, for the uplink signal received via the transmission/reception antenna 505, conversion into an intermediate frequency (down conversion), removal of an unnecessary frequency component, control of an amplification level to properly maintain a signal level, quadrature demodulation based on in-phase and quadrature components of the received signal, conversion from an analog signal to a digital signal, removal of guard interval (GI), and extraction of a signal in a frequency domain by fast Fourier transform (FFT).

The demultiplexing unit 513 demultiplexes a downlink channel such as a physical hybrid automatic repeat request indicator channel (PHICH), a physical downlink control channel (PDCCH), an enhanced PDCCH (EPDCCH), or a physical downlink shared channel (PDSCH), a downlink synchronization signal, or a downlink reference signal from the signal input from the wireless reception unit 514. The demultiplexing unit 513 outputs the downlink reference signal to the channel measurement unit 515. The demultiplexing unit 513 compensates a propagation path for a downlink channel from an estimation value of the propagation path input from the channel measurement unit 515.

The demodulation unit 512 demodulates the reception signal, using a modulation method such as binary phase shift keying (BPSK), quadrature phase shift keying (QPSK), quadrature amplitude modulation (16QAM), 64QAM, or 256QAM, for a modulation symbol of the downlink channel, for example. The demodulation unit 512 demultiplexes and demodulates the downlink channel multiplexed by multiple input multiple output (MIMO).

The decoding unit 511 performs demodulation processing for coded bits of the demodulated downlink channel. The decoded downlink data or downlink control information is output to the control unit 502. The decoding unit 511 performs decoding processing for each transport block for the PDSCH.

The channel measurement unit 515 measures the estimation value of the propagation path, channel quality, or the like from the downlink reference signal input from the demultiplexing unit 513, and outputs a measurement result to the demultiplexing unit 513 or the control unit 502. The downlink reference signal used for measurement by the channel measurement unit 515 may be determined on the basis of at least a transmission mode set by the RRC parameter or another RRC parameter.

For example, DL-DMRS measures the estimation value of the propagation path for compensating the propagation path for the PDSCH or the EPDCCH. A CRS is for measuring the estimation value of the propagation path for compensating the propagation path for the PDCCH or the PDSCH, or a channel in the downlink for reporting CSI. A CSI-RS is for measuring the channel in the downlink for reporting CSI. The channel measurement unit 515 calculates reference signal received power (RSRP) or reference signal received quality (RSRQ) on the basis of the CRS, CSI-RS, or a detection signal, and outputs a calculation result to the upper layer processing unit 501.

The transmission unit 504 performs transmission processing such as encoding, modulation, and multiplexing for uplink control information and uplink data input from the upper layer processing unit 501 under the control of the control unit 502.

For example, the transmission unit 504 multiplexes an uplink channel or an uplink reference signal such as the PUSCH or PUCCH to generate a transmission signal. Note that the transmission processing in the transmission unit 504 is performed on the basis of predetermined setting or setting or notification from the base station device 200.

The encoding unit 521 encodes HARQ indicator (HARQ-ACK), the uplink control information, and the uplink data input from the control unit 502, using a predetermined encoding method such as block encoding, convolutional encoding, or turbo encoding.

The modulation unit 522 modulates coded bits input from the encoding unit 521 by a predetermined modulation method such as BPSK, QPSK, 16QAM, 64QAM, or 256QAM, for example. The uplink reference signal generation unit 525 generates an uplink reference signal on the basis of the RRC parameter set in the terminal device 100 and the like.

The multiplexing unit 523 multiplexes the modulation symbol of each channel and the uplink reference signal, and allocates the multiplexed symbol to a predetermined resource element.

The wireless transmission unit 524 performs processing, for the signal from the multiplexing unit 523, such as transformation into a time domain signal by inverse fast Fourier transform (IFFT), addition of a guard interval, generation of a baseband digital signal, conversion into an analog signal, quadrature modulation, conversion of an intermediate frequency signal into a high frequency signal (up conversion), removal of an extra frequency component, and amplification of power to generate a transmission signal. The transmission signal output by the wireless transmission unit 524 is transmitted from the transmission/reception antenna 505.

(Configuration Example of Base Station Device)

Figure 8:
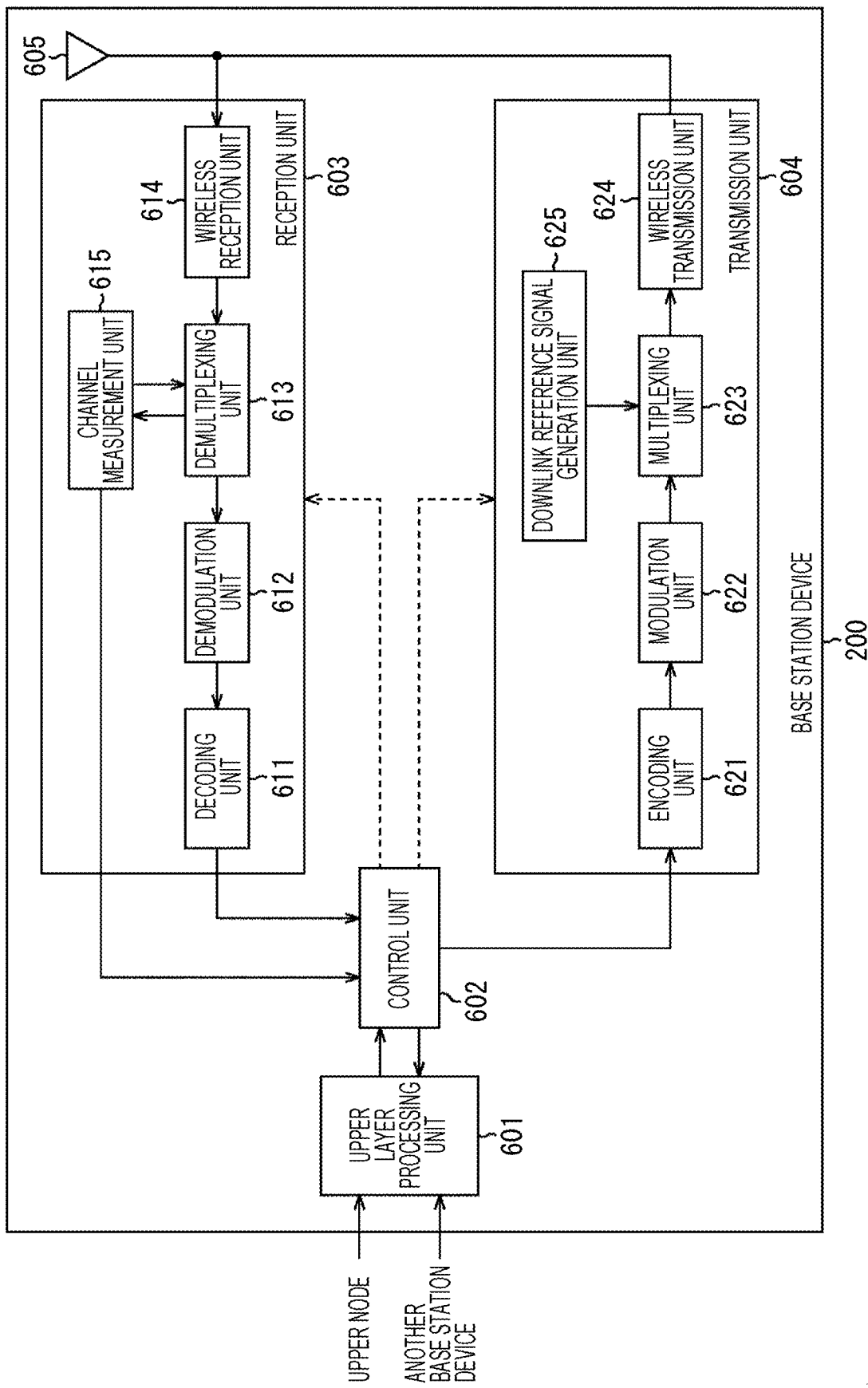
FIG. 8 is a diagram illustrating a configuration example of a base station device.

FIG. 8 is a diagram illustrating a configuration example of the base station device 200.

In FIG. 8, the base station device 200 includes an upper layer processing unit 601, a control unit 602, a reception unit 603, a transmission unit 604, and a transmission/reception antenna 605.

The reception unit 603 includes a decoding unit 611, a demodulation unit 612, a demultiplexing unit 613, a wireless reception unit 614, and a channel measurement unit 615. Furthermore, the transmission unit 604 includes an encoding unit 621, a modulation unit 622, a multiplexing unit 623, a wireless transmission unit 624, and a downlink reference signal generation unit 625.

The base station device 200 can support one or more radio access technologies (RATs). Some or all of the units included in the base station device 200 can be individually configured according to a radio access technology (RAT). For example, the reception unit 603 and the transmission unit 604 are individually configured according to the LTE and the NR.

Furthermore, in an NR cell, some or all of the units included in the base station device 200 can be individually configured according to a parameter set regarding a transmission signal. For example, in a certain NR cell, the wireless reception unit 614 and the wireless transmission unit 624 can be individually configured according to a parameter set regarding a transmission signal.

The upper layer processing unit 601 performs processing for a medium access control (MAC) layer, a packet data convergence protocol (PDCP) layer, a radio link control (RLC) layer, and a radio resource control (RRC) layer.

Furthermore, the upper layer processing unit 601 generates control information for controlling the reception unit 603 and the transmission unit 604 and outputs the control information to the control unit 602.

The control unit 602 controls the reception unit 603 and the transmission unit 604 on the basis of the control information from the upper layer processing unit 601. The control unit 602 generates control information for the upper layer processing unit 601 and outputs the control information to the upper layer processing unit 601.

The control unit 602 receives a decoded signal from the decoding unit 611 and a channel estimation result from the channel measurement unit 615. Furthermore, the control unit 602 outputs a signal to be encoded to the encoding unit 621. Furthermore, the control unit 602 is used for controlling the whole or part of the base station device 200.

The upper layer processing unit 601 performs at least one piece of processing and management regarding RAT control, radio resource control, subframe setting, scheduling control, and CSI report control. The processing and management in the upper layer processing unit 601 are performed in each terminal device 100 or are commonly performed in the terminal devices 100 connected to the base station device 200.

The processing and management in the upper layer processing unit 601 may be performed only by the upper layer processing unit 601 or may be obtained from an upper node or another base station device. Furthermore, the processing and management in the upper layer processing unit 601 may be individually performed according to the RAT. For example, the upper layer processing unit 601 individually performs the processing and management in the LTE and the processing and management in the NR.

In the RAT control in the upper layer processing unit 601, management regarding the RAT is performed. For example, in the RAT control, at least one of the management regarding the LTE or the management regarding the NR. The management regarding the NR includes setting and processing of the parameter set regarding a transmission signal in an NR cell.

In the radio resource control in the upper layer processing unit 601, generation and management of downlink data (transport block), system information, RRC message (RRC parameter), or MAC control element (CE) are performed.

In the subframe setting in the upper layer processing unit 601, management of subframe setting, subframe pattern setting, uplink-downlink setting, uplink reference UL-DL setting, and/or downlink reference UL-DL setting is performed. Note that the subframe setting in the upper layer processing unit 601 is also called base station subframe setting.

Furthermore, the subframe setting in the upper layer processing unit 601 can be determined on the basis of a traffic amount of the uplink or a traffic amount of the downlink. Furthermore, the subframe setting in the upper layer processing unit 601 can be determined on the basis of a scheduling result of the scheduling control in the upper layer processing unit 601.

In the scheduling control in the upper layer processing unit 601, a frequency and a subframe to which a physical channel is allocated, encoding efficiency, a modulation method, and transmission power for the physical channel, and the like are determined on the basis of received channel state information, the estimation value of the propagation path and the channel quality input from the channel measurement unit 615, and the like. For example, the control unit 602 generates control information (DCI format) on the basis of the scheduling result of the scheduling control in the upper layer processing unit 601.

In the CSI report control in the upper layer processing unit 601, a CSI report of the terminal device 100 is controlled. For example, the setting regarding a CSI reference resource assumed for calculating CSI in the terminal device 100 is controlled.

The reception unit 603 receives a signal transmitted from the terminal device 100 via the transmission/reception antenna 605 under the control of the control unit 602, performs reception processing such as demultiplexing, demodulation, and decoding, and outputs processed information to the control unit 602. Note that the reception processing in the reception unit 603 is performed on the basis of predetermined setting or setting of which the base station device 200 notifies the terminal device 100.

The wireless reception unit 614 performs, for the uplink signal received via the transmission/reception antenna 605, conversion into an intermediate frequency (down conversion), removal of an unnecessary frequency component, control of an amplification level to properly maintain a signal level, quadrature demodulation based on in-phase and quadrature components of the received signal, conversion from an analog signal to a digital signal, removal of guard interval (GI), and extraction of a signal in a frequency domain by fast Fourier transform (FFT).

The demultiplexing unit 613 demultiplexes the uplink channel such as PUCCH or PUSCH or the uplink reference signal from the signal input from the wireless reception unit 614. The demultiplexing unit 613 outputs the uplink reference signal to the channel measurement unit 615. The demultiplexing unit 613 compensates a propagation path for an uplink channel from an estimation value of the propagation path input from the channel measurement unit 615.

The demodulation unit 612 demodulates a reception signal, using a modulation method such as BPSK, QPSK, 16QAM, 64QAM, or 256QAM, for a modulation symbol of the uplink channel, for example. The demodulation unit 612 demultiplexes and demodulates the MIMO-multiplexed uplink channel.

The decoding unit 611 performs decoding processing for coded bits of the demodulated uplink channel. The decoded uplink data or uplink control information is output to the control unit 602. The decoding unit 611 performs decoding processing for each transport block for the PUSCH.

The channel measurement unit 615 measures the estimation value of the propagation path, channel quality, or the like from the uplink reference signal input from the demultiplexing unit 613, and outputs a measurement result to the demultiplexing unit 613 or the control unit 602. For example, UL-DMRS measures the estimation value of the propagation path for compensating the propagation path for the PUCCH or the PUSCH, and SRS measures the channel quality in the uplink.

The transmission unit 604 performs transmission processing such as encoding, modulation, and multiplexing for downlink control information and downlink data input from the upper layer processing unit 601 under the control of the control unit 602.

For example, the transmission unit 604 generates and multiplexes PHICH, PDCCH, EPDCCH, PDSCH, and the downlink reference signal to generate a transmission signal. Note that the transmission processing in the transmission unit 604 is performed on the basis of predetermined setting, setting of which the base station device 200 notifies the terminal device 100, or setting given in notification via the PDCCH or EPDCCH transmitted in the same subframe.

The encoding unit 621 encodes HARQ indicator (HARQ-ACK), the downlink control information, and the downlink data input from the control unit 602, using a predetermined encoding method such as block encoding, convolutional encoding, or turbo encoding.

The modulation unit 622 modulates coded bits input from the encoding unit 621 by a predetermined modulation method such as BPSK, QPSK, 16QAM, 64QAM, or 256QAM, for example. The downlink reference signal generation unit 625 generates the downlink reference signal on the basis of a physical cell identifier (PCI), the RRC parameter set in the terminal device 100, and the like.

The multiplexing unit 623 multiplexes the modulation symbol of each channel and the downlink reference signal, and allocates the multiplexed symbol to a predetermined resource element.

The wireless transmission unit 624 performs processing, for the signal from the multiplexing unit 623, such as transformation into a time domain signal by inverse fast Fourier transform (IFFT), addition of a guard interval (GI), generation of a baseband digital signal, conversion into an analog signal, quadrature modulation, conversion of an intermediate frequency signal into a high frequency signal (up conversion), removal of an extra frequency component, and amplification of power to generate a transmission signal. The transmission signal output by the wireless transmission unit 624 is transmitted from the transmission/reception antenna 605.

(2) Communication Quality Measurement and Collection Procedures

Next, an example of communication quality measurement and collection procedures executed by the communication system to which the present technology is applied will be described with reference to FIGS. 9 to 19.

A radio access technology (RAT) in the embodiment of the present technology is a technology for implementing, in particular, wireless connection between communication devices belonging to the device layer 10 in FIG. 1.

Here, traffic from the base station device 200 to the terminal device 100 is called downlink and traffic from the terminal device 100 to the base station device 200 is called uplink. Furthermore, a communication link (sidelink, D2D: device-to-device, ProSe: proximity services, or the like) between the terminal devices 100 is newly provided, and the necessity thereof is increasing.

This sidelink is a link for implementing, for example, vehicle-to-vehicle communication (V2V), vehicle-to-road communication (V2I or V2N), vehicle-to-pedestrian communication (V2P), or communication involving vehicle (V2X), and thus collection of communication quality measurement values regarding the sidelink is required, which has been described above.

Therefore, in the embodiment of the present technology, a technology for enabling collection of a communication quality measurement value regarding a sidelink will be particularly proposed. Furthermore, as illustrated in FIGS. 5 and 6, the terminal device 100 has various sensor functions in addition to the pure communication function (transmission function and reception function). Therefore, in the embodiment of the present technology, a method of using the communication quality measurement can be further expanded by collecting measurement values obtained from the sensor functions in addition to the communication quality measurement.

(Request for Measurement Value Report From Network Side)

Figure 9:
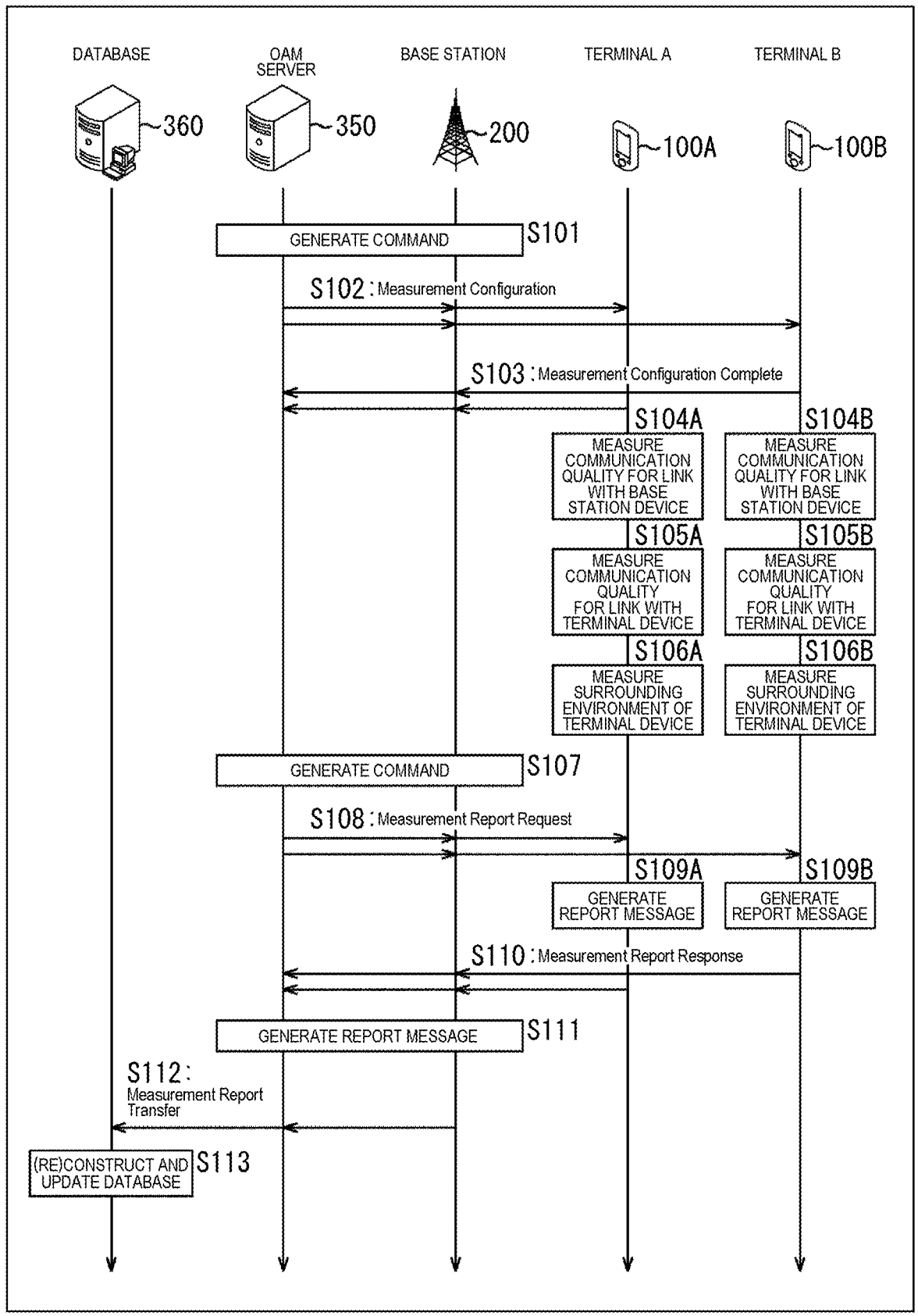
FIG. 9 is a diagram illustrating a first example of a procedure between nodes in communication quality measurement and collection.

FIG. 9 is a diagram illustrating a first example of a procedure between nodes in communication quality measurement and collection. In the first example of the procedure, in performing communication quality measurement and collection, the base station device 200 on the network side or an OAM server 350 requests transmission of a report of results of communication quality measurement and surrounding environment measurement (measurement value report).

Note that, in FIG. 9, the base station device 200, the OAM server 350, and a DB server 360 are provided on the network side, and a terminal device 100A and a terminal device 100B are provided on the communication terminal side. Here, the terminal devices 100A and 100B may be the terminal device 100V (FIG. 5) configured as the vehicle having a communication function (vehicle device) or may be the terminal device 100U (FIG. 6) configured as the external device of the vehicle.

At the time of measuring the communication quality, the base station device 200 or the OAM server 350 generates, for example, a command for giving an instruction on a configuration or setting regarding the measurement (S101) and transmits the command to the terminal devices 100A and 100B (S102).

Here, for example, a command such as a Measurement Configuration can be given in notification to the terminal devices 100A and 100B. Furthermore, the configuration regarding the measurement specifically gives instructions on, for example, an item to be measured, measurement timing, measurement frequency, timing to report a measurement result, a frequency to report the measurement result, and the like.

The terminal devices 100A and 100B that have received this command return a response to the received command to the base station device 200 or the OAM server 350 on the basis of their own measurement capabilities (for example, UE capability or the like) (S103).

As this response, for example, it is desirable to return a response as to whether or not measurement is possible with respect to the item to be measured and measurement frequency on which an instruction is given. Specifically, the terminal devices 100A and 100B can return a response such as, for example, Measurement Configuration Complete.

The terminal device 100A measures the communication quality and the surrounding environment for each communication link on the basis of the instruction of the received command and the content of the returned response (measurement configuration and setting).

As this measurement, for example, measurement of the communication quality of the link (downlink or uplink) with the base station device 200 (S104A), measurement of the communication quality of the link (sidelink) with the terminal device 100B (for example, another terminal device 100V) (S105A), and measurement (sensing) of the surrounding environment of the terminal device 100A (S106A) are performed.

Furthermore, the terminal device 100B performs, for example, measurement of the communication quality of the link (downlink or uplink) with the base station device 200 (S104B), measurement of the communication quality of the link (sidelink) with the terminal device 100A (for example, another terminal device 100V) (S105B), and measurement (sensing) of the surrounding environment of the terminal device 100B (S106B), similarly to the terminal device 100A.

The measurement here includes not only actual measurement but also storage and buffering of the measurement result (log information). Furthermore, the order of the measurement here is arbitrary. Note that details of the measurements (S104A to S106A and S104B to S106B) executed by the terminal devices 100A and 100B will be described below.

Thereafter, at the time of collecting measurement results, the base station device 200 or the OAM server 350 generates a command (request) for requesting transmission of the measurement results (S107) and transmits the command to the terminal devices 100A and 100B (S108).

Here, for example, a request such as a Measurement Report Request can be given in notification to the terminal devices 100A and 100B. A transmission opportunity (communication opportunity) for the partner terminal devices 100A and 100B transmitting a measurement value report can be given in notification together with the request.

Specifically, as the transmission opportunity, allocation, scheduling, grant, or the like of radio resources can be included, for example. Here, as the radio resources, for example, a radio resource related to time such as a subframe, a slot, or a symbol, and a radio resource related to frequency such as a resource block, a subband, and a subcarrier can be included.

Note that this request is desirably individually (UE-specific and User-specific) given in notification to the terminal devices 100A and 100B. Furthermore, the transmission opportunity is desirably specified according to, for example, control information (for example, downlink control information (DCI) and the like) of a physical control channel (for example, physical downlink control channel (PDCCH) or the like).

The terminal devices 100A and 100B that have received the command (request) respectively generate report messages (Measurement Report Responses) of the measurement results (S109A and S109B) and transmit the report messages to the base station device 200 or the OAM server 350 (S110).

That is, the terminal device 100A generates the report message on the basis of the measurement result obtained by the measurement in steps S104A to S106A, and transmits the report message to the base station device 200 or the OAM server 350, using the transmission opportunity (for example, the radio resources or the like) specified in the received request.

Furthermore, the terminal device 100B generates the report message on the basis of the measurement result obtained by the measurement in steps S104B to S106B, and transmits the report message to the base station device 200 or the OAM server 350, using the transmission opportunity (for example, the radio resources or the like), similarly to the terminal device 100A.

The base station device 200 or the OAM server 350 receives the report messages transmitted from the terminal devices 100A and 100B. The base station device 200 or the OAM server 350 applies processing such as aggregation, conversion, or processing, for example, to the report messages from the terminal devices 100A and 100B and generates a new report message (S111).

Then, the base station device 200 or the OAM server 350 transmits the generated report message to the DB server 360 (S112). Thereby, the DB server 360 performs, for example, processing such as construction (reconstruction) and updating of a database on the basis of the report message from the base station device 200 or the OAM server 350 (S113).

The flow of the procedure between nodes in communication quality measurement and collection in the case of requesting transmission of a measurement value report from the network side has been described.

Note that, in FIG. 9, the processing executed by the terminal device 100A is implemented by, for example, operating each unit of the wireless communication unit 117 under the control of the communication control unit 171 or the central control unit 111. Similarly, in FIG. 9, the processing executed by the terminal device 100B is implemented by, for example, operating each unit of the wireless communication unit 117 under the control of the communication control unit 171 or the central control unit 111.

(Request for Measurement Value Report From Communication Terminal Side)

Figure 10:
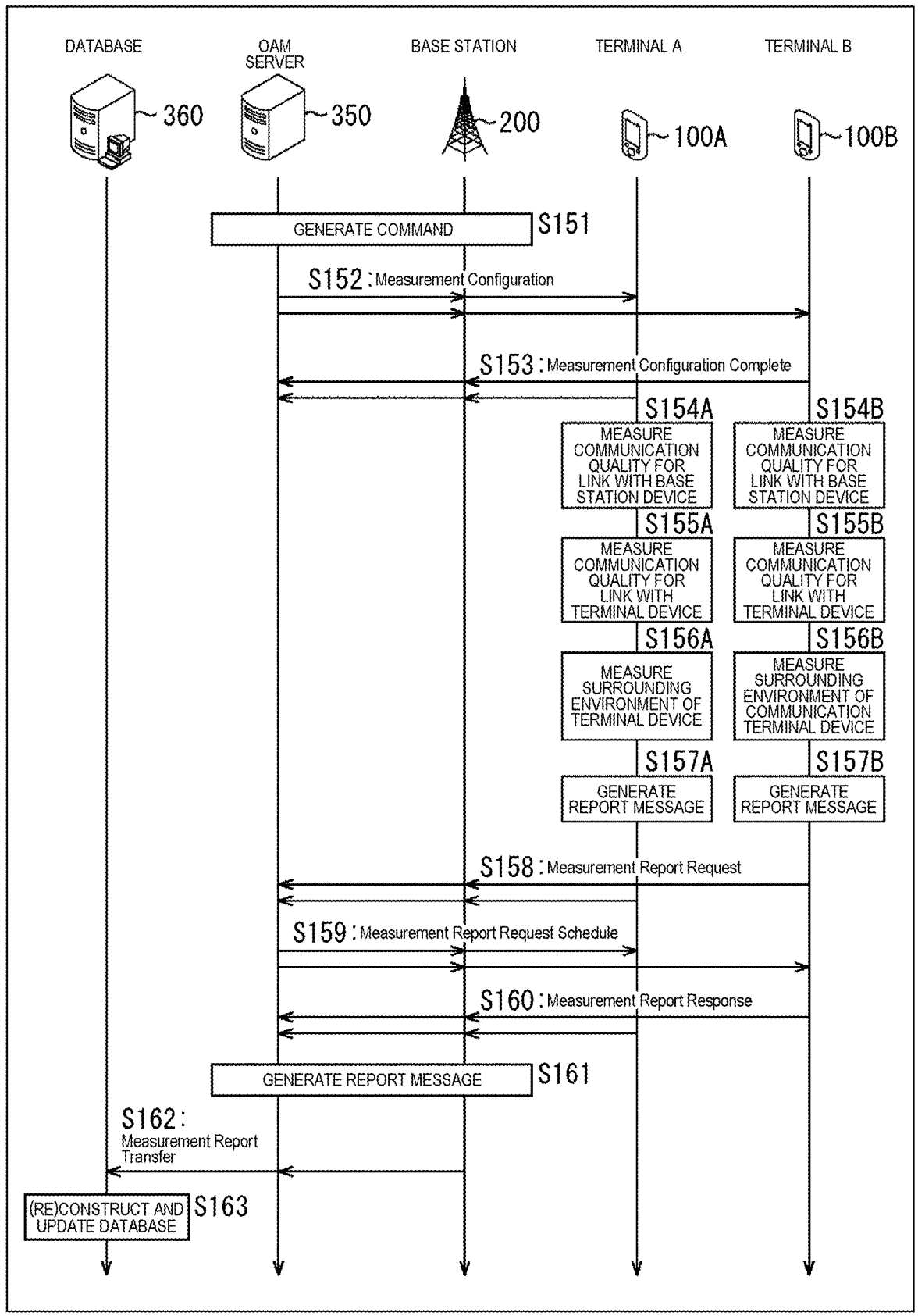
FIG. 10 is a diagram illustrating a second example of the procedure between nodes in communication quality measurement and collection.

FIG. 10 is a diagram illustrating a second example of the procedure between nodes in communication quality measurement and collection. In the second example of the procedure, in performing communication quality measurement and collection, the terminal device 100 on the communication terminal side requests transmission of a measurement value report.

Note that, in FIG. 10, the base station device 200, the OAM server 350, and the DB server 360 are provided on the network side, and the terminal device 100A and the terminal device 100B are provided on the communication terminal side, similarly to FIG. 9.

In steps S151 to S153, the terminal devices 100A and 100B return responses such as whether or not the measurement is possible with respect to the item to be measured and measurement frequency on which an instruction is given, for example, according to the command from the base station device 200 or the OAM server 350, similarly to steps S101 to S103 in FIG. 9.

Furthermore, in steps S154A to S156A, the terminal device 100A measures the communication quality of the links with the base station device 200 and with the terminal device 100B and senses the surrounding environment, similarly to steps S104A to S106A in FIG. 9.

Similarly, in steps S154B to S156B, the terminal device 100B measures the communication quality of the links with the base station device 200 and with the terminal device 100A and senses the surrounding environment, similarly to steps S104B to S106B in FIG. 9.

Then, the terminal device 100A generates the report message on the basis of the measurement result obtained in the measurement in steps S154A to S156A (5157A). Similarly, the terminal device 100B generates the report message on the basis of the measurement result obtained in the measurement in steps S154B to S156B (5157B).

Thereafter, at the time of collecting the measurement results, the terminal devices 100A and 100B respectively notify the base station device 200 or the OAM server 350 of the requests such as Measurement Report Requests, for example (S158). A transmission opportunity (communication opportunity) for the terminal devices 100A and 100B transmitting a measurement value report can be requested together with the request.

Specifically, as the transmission opportunity, allocation, scheduling, grant, or the like of radio resources can be included, for example, similarly to FIG. 9 above. Here, as the radio resources, for example, a radio resource related to time such as a subframe, a slot, or a symbol, and a radio resource related to frequency such as a resource block, a subband, and a subcarrier can be included.

The base station device 200 or the OAM server 350 that has received the request gives a notification for providing the transmission opportunity such as a Measurement Report Request Schedule to the terminal devices 100A and 100B (S159).

The terminal device 100A that has received the notification transmits the report message generated in the processing in step S157A to the base station device 200 or the OAM server 350, using the transmission opportunity (for example, the radio resources or the like) specified in the received notification (S160). Similarly, the terminal device 100B transmits the report message generated in the processing in step S157B to the base station device 200 or the OAM server 350, using the transmission opportunity (for example, the radio resources or the like) (S160).

In steps S161 to S163, the base station device 200 or the OAM server 350 generates a new report message and the DB server 360 constructs (reconstructs) and updates the database, similarly to steps S111 to S113 in FIG. 9.

The flow of the procedure between nodes in communication quality measurement and collection in the case of requesting transmission of a measurement value report from the communication terminal side has been described.

Note that, even in FIG. 10, the processing executed by the terminal devices 100A and 100B can be implemented by, for example, operating each unit of the wireless communication unit 117 under the control of the communication control unit 171 or the central control unit 111, similarly to FIG. 9 above.

(Communication Quality Measurement Target)

In the embodiment of the present technology, in the communication quality measurement, for example, the target communication includes the following examples:

(a) communication quality measurement between the base station device 200 and the terminal device 100 (downlink and uplink); and (b) communication quality measurement between the terminal devices 100 (sidelink).

Note that, in the former example (a), it is desirable that the terminal device 100 measures the communication quality of the downlink. Meanwhile, it is desirable that the base station device 200 measures the communication quality of the uplink. Furthermore, in the latter example (b), it is desirable that the terminal device 100 measures the communication quality of the sidelink.

Moreover, in the embodiment of the present technology, a target frequency band and a target communication method can be considered in the case of performing the communication quality measurement.

More specifically, as the frequency band, a frequency band, a carrier frequency, a component carrier, or the like can be included, for example.

Furthermore, as the communication method, 4G V2X (vehicle to everything), 5G V2X (vehicle to everything), license assisted access (LAA), Wi-Fi (registered trademark), MulteFire, dedicated short range communication (DSCR) or the like can be included, for example. Note that 4th generation (4G) is also called 4G long term evolution (LTE), LTE-Advanced, or the like. Furthermore, 5th generation (5G) is also referred to as 5G new radio (5G NR) or the like.

Moreover, the frequency bands can be divided into licensed frequency bands and unlicensed frequency bands according to the types of the frequency bands.

The licensed bands/channels are frequency bands exclusively allocated to or preferentially allocated (but not completely) to specific carriers or specific communication devices.

The unlicensed frequency bands/channels are frequency bands that a communication device can use without a license. As the unlicensed frequency bands, for example, frequency bands commonly used by a plurality of communication devices or communication methods are typical, such as industry science medical (ISM) bands such as 2.4 GHz, 5.8 GHz, and 24 GHz, and secondary users of TV white spaces (TVWS).

To summarize the above, in the embodiment of the present technology, a combination of A to U illustrated in the table in FIG. 11 can be adopted as the communication quality measurement targets.

In the table in FIG. 11, communication quality measurements for an uplink, a downlink, and a sidelink are allocated to each system type classified by frequency band type. Specifically, the licensed frequency bands include, for example, 4G LTE and 5G NR as the system types. Meanwhile, the unlicensed frequency bands include, for example, 4G LTE, 5G NR, Wi-Fi, MulteFire, and DSCR.

Note that, in each of the licensed frequency bands and the unlicensed frequency bands, more detailed classification may be performed according to the frequency band or the carrier frequency.

More specifically, for example, classification of the frequency bands and its peripheral bands such as 800 MHz band, 1.5 Hz band, 2 GHz band, 4 GHz band, 6 GHz band, 12 GHz band, 28 GHz band, 40 GHz band, 60 GHz band, 70 GHz band, 80 GHz band, 100 GHz band, classification based on VHF/UHF/EHF, or the like may be adopted.

(Communication Quality Measurement Items)

In the embodiment of the present technology, the communication quality measurement items include, for example, the following three items.

(a) First Item Example

First, measurement of an item corresponding to long-time variation of radio wave propagation can be assumed as the communication quality for a target link. Here, examples include received power of a reference signal, received quality, and the like.

More specifically, examples of the reference signal include reference signals, pilot signals, synchronization signals, discovery signals, preambles, known signals, and the like. Furthermore, examples of the received quality include reference signal received power RSRP, reference signal received quality (RSRQ), and a received signal strength indicator (RSSI).

As measurement values for these items, it is desirable to measure values for a plurality of base station devices 200, cells, transmission and reception points (TRPs), access points, other terminal devices 100 (in the case of a sidelink), or the like, or a value for an individual base station device 200, an individual cell, an individual transmission and reception point (TRP), an individual access point, an individual another terminal device 100 (in the case of a sidelink), or the like, from the viewpoint of the terminal device 100 that performs the measurement. Furthermore, these measurement values are desirably measured in a physical layer.

(b) Second Item Example

Second, measurement of an item indicating variation of radio wave propagation in a shorter time than the above-described first item (a) can be assumed as the communication quality for a target link. An example of the item includes channel state information (CSI).

More specifically, for example, channel quality indicator (CQI) indicating a modulation method, an error correction coding method, an error correction coding rate, or the like available for the target link, modulation and coding set (MCS), rank indicator (RI) indicating the number of multiple streams (rank number) of multiple input multiple output (MIMO) and the like available for the target link, precoding matrix indicator (PMI) indicating a MIMO precoding method available for the target link, and the like can be included.

As measurement values for these items, it is desirable to measure a value for an individual base station device 200, an individual cell, a TRP, an individual access point, an individual another terminal device 100, or the like from the viewpoint of the terminal device 100 that performs the measurement. Furthermore, these measurement values are desirably measured in a physical layer.

(c) Third Item Example

Third, a measurement item close to a communication quality result may be measured, other than the above-described first item (a) and second item (b) that correspond to communication quality item measurement relatively directly related to the radio wave propagation characteristics.

Examples of such an item includes a delay (for example, a delay, a latency, or the like) regarding communication (for example, the number of predetermined packets, communication of a data amount, or the like), a communication speed achieved in communication (for example, a throughput, a data rate, or the like), a packet loss during communication, or the like.

These values may be measured in any of a physical layer (PHY layer), a data link layer (MAC layer), a network layer, an application layer, and the like.

Note that examples of the packet loss occurring during communication include the number of packet losses per predetermined time, a packet loss rate, a packet error rate, and a block error rate.

(Procedure for Communication Quality Measurement for Uplink)

Figure 12:
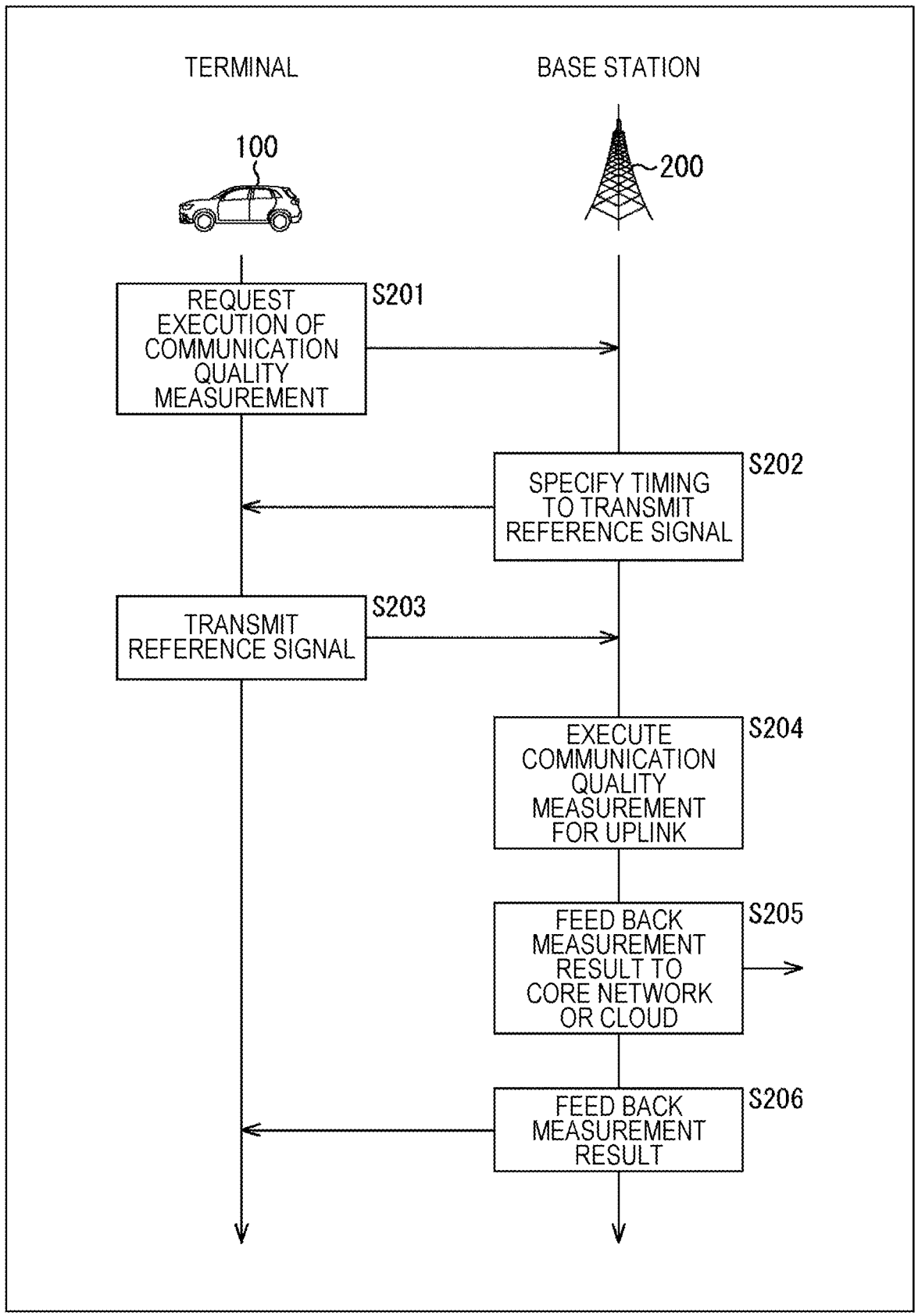
FIG. 12 is a diagram illustrating an example of a procedure for performing communication quality measurement for an uplink.

FIG. 12 is a diagram illustrating an example of a procedure for performing communication quality measurement for an uplink. In this procedure example, the base station device 200 is an entity that measures the communication quality in a case of transmission (uplink) from the terminal device 100 to the base station device 200.

In FIG. 12, first, the terminal device 100 transmits a request for requesting execution of communication quality measurement to the base station device 200 (S201). Note that, even in a case where there is no such request, the base station device 200 can execute the measurement itself. That is, the base station device 200 can voluntarily proceed to the next step (S202).

The base station device 200 transmits information for specifying timing to transmit the reference signal for communication quality measurement to the terminal device 100 that is a measurement target uplink transmission source (the terminal device 100 that has outputted the above request) (S202). Hereinafter, such information shared between devices at the time during communication quality measurement is also referred to as shared measurement information.

Note that, in the shared measurement information, not only the timing to transmit the reference signal but also a frequency resource to which the reference signal is to be transmitted, and the like may be specified at the same time, for example. Here, as the frequency resource, a frequency channel (frequency channel or component carrier), a resource block, a subchannel, a subcarrier in the frequency channel, or the like can be included, for example.

Furthermore, the shared measurement information regarding the transmission timing of the reference signal, the frequency resources, and the like is desirably transmitted using, for example, a downlink control channel, a radio resource control (RRC) signaling, or a channel for transmitting system information.

The terminal device 100 that has received the shared measurement information from the base station device 200 transmits the reference signal to the base station device 200, using the transmission timing, the frequency resource, and the like according to the specification on the basis of the shared measurement information (S203). Here, the reference signal has a characteristic that the signal waveform and the signal pattern thereof are known by terminal devices other than the transmission source or the terminal device 100 itself and base station device. Here, it is desirable that precoding and filtering patterns and coefficients to be applied to the reference signal be known. Alternatively, it is desirable not to apply precoding or filtering to the reference signal.

The base station device 200 receives the reference signal transmitted using the transmission timing and the frequency resource specified in the shared measurement information from the terminal device 100, and executes the communication quality measurement for the target uplink (S204). In this communication quality measurement, for example, measurement of a communication quality measurement item such as the above-described first item is executed.

Then, the base station device 200 feeds back a measurement result obtained as a result of execution of the communication quality measurement for the target uplink to a server device in the core network or the cloud system (S205).

Furthermore, the base station device 200 feeds back a measurement result of the communication quality measurement for the target uplink to the terminal device 100 (S206). Note that, the order of the processing for the feedbacks of the measurement results in steps S205 and S206 may be reversed. Furthermore, the base station device 200 does not necessarily need to feed back the measurement result to the terminal device 100 (step S206 may not be executed).

The procedure for performing communication quality measurement for an uplink has been described.

Note that, in FIG. 12, the processing executed by the terminal device 100 can be implemented by, for example, operating each unit of the wireless communication unit 117 under the control of the communication control unit 171 and the like.

(Procedure for Communication Quality Measurement for Downlink)

Figure 13:
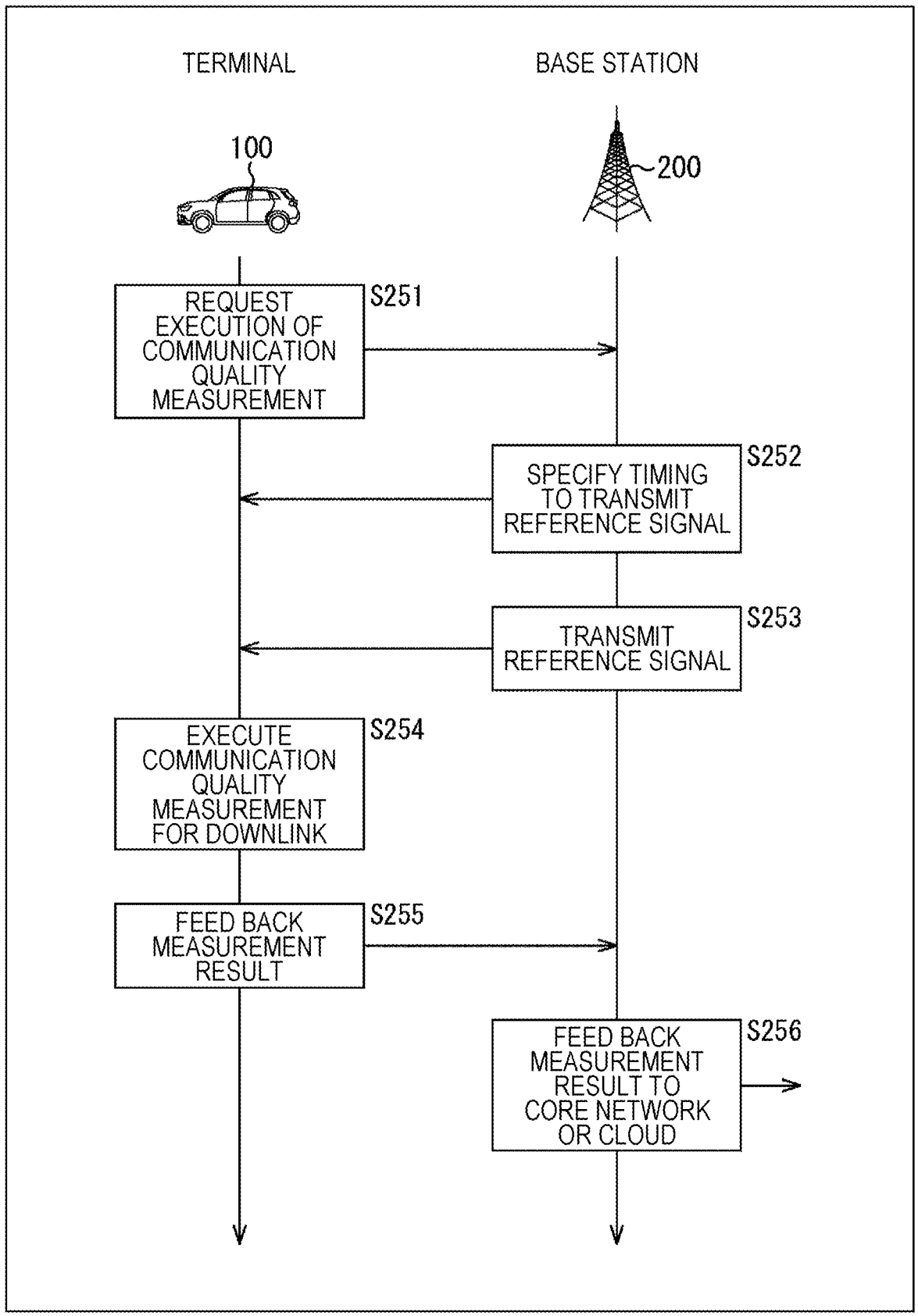
FIG. 13 is a diagram illustrating an example of a procedure for performing communication quality measurement for a downlink.

FIG. 13 is a diagram illustrating an example of a procedure for performing communication quality measurement for a downlink. In this procedure example, the terminal device 100 is an entity that measures the communication quality in a case of transmission (downlink) from the base station device 200 to the terminal device 100.

In FIG. 13, first, the terminal device 100 transmits a request for requesting execution of communication quality measurement to the base station device 200 (S251). Note that even in the case where there is no such request, the base station device 200 can voluntarily proceed to the next step (S252), similarly to FIG. 12 above.

The base station device 200 transmits shared measurement information to the terminal device 100 that is a measurement target downlink transmission source (the terminal device 100 that has outputted the above request) (S252).

Here, for example, the shared measurement information specifies the transmission timing to transmit the reference signal for the communication quality measurement, the frequency resource for transmitting the reference signal, and the like. Here, as the frequency resource, a frequency channel, a resource block, a subchannel, a subcarrier, or the like in the frequency channel can be included, for example, similarly to FIG. 12 above.

Furthermore, it is desirable to transmit the shared measurement information regarding the transmission timing, the frequency resource, and the like for the reference signal via a downlink control channel or a channel for transmitting system information, for example.

The base station device 200 transmits the reference signal to the terminal device 100, using the transmission timing, the frequency resource, and the like specified by the base station device 200 itself for the target terminal device 100 (S253).

The terminal device 100 that has received the shared measurement information from the base station device 200 receives the reference signal, assuming that the reference signal is transmitted from the base station device 200, using the transmission timing, the frequency resource, and the like according to the specification on the basis of the shared measurement information, and executes the communication quality measurement for the target downlink (S254). In this communication quality measurement, for example, measurement of a communication quality measurement item such as the above-described first item is executed.

Then, the terminal device 100 feeds back a measurement result obtained as a result of execution of the communication quality measurement for the target downlink to the base station device 200 (S255).

The base station device 200 further feeds back the measurement result of the communication quality measurement for the target downlink received from the terminal device 100 to the server device in the core network or the cloud system (S256).

In the feedback (S256), the base station device 200 may feed back the content of the measurement result received from the terminal device 100 as it is or may feed back changed or processed content. Here, as an example of the change or processing, for example, time averaging processing, frequency averaging processing, abnormal value determination/deletion, and the like can be performed.

The procedure for performing communication quality measurement for a downlink has been described.

Note that, in FIG. 13, the processing executed by the terminal device 100 can be implemented by, for example, operating each unit of the wireless communication unit 117 under the control of the communication control unit 171 and the like.

(Procedure for Communication Quality Measurement for Sidelink)

Figure 14:
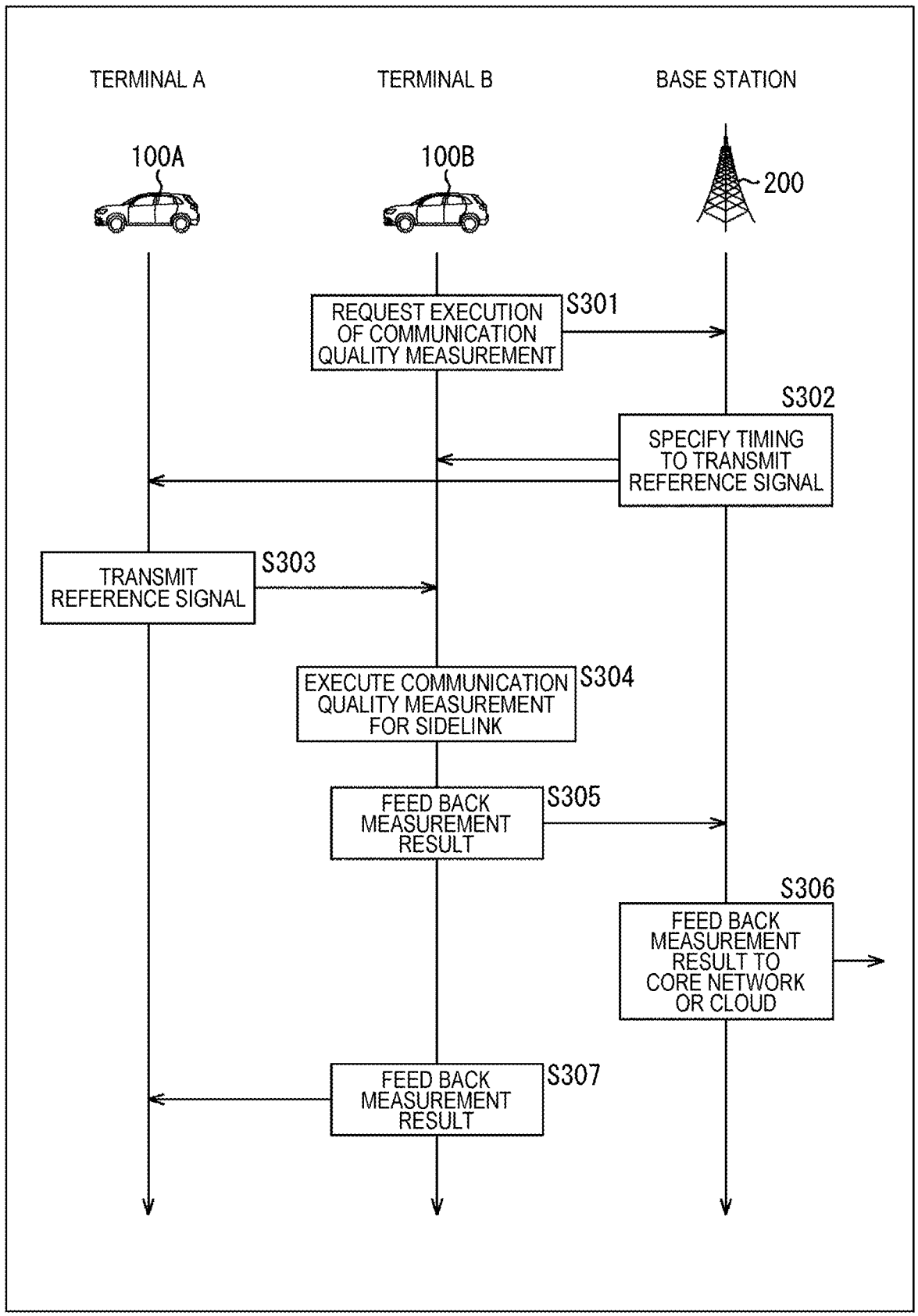
FIG. 14 is a diagram illustrating a first example of a procedure for performing communication quality measurement for a sidelink.

FIG. 14 is a diagram illustrating a first example of a procedure for performing communication quality measurement for a sidelink. In the first example of the procedure, the terminal device 100B measures the communication quality of the link (sidelink) with the terminal device 100A.

Furthermore, in the communication quality measurement for the sidelink, the case where the base station device 200 gives an instruction on the measurement and the case where the terminal device 100 gives an instruction on the measurement are assumed. In the first example of the procedure in FIG. 14, the former case will be described.

In a case where the communication quality measurement for the link (sidelink) between the terminal device 100B and the terminal device 100A, the terminal device 100B transmits a request for enabling execution of the communication quality measurement to the base station device 200 (S301).

More specifically, as the request, the terminal device 100B requests allocation of the radio resources for reference signal transmission so that the measurement target can transmit the reference signal. As the radio resources, the time resource, the frequency resource, and the like can be included, for example.

The base station device 200 that has received the request transmits the shared measurement information including content for allocating the radio resources for transmitting the reference signal to the terminal device 100A (S302). Furthermore, the base station device 200 transmits the shared measurement information including content regarding the radio resources allocated for the reference signal of the terminal device 100A to the terminal device 100B (S302).

That is, since the radio resources (the time resource, the frequency resource, and the like, for example) given in notification to the terminal device 100A and the terminal device 100B as the shared measurement information are the same, the terminal device 100B can measure the communication quality for the sidelink between the terminal device 100A and the terminal device 100B by receiving the reference signal transmitted from the terminal device 100A, using the radio resources.

The terminal device 100A transmits the known reference signal to the terminal device 100B, using the radio resources according to the specification on the basis of the shared measurement information given in notification from the base station device 200 (S303).

Meanwhile, the terminal device 100B receives the known reference signal, assuming that the reference signal is transmitted from the terminal device 100A using the radio resources according to the specification on the basis of the shared measurement information given in notification from the base station device 200, and executes the communication quality measurement for the sidelink between the terminal device 100A and the terminal device 100B (S304).

That is, here, the terminal device 100B can grasp the radio resources (for example, the time resource, the frequency resource, and the like) with which the terminal device 100A transmits the reference signal from the notification. Therefore, the terminal device 100B can measure the communication quality of the sidelink with the terminal device 100A by receiving the signal transmitted with the radio resources.

Then, the terminal device 100B feeds back a measurement result obtained as a result of execution of the communication quality measurement for the sidelink to the base station device 200 (S305).

The base station device 200 further feeds back the measurement result of the communication quality measurement for the target sidelink received from the terminal device 100B to the server device in the core network or the cloud system (S306).

In the feedback (S306), the base station device 200 may transfer the measurement result received from the terminal device 100B as it is, or may collect feedbacks (measurement results) from a plurality of terminal devices 100, for example, and apply averaging processing, compression processing, packet format conversion processing, and the like to the measurement results, and then feed back.

Furthermore, the terminal device 100B feeds back the measurement result of the communication quality measurement for the sidelink to the terminal device 100A (S307). Note that, the order of the processing for the feedbacks of the measurement results in steps S306 and S307 may be reversed.

Furthermore, the measurement result is not necessarily fed back to the terminal device 100A that is the measurement target (step S307 may not be executed). Moreover, the terminal device 100B may perform a feedback to a device (communication device) other than the terminal device 100A and the base station device 200.

The procedure of the communication quality for the sidelink between the terminal device 100A and the terminal device 100B in the case where the base station device 200 gives an instruction on the measurement has been described.

Note that, even in FIG. 14, the processing executed by the terminal devices 100A and 100B can be implemented by, for example, operating each unit of the wireless communication unit 117 under the control of the communication control unit 171 or the central control unit 111.

(Procedure for Communication Quality Measurement for Sidelink)

Figure 15:
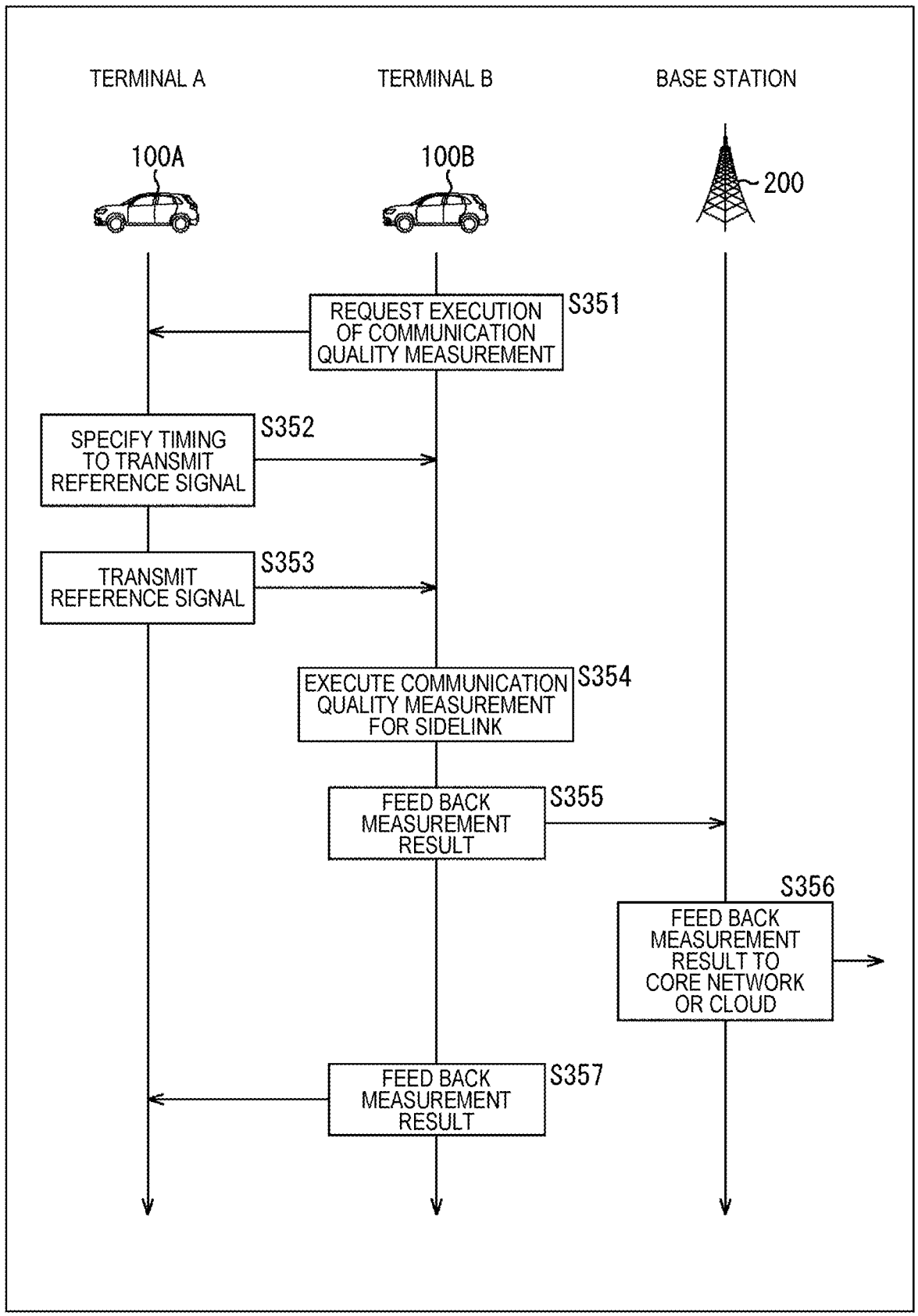
FIG. 15 is a diagram illustrating a second example of the procedure for performing communication quality measurement for a sidelink.

FIG. 15 is a diagram illustrating a second example of the procedure for performing communication quality measurement for a sidelink. In the second example of the procedure, the terminal device 100B measures the communication quality of the link (sidelink) with the terminal device 100A as in the above-described procedure in FIG. 14.

Furthermore, in the communication quality measurement for the sidelink, the case where the base station device 200 gives an instruction on the measurement and the case where the terminal device 100 gives an instruction on the measurement are assumed. In the second example of the procedure in FIG. 15, the latter case will be described.

In a case where the communication quality measurement for the link (sidelink) between the terminal device 100B and the terminal device 100A, the terminal device 100B transmits a request for enabling execution of the communication quality measurement to the terminal device 100A (S351).

More specifically, as the request, notification of the radio resources with which the terminal device 100A transmits the reference signal is requested. As the radio resources, the time resource, the frequency resource, and the like can be included, for example.

The terminal device 100A that has received the request transmits the shared measurement information including content regarding the radio resources with which the reference signal is transmitted to the terminal device 100B (S352). Furthermore, the terminal device 100A transmits the known reference signal to the terminal device 100B, using the radio resources according to the shared measurement information (S353).

Meanwhile, the terminal device 100B receives the known reference signal, assuming that the reference signal is transmitted from the terminal device 100A using the radio resources according to the specification on the basis of the shared measurement information given in notification from the terminal device 100A, and executes the communication quality measurement for the sidelink between the terminal device 100A and the terminal device 100B (S354).

That is, here, the terminal device 100B can grasp the radio resources (for example, the time resource, the frequency resource, and the like) with which the terminal device 100A transmits the reference signal from the notification. Therefore, the terminal device 100B can measure the communication quality of the sidelink with the terminal device 100A by receiving the signal transmitted with the radio resources.

In steps S355 to S357, the measurement result of the communication quality measurement for the sidelink is fed back to devices (communication devices) such as the terminal device 100A and the base station device 200, similarly to steps S305 to S307 in FIG. 14 above.

The procedure of the communication quality for the sidelink between the terminal device 100A and the terminal device 100B in the case where the terminal device 100 gives an instruction on the measurement has been described.

Note that, even in FIG. 15, the processing executed by the terminal devices 100A and 100B can be implemented by, for example, operating each unit of the wireless communication unit 117 under the control of the communication control unit 171 or the central control unit 111, similarly to FIG. 14 above.

Furthermore, in the procedures illustrated in FIGS. 14 and 15, the description has been made such that the terminal device 100B measures the communication quality for the sidelink while the terminal device 100A transmits the reference signal. However, conversely, the terminal device 100A may measure the communication quality for the sidelink while the terminal device 100B transmits the reference signal.

(Sensing of Surrounding Environment)

In the embodiment of the present technology, in a case of measuring the communication quality by the terminal device 100, the measurement can be performed by sensing information of a surrounding environment by a function to sense the surrounding environment. Information obtained by sensing the surrounding environment (hereinafter, referred to as surrounding environment information) can be the following information, for example:

(a) position information;
(b) moving speed and direction;
(c) peripheral image, video, and audio; and
(d) weather and meteorological information.

As the position information of (a), the position information such as a current position of a target and the like can be obtained by using, for example, a positioning system such as a global positioning system (GPS), a global navigation satellite system (GNSS), or a navigation satellites with time and ranging (NAVSTAR) satellite.

As the moving speed and direction of (b), information regarding the moving speed and direction of a target can be obtained by using, for example, an acceleration sensor, a three-axis sensor, and the like.

As the peripheral image, video, and audio of (c), information regarding image data, audio data, and the like of a target can be obtained by using, for example, an image sensor, a camera, a microphone, and the like.

As the weather and meteorological information of (d), weather and meteorological information of a target can be obtained by using, for example, an image sensor, a camera, a microphone, a temperature sensor, a humidity sensor, and the like.

Note that the surrounding environment information listed in (a) to (d) is examples, and another information may be obtained by sensing the surrounding environment.

Furthermore, the surrounding environment information listed in (a) to (d) can be detected by, for example, the sensor 142 of the UI input unit 113 (FIG. 5 or 6). That is, the sensor 142 can detect at least one piece of position information, motion information (moving speed and direction), image information (image and video), audio information, or weather information, as the surrounding environment information.

Moreover, in the measurement (sensing) of the surrounding environment information, a request to the base station device 200 or the another terminal device 100 is unnecessary. Therefore, for example, the terminal device 100 can sense the surrounding environment at its own unique timing, cycle, or frequency.

(Configuration of Database)

In the embodiment of the present technology, the measurement result of the communication quality and the surrounding environment information collected from the terminal device 100 by the base station device 200 or the OAM server 350 are further aggregated to the DB server 360. Then, the DB server 360 configures a database, or reconfigures or updates content of the database on the basis of the measurement result of the aggregated communication quality and surrounding environment information.

FIG. 16 is a diagram illustrating a configuration example of a database based on the measurement result of the communication quality measurement and the like.

As illustrated in FIG. 16, the database includes, for example, a measurement time, an area ID, a measurement position, a frequency band of a measurement target (measurement frequency band), communication quality for each communication method (communication standard), communication quality for each carrier, and the like. Note that, as the area ID, a base station ID, a TRP ID, a cell ID, or the like can be used, for example. Furthermore, as the measurement position, a base station position, a TRP position, a cell position, or the like can be used, for example.

In recording the communication quality in the database, the measurement result measured by the individual terminal (for example, the terminal device 100) may be recorded as it is, or a value obtained by applying special processing (such as averaging processing, for example) to data collected from the same area range may be recorded, for example. Note that the same area range referred here is a range in which a certain base station device 200 covers the communication, a cell range, or the like, for example.

Furthermore, in averaging data in the area range, all of measurement results recorded (stored) so far may be averaged, or the processing may be performed for a measurement result of a certain time range, (for example, every minute, every 10 minutes, every hour, every day, or the like). In this case, as a value of the measurement time in the database, a representative value of the time range or the like can be adopted, for example.

The measurement position may be recorded in an xyz coordinate system or may be recorded in a latitude and longitude format and the like, for example. The measurement frequency band may be recorded in a carrier frequency format such as 2 GHz, 2.4 GHz, 3.5 GHz, 5 GHz, 28 GHz, or 60 GHz, or may be recorded, for example, in a format of a number or an ID assigned to the frequency band or the frequency channel or in a format of a number or an ID assigned to the component carrier or the like, the resource block, or the like.

As the communication quality for the communication method and the carrier, for example, information such as throughput, delay (latency), error rate, in-range/out-of-range, or the like in the area at the time (area and time) is desirably recorded. Here, as the throughput at the area and time, a data rate, a frequency use efficiency, or the like can be included, for example. Furthermore, as the error rate, a bit error rate (BER), a packet error rate (PER), a block error rate (BLER), or the like can be included, for example.

Note that, in the first place, in a case where the target communication method and carrier are not available at the area and time, a value (for example, NULL or the like) or the like indicating the unavailability may be recorded. Furthermore, the communication quality may be recorded for each link type such as an uplink, a downlink, or a sidelink.

Furthermore, the above description has been given on the assumption that the OAM server 350 and the DB server 360 are different devices. However, the OAM server 350 and the DB server 360 may be configured as the same device as operations, administration, maintenance and provisioning (OAM&P), or the like, for example.

(Selection, Switching, and Combining Frequency Band)

In the embodiment of the present technology, information (hereinafter referred to as communication quality information) as to what communication quality can be expected in an area such as a base station area or a cell area can be provided to the terminal device 100 and the base station device 200 on the basis of the information recorded in the database illustrated in FIG. 16.

(Procedure for Providing Communication Quality Information)

FIG. 17 is a diagram illustrating an example of a procedure for providing communication quality information. In the example of this procedure, the DB server 360 provides communication quality information to the terminal devices 100A and 100B and the base station device 200.

The DB server 360 constructs and updates the database on the basis of the measurement result of the communication quality measurement and the surrounding environment information (S401). Here, construction and update of the database illustrated in FIG. 16 above are performed. The DB server 360 gives a notification of (transmits) the communication quality information obtained from the information recorded in the database to the base station device 200 (S402).

The base station device 200 gives a notification of (transmits) the communication quality information transmitted from the DB server 360 to the terminal devices 100A and 100B under its control (S403).

The terminal device 100A determines a communication method and a carrier to be used on the basis of the communication quality information transmitted from the base station device 200 (S404A). Meanwhile, the terminal device 100B determines a communication method and a carrier to be used on the basis of the communication quality information transmitted from the base station device 200 (S404B).

When the processing in steps S403, S404A, and S404B ends, the processing proceeds to step S405. In step S405, the vehicle-to-vehicle communication using a sidelink between the terminal device 100A and the terminal device 100B, vehicle-to-road communication between the terminal device 100A or the terminal device 100B and a traffic light, a road sign, a roadside device, or the like, for example, is performed on the basis of determination results of steps S404A and S404B.

Here, as illustrated in FIG. 17, the DB server 360 once provides the communication quality information to the base station device 200, and the base station device 200 provides the communication quality information to the terminal device 100 under the control, to cause the base station device 200 to have a notification role, thereby reducing a communication load with an individual terminal device 100, which occurs in the DB server 360.

However, the DB server 360 may individually notify the terminal devices 100A and 100B of the communication quality information without via the base station device 200.

Note that, in FIG. 17, the processing executed by the terminal devices 100A and 100B can be implemented by, for example, operating each unit of the wireless communication unit 117 under the control of the communication control unit 171 and the like.

The procedure for providing the communication quality information has been described.

(Selection and Setting Communication Method and Carrier)

Figure 18:
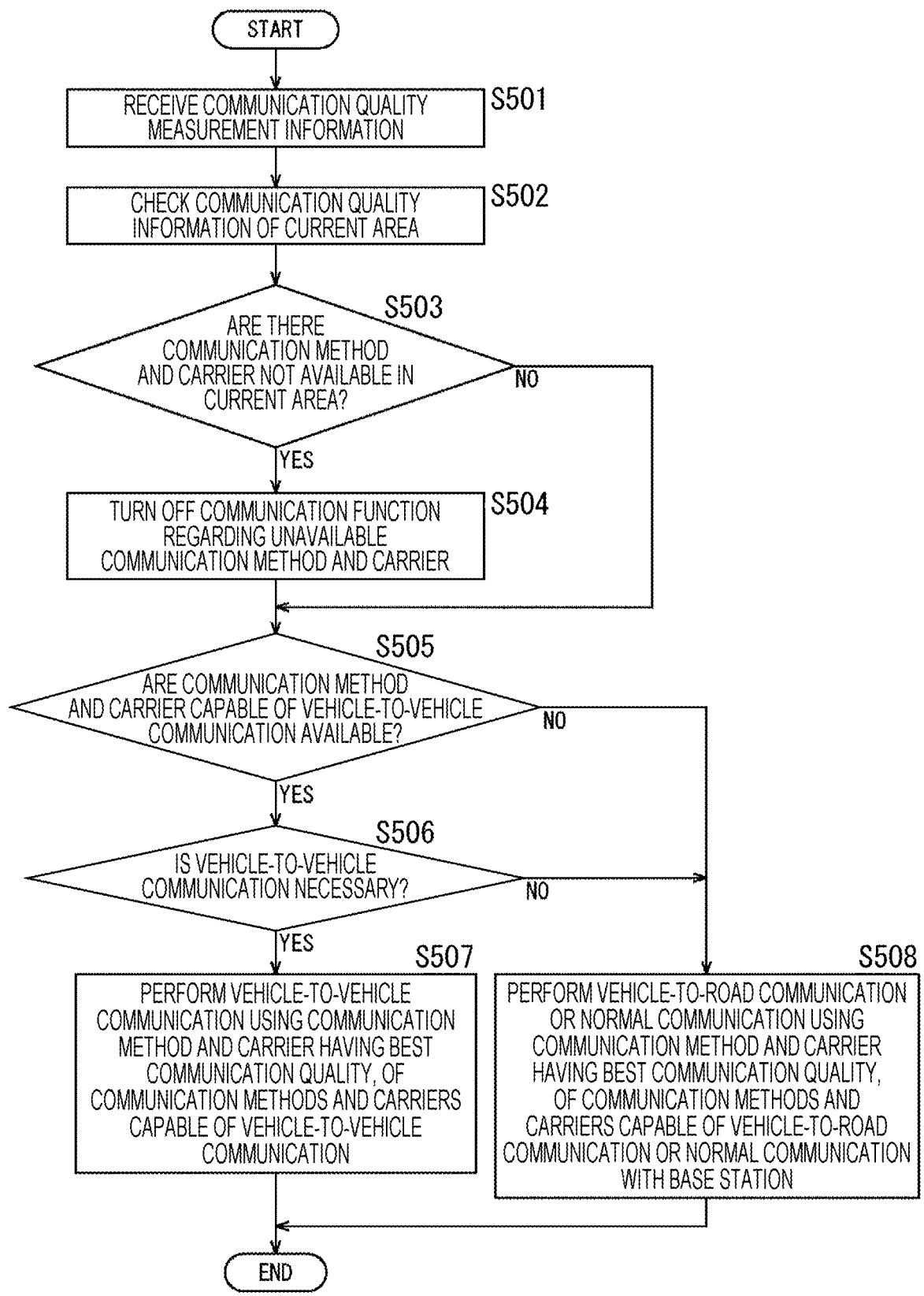
FIG. 18 is a flowchart for describing a flow of communication method and carrier selection and setting processing based on the communication quality information.

FIG. 18 is a flowchart for describing a flow of communication method and carrier selection and setting processing based on the communication quality information executed by the terminal device 100.

In step S501, the terminal device 100 receives the communication quality information from the base station device 200 or the DB server 360.

In step S502, the terminal device 100 checks the communication quality information of a current area by reference to the communication quality information received in the processing in step S501.

Note that the communication quality information to be checked here is not limited to of the current area, and for example, the communication quality information of an area of next destination, the communication quality information of a base station, a cell, or the like connected currently or at the next destination may be checked. In the following description, a case of checking the communication quality information of the current area will be described as an example.

In step S503, the terminal device 100 determines whether or not there are a communication method and a carrier not available in the current area on the basis of the communication quality information of the current area checked in the processing in step S502.

Note that, in the determination processing here, not only whether or not there are a communication method and a carrier not available in the current area but also whether or not the communication method and the carrier cannot satisfy predetermined communication quality even if the communication method and the carrier are available in the current area may be determined, for example.

In step S503, in a case where it is determined that there are the communication method and the carrier not available in the current area, the processing proceeds to step S504.

In step S504, the terminal device 100 turns off a communication function related to the communication method and the carrier not available in the current area. Note that, here, a communication function related to the communication method and the carrier that do not satisfy the predetermined communication quality may be turned off. However, in a case where only such a communication method and a carrier are present in the target area, the function related to the communication method and the carrier may not be turned off.

When the processing in step S504 ends, the processing proceeds to step S505. Furthermore, in step S503, in a case where it is determined that there is no communication method and carrier not available in the current area, the processing in step S504 is skipped and the processing proceeds to step S505.

In step S505, the terminal device 100 determines whether or not a communication method and a carrier capable of vehicle-to-vehicle communication are available on the basis of the communication quality information of the current area checked in the processing in step S502.

In step S505, in a case where it is determined that the communication method and the carrier capable of vehicle-to-vehicle communication are available, the processing proceeds to step S506.

In step S506, the terminal device 100 determines whether or not the vehicle-to-vehicle communication is necessary. Note that, here, as a scene where the vehicle-to-vehicle communication is necessary in the terminal device 100, for example, a case of using a sidelink and the like is assumed.

In step S506, in a case where it is determined that the vehicle-to-vehicle communication is necessary, the processing proceeds to step S507.

In step S507, the terminal device 100 performs the vehicle-to-vehicle communication, using the communication method and the carrier having the best communication quality in communication methods and carriers capable of vehicle-to-vehicle communication.

Note that, here, the communication method and the carrier to be used are not limited to the communication method and the carrier capable of providing the best communication quality, and a communication method and a carrier having communication quality that satisfy a predetermined condition may be selected, for example.

In a case where it is determined that the communication method and the carrier capable of vehicle-to-vehicle communication are not available in step S505, or in a case where it is determined that the vehicle-to-vehicle communication is not necessary in step S506, the processing proceeds to step S508.

In step S508, the terminal device 100 performs the vehicle-to-road communication or normal communication with a base station, using the communication method and the carrier having the best communication quality in communication methods and carriers capable of vehicle-to-road communication or normal communication with a base station.

Note that, here, as the communication method and the carrier to be used, a communication method and a carrier having communication quality that satisfy a predetermined condition may be selected, for example, similarly to the processing in step S507.

When the processing in step S507 or S508 ends, the communication method and carrier selection and setting processing is terminated.

The communication method and carrier selection and setting processing has been described.

Note that, in FIG. 18, the processing executed by the terminal device 100 can be implemented by, for example, operating each unit of the wireless communication unit 117 under the control of the communication control unit 171 and the like. Furthermore, in FIG. 18, both the communication method and the carrier have been determined and set. However, an embodiment is not limited thereto, and either one of the communication method and the carrier may be determined and set.

Furthermore, here, the description has been given such that the terminal device 100 executes the processing illustrated in FIG. 18. However, the base station device 200 may execute the processing illustrated in FIG. 18 and select and set the communication method and the carrier to be actually used on the basis of the communication quality information. Moreover, the determination condition illustrated in FIG. 18 is an example, and the communication method and the carrier to be used may be selected using another determination condition.

(Provision of Communication Quality Information at Initial Connection and Handover)

Here, when assuming a case where the terminal device 100 does not have the communication quality information, the terminal device 100 needs to perform, for example, sensing and exchange data many times in order to determine which communication method and carrier are to be used.

Meanwhile, the terminal device 100 is expected to reduce such sensing and exchange of data with a base station if the terminal device 100 can receive the communication quality information from the DB server 360 or the base station device 200 at the time of initial connection or handover.

Figure 19:
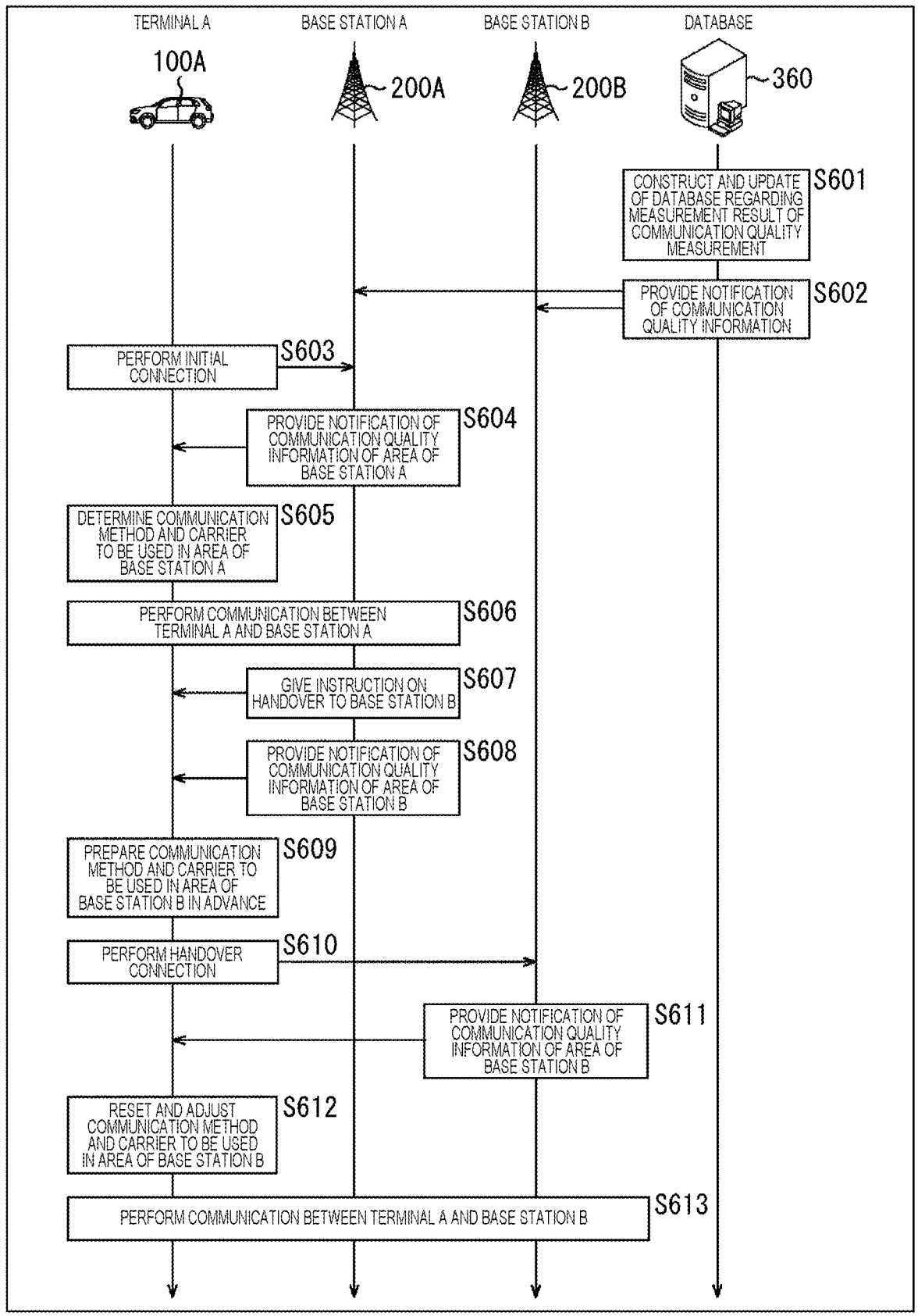
FIG. 19 is a diagram illustrating an example of a procedure in a case of providing the communication quality information at the time of initial connection or handover.

FIG. 19 is a diagram illustrating an example of a procedure in a case of providing the communication quality information at the time of initial connection or handover. In the example of this procedure, the DB server 360 provides the communication quality information to the terminal device 100A and base station devices 200A and 200B. Note that the base station device 200A and the base station device 200B are adjacent base stations.

The DB server 360 constructs and updates the database on the basis of the measurement result of the communication quality measurement and the surrounding environment information (S601). Here, construction and update of the database illustrated in FIG. 16 above are performed.

Furthermore, the DB server 360 gives a notification of (transmits) the communication quality information obtained from the information recorded in the database to the base station devices 200A and 200B (S602). Thereby, the base station devices 200A and 200B can hold the communication quality information. The communication quality information includes not only area information of its own base station but also area information of another base station.

Since the terminal device 100A is present in the area of the base station device 200A, the terminal device 100A is connected to the base station device 200A at the time of initial connection (S603).

The base station device 200A gives a notification of (transmits) the communication quality information of its own area to the initially connected terminal device 100A (S604).

Thereby, the terminal device 100A can acquire the communication quality information of the area of the base station device 200A. The terminal device 100A determines the communication method and the carrier to be used in the area of the base station device 200A on the basis of the communication quality information from the base station device 200A (S605).

Here, for example, the processing illustrated in FIG. 18 is executed, and the communication method and the carrier having the best communication quality or having the communication quality that satisfies the predetermined condition are determined in the communication methods and carriers capable of normal communication with the base station device 200A.

Thereby, communication is performed between the terminal device 100A and the base station device 200A (S606).

Thereafter, when a state is switched such that the terminal device 100A can communicate with the base station device 200B having a stronger radio wave than the base station device 200A due to movement of the terminal device 100A, for example, the base station device 200A instructs the terminal device 100A to perform a handover to the base station device 200B (S607).

Furthermore, the base station device 200A transmits the communication quality information of the area of the base station device 200B to the terminal device 100A (S608).

The terminal device 100A determines the communication method and the carrier to be used in the area of the base station device 200B on the basis of the communication quality information from the base station device 200A (the communication quality information of the area of the base station device 200B) (S609).

Here, for example, the processing illustrated in FIG. 18 is executed, and the communication method and the carrier having the best communication quality or having the communication quality that satisfies the predetermined condition are selected from among the communication methods and carriers capable of normal communication with the base station device 200B, and a preparation at the time of handover connection is performed.

Then, the terminal device 100A is connected to the base station device 200B at the time of handover connection to switch the base station to be connected from the base station device 200A to the base station device 200B (S610).

The base station device 200B transmits the communication quality information of its own area to the terminal device 100A connected by handover (S611).

The terminal device 100A determines the communication method and the carrier to be used in the area of the base station device 200B on the basis of the communication quality information from the base station device 200B (S612).

Here, for example, the processing illustrated in FIG. 18 is executed, and the communication method and the carrier having the best communication quality or having the communication quality that satisfies the predetermined condition are reset in the communication methods and carriers capable of normal communication with the base station device 200B, and adjustment is performed.

Thereby, communication is performed between the terminal device 100A and the base station device 200B (S613).

The procedure of providing the communication quality information at the time of initial connection and handover connection has been described.

As illustrated in FIG. 19, when the base station device 200A instructs the terminal device 100A to perform a handover to the base station device 200B, the base station device 200A can provide the communication quality information in the area of the base station device 200B. With the configuration, the terminal device 100A can predict in advance and prepare the communication method and the carrier having a high possibility of use in the area of the base station device 200B or the like before completing the handover.

Note that the terminal device 100A can receive a notification of the communication quality information in the area of the base station device 200B or the like from the base station device 200B even after completion of the handover. However, if the preparation is ready in advance, an overhead of readjustment and transfer to a normal operation can be reduced.

Furthermore, the DB server 360 or the base station device 200A may notify the terminal device 100A in advance of the communication quality information of an area other than the area of an adjacent base station (for example, the base station device 200B that is a handover destination).

For example, in a case where the terminal device 100A is built in or externally mounted to a vehicle, and information regarding a route to a destination is known by the DB server 360, the OAM server 350, the base station device 200 and the like, the communication quality information of the area of the base station device 200 and the like on the route and around the route may be given in notification in advance to the terminal device 100A.

At that time, the communication quality information corresponding to a time when the terminal device 100A is about to reach each area (for example, a measurement result close to the time to reach each area) may be provided in consideration of a moving speed, a moving state, and the like of the terminal device 100A, for example. With the configuration, the size of data to be sent to the terminal device 100A can be reduced and the network load and the radio resource use efficiency can be enhanced.

Note that, in FIG. 19, the processing executed by the terminal device 100A can be implemented by, for example, operating each unit of the wireless communication unit 117 under the control of the communication control unit 171 and the like.

Note that, by applying the present technology to a transportation system, distribution of safety information regarding vehicles can be efficiently and reliably implemented by using the communication function, in particular, the communication function of a cellular system. Furthermore, a control method for enabling a terminal device and a vehicle device that have received distributed information to actually perform safe operation can be implemented.

Furthermore, in the embodiments of the present technology, the network refers to a mechanism in which at least two devices are connected and information can be transmitted from one device to another device. At this time, the devices that communicate via the network may be independent devices or may be internal blocks constituting one device.

Furthermore, in the embodiment of the present technology, the communication includes not only wireless communication and wired communication but also communication in which the wireless communication and the wired communication are mixed, that is, communication in which the wireless communication is performed in a certain section and the wired communication is performed in another section. Moreover, communication from a certain device to another device may be performed by the wired communication and communication from another device to a certain device may be performed by the wireless communication.

<2. Configuration of Wireless Communication System>

In the embodiment of the present technology, a wireless communication system includes at least the base station device 200 and the terminal device 100. The base station device 200 can accommodate a plurality of terminal devices 100. The base station device 200 can be connected to another base station device 200 by means of the X2 interface. Furthermore, the base station device 200 can be connected to an evolved packet core (EPC) by means of the S1 interface.

Moreover, the base station device 200 can be connected to a mobility management entity (MME) by means of an S1-MME interface, and can be connected to a serving gateway (S-GW) by means of an S1-U interface. The S1 interface supports many-to-many connection between the MME and/or S-GW and the base station device 200. Furthermore, in the embodiment of the present technology, each of the base station device 200 and the terminal device 100 supports the LTE and/or the NR.

(Radio Access Technology of Present Technology)

In the embodiment of the present technology, each of the base station device 200 and the terminal device 100 supports one or more radio access technologies (RATs). For example, the RAT includes the LTE and the NR. One RAT corresponds to one cell (component carrier). That is, in a case where a plurality of RATs is supported, those RATs respectively correspond to different cells.

In the embodiment of the present technology, a cell is a combination of a downlink resource, an uplink resource, and/or a sidelink. Furthermore, in the following description, a cell corresponding to the LTE is called an LTE cell, and a cell corresponding to the NR is called an NR cell.

Downlink communication is communication from the base station device 200 to the terminal device 100. Uplink communication is communication from the terminal device 100 to the base station device 200. Sidelink communication is communication from the terminal device 100 to another terminal device 100.

The sidelink communication is defined for direct proximity detection and direct communication between terminal devices. The sidelink communication can have a similar frame configuration to an uplink and a downlink. Furthermore, the sidelink communication may be limited to a part (subset) of the uplink resource and/or the downlink resource.

The base station device 200 and the terminal device 100 can support communication using a set of one or more cells in the downlink, the uplink, and/or the sidelink. The set of a plurality of cells is also referred to as carrier aggregation or dual connectivity. Details of carrier aggregation and dual connectivity will be described below. Furthermore, each cell has a predetermined frequency bandwidth. The maximum value, minimum value, and settable value in a predetermined frequency bandwidth can be defined in advance.

(Setting of Component Carrier)

Figure 20:
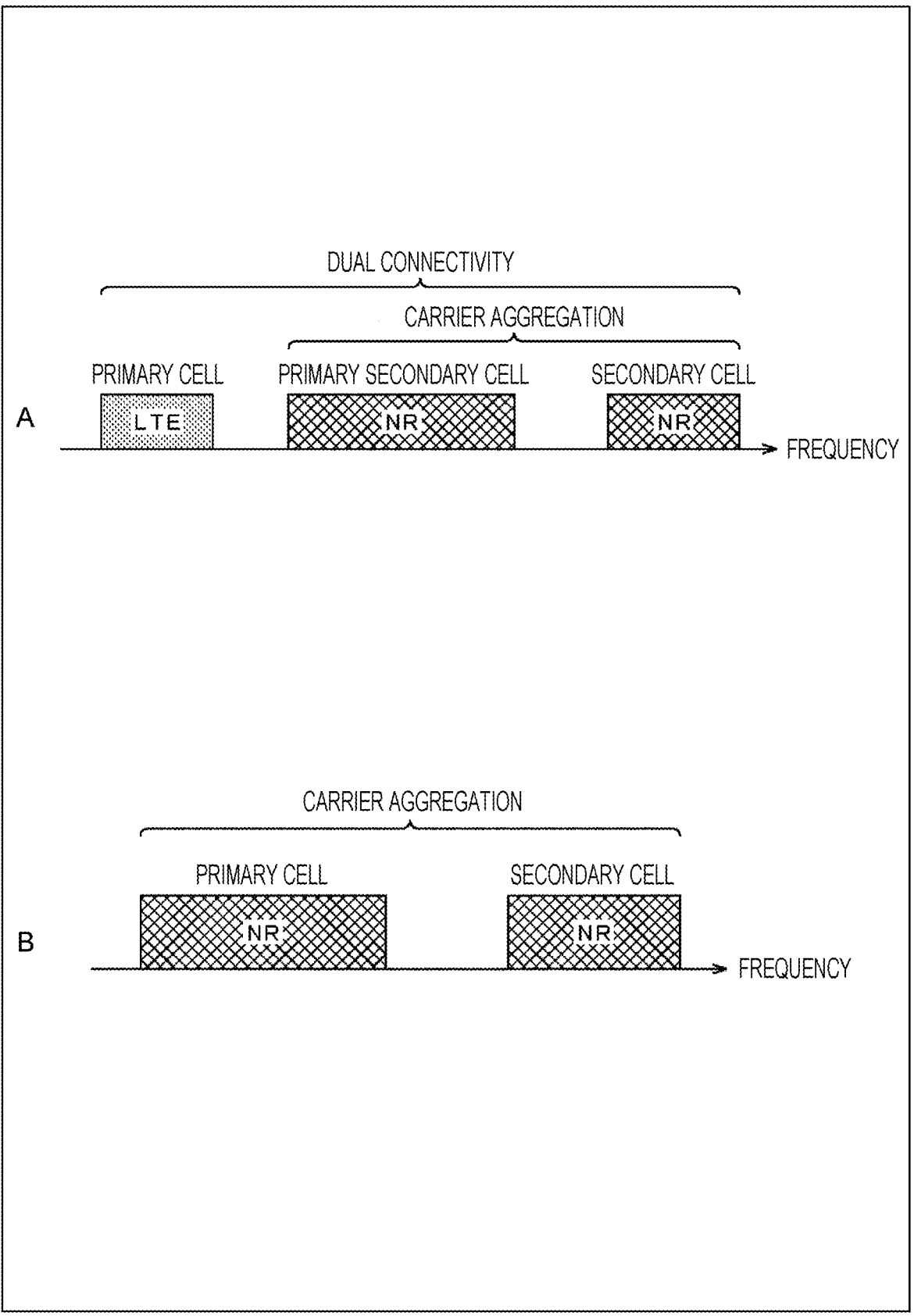
FIG. 20 is a diagram illustrating an example of setting a component carrier according to the embodiment of the present technology.

FIG. 20 is a diagram illustrating an example of setting a component carrier according to the embodiment of the present technology.

In an example A in FIG. 20, one LTE cell and two NR cells are set. One LTE cell is set as a primary cell. The two NR cells are respectively set as a primary secondary cell and a secondary cell. The two NR cells are integrated by carrier aggregation.

Furthermore, the LTE cell and the NR cells are integrated by dual connectivity. Note that the LTE cell and the NR cell may be integrated by carrier aggregation. In the example A in FIG. 20, the NR can be assisted by the LTE cell as a primary cell in connection, and thus the NR do not need to support some function such as a function to communication standalone. The function to communication standalone includes a function necessary for initial connection.

In an example B in FIG. 20, two NR cells are set. The two NR cells are respectively set as a primary cell and a secondary cell, and are integrated by carrier aggregation. In this case, since the NR cell supports the function to communicate standalone communication, the assistance by an LTE cell is not required. Note that the two NR cells may be integrated by dual connectivity.

(Configuration of Radio Frame)

In the embodiment of the present technology, a radio frame configured by 10 milliseconds (ms) is defined. Each radio frame includes two half frames.

A time interval of the half frame is 5 ms. Each half frame includes five subframes. The time interval of the subframe is 1 ms and is defined by two consecutive slots. The time interval of the slot is 0.5 ms. The i-th subframe in the radio frame includes a (2×i)-th slot and a (2×i+1)-th slot. That is, in each radio frame, ten subframes are defined.

The subframe includes a downlink subframe, an uplink subframe, a special subframe, a sidelink subframe, and the like.

The downlink subframe is a subframe reserved for downlink transmission. The uplink subframe is a subframe reserved for uplink transmission. The special subframe includes three fields.

The three fields include a downlink pilot time slot (DwPTS), a guard period (GP), and an uplink pilot time slot (UpPTS). The total length of the DwPTS, GP, and UpPTS is 1 ms. The DwPTS is a field reserved for downlink transmission. The UpPTS is a field reserved for uplink transmission. The GP is a field in which the downlink transmission and the uplink transmission are not performed.

Note that the special subframe may include only by the DwPTS and GP or may include only by the GP and UpPTS. The special subframe is arranged between the downlink subframe and the uplink subframe in TDD, and is used for switching a subframe from the downlink subframe to the uplink subframe. The sidelink subframe is a subframe reserved or set for sidelink communication. The sidelink is used for direct proximity communication and direct proximity detection between terminal devices.

A single radio frame includes a downlink subframe, an uplink subframe, a special subframe, and/or a sidelink subframe. Furthermore, the single radio frame may include only a downlink subframe, an uplink subframe, a special subframe, or a sidelink subframe.

A plurality of radio frame configurations is supported. The radio frame configuration is defined by a frame configuration type. A frame configuration type 1 is applicable only to FDD. A frame configuration type 2 is applicable only to TDD. A frame configuration type 3 is applicable only to the operation of a licensed assisted access (LAA) secondary cell.

In the frame configuration type 2, a plurality of uplink-downlink configurations is defined. In the uplink-downlink configuration, each of ten subframes in one radio frame corresponds to one of the downlink subframe, the uplink subframe, and the special subframe. A subframe 0, a subframe 5, and the DwPTS are always reserved for downlink transmission. The UpPTS and a subframe immediately following the special subframe are always reserved for uplink transmission.

In frame configuration type 3, ten subframes in one radio frame are reserved for downlink transmission. The terminal device 100 can treat the PDSCH or a subframe in which a detection signal is not transmitted as an empty subframe. The terminal device 100 assumes that no signal and/or channel is present in a subframe unless a predetermined signal, a channel and/or downlink transmission is detected in the subframe.

The downlink transmission is occupied by one or a plurality of consecutive subframes. The first subframe of the downlink transmission may start anywhere within the subframes. The last subframe of the downlink transmission may be either completely occupied or occupied at time intervals defined by the DwPTS.

Note that, in frame configuration type 3, the ten subframes in one radio frame may be reserved for uplink transmission. Furthermore, each of the ten subframes in one radio frame may correspond to one of the downlink subframe, the uplink subframe, the special subframe, and the sidelink.

The base station device 200 may transmit a physical downlink channel and a physical downlink signal in the DwPTS of the special subframe. The base station device 200 can restrict transmission of the PBCH in the DwPTS of the special subframe. The terminal device 100 may transmit a physical uplink channel and a physical uplink signal in the UpPTS of the special subframe. The terminal device 100 can limit transmission of some physical uplink channels and physical uplink signals in the UpPTS of the special subframe.

(Configuration of LTE Frame)

Figure 21:
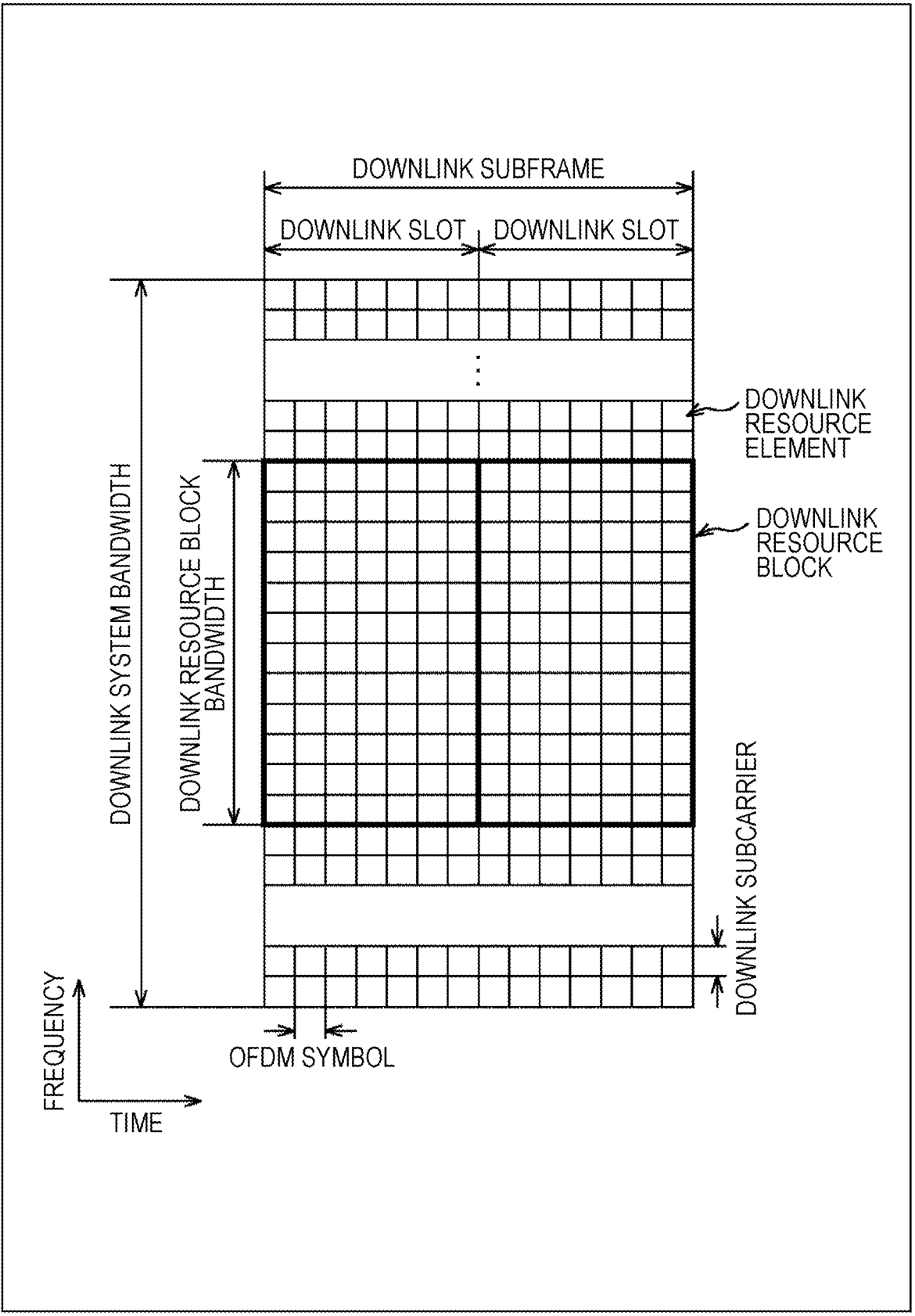
FIG. 21 is a diagram illustrating an example of an LTE downlink subframe according to the embodiment of the present technology.

FIG. 21 is a diagram illustrating an example of an LTE downlink subframe according to the embodiment of the present technology. The diagram illustrated in FIG. 21 is also called LTE downlink resource grid. The base station device 200 can transmit an LTE physical downlink channel and/or an LTE physical downlink signal in the downlink subframe to the terminal device 100. The terminal device 100 can receive the LTE physical downlink channel and/or the LTE physical downlink signal in the downlink subframe from the base station device 200.

Figure 22:
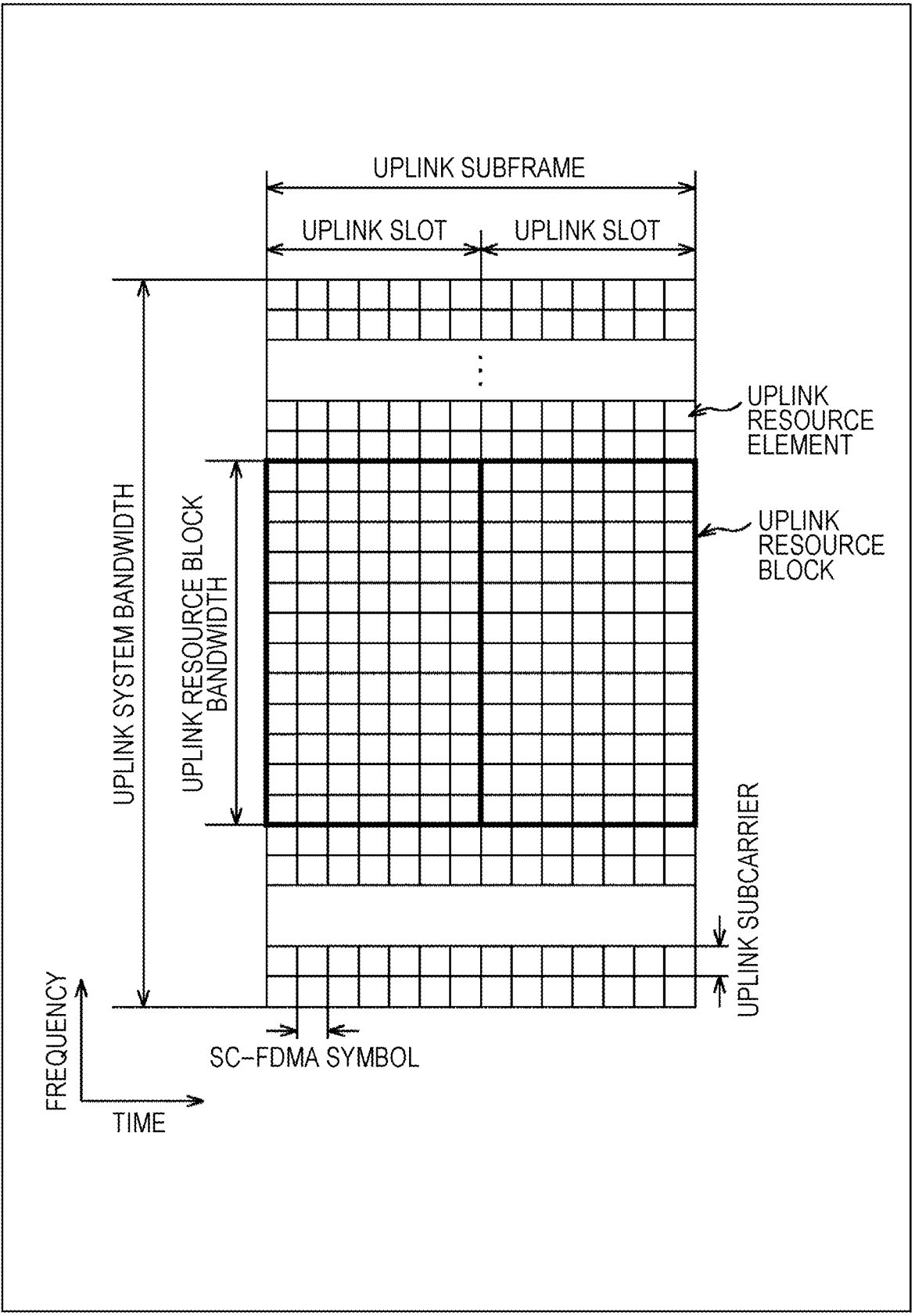
FIG. 22 is a diagram illustrating an example of an LTE uplink subframe according to the embodiment of the present technology.

FIG. 22 is a diagram illustrating an example of an LTE uplink subframe according to the embodiment of the present technology. The diagram illustrated in FIG. 22 is also called LTE uplink resource grid. The terminal device 100 can transmit an LTE physical uplink channel and/or an LTE physical uplink signal in the uplink subframe to the base station device 200. The base station device 200 can receive the LTE physical uplink channel and/or the LTE physical uplink signal in the uplink subframe from the terminal device 100.

In the embodiment of the present technology, LTE physical resources may be defined as follows. One slot is defined by a plurality of symbols. A physical signal or a physical channel transmitted in each slot is represented by a resource grid.

In the downlink, a resource grid is defined by a plurality of subcarriers in a frequency direction and a plurality of OFDM symbols in a time direction. In the uplink, a resource grid is defined by a plurality of subcarriers in the frequency direction and a plurality of SC-FDMA symbols in the time direction. The number of subcarriers or resource blocks may be determined depending on the bandwidth of the cell.

The number of symbols in one slot is determined by the type of cyclic prefix (CP). The type of the CP is normal CP or extended CP. In the normal CP, the number of OFDM symbols or SC-FDMA symbols constituting one slot is seven. In the extended CP, the number of OFDM symbols or SC-FDMA symbols constituting one slot is six.

Each element in the resource grid is called resource element. The resource element is identified using an index (number) of a subcarrier and an index (number) of a symbol. Note that, in the description of the embodiment of the present technology, the OFDM symbol or the SC-FDMA symbol is simply referred to as a symbol.

The resource block is used for mapping a certain physical channel (such as PDSCH or PUSCH) to the resource element. The resource block includes a virtual resource block and a physical resource block. The certain physical channel is mapped to a virtual resource block. The virtual resource block is mapped to a physical resource block.

One physical resource block is defined by a predetermined number of consecutive symbols in a time domain. One physical resource block is defined by a predetermined number of consecutive subcarriers in a frequency domain. The number of symbols and the number of subcarriers in one physical resource block are determined on the basis of the type of the CP in the cell, a subcarrier interval, and/or a parameter set by an upper layer, and the like.

For example, when the type of the CP is the normal CP and the subcarrier interval is 15 kHz, the number of symbols in one physical resource block is seven, and the number of subcarriers is twelve. In that case, one physical resource block includes (7×12) resource elements.

The physical resource blocks are numbered from 0 in the frequency domain. Furthermore, two resource blocks in one subframe to which the same physical resource block number corresponds are defined as a physical resource block pair (PRB pair or RB pair).

In each LTE cell, one predetermined parameter is used in a certain subframe. For example, the predetermined parameter is a parameter (physical parameter) related to a transmission signal. The parameters related to a transmission signal include a CP length, a subcarrier interval, the number of symbols in one subframe (predetermined time length), the number of subcarriers in one resource block (predetermined frequency band), a multiple access method, and a signal waveform, and the like.

That is, in the LTE cell, the downlink signal and the uplink signal are generated using one predetermined parameter in a predetermined time length (for example, a subframe). In other words, it is assumed that the downlink signal transmitted from the base station device 200 and the uplink signal to be transmitted to the base station device 200 are generated with one predetermined parameter in a predetermined time length in the terminal device 100.

Furthermore, the base station device 200 is set such that the downlink signal to be transmitted to the terminal device 100 and the uplink signal transmitted from the terminal device 100 are generated with one predetermined parameter in a predetermined time length.

(Configuration of NR Frame)

In each NR cell, one or more predetermined parameters are used in a certain predetermined time length (for example, a subframe). That is, in the NR cell, the downlink signal and the uplink signal are generated using one or more predetermined parameters in a predetermined time length.

In other words, it is assumed that the downlink signal transmitted from the base station device 200 and the uplink signal to be transmitted to the base station device 200 are generated with one or more predetermined parameters in a predetermined time length in the terminal device 100.

Furthermore, the base station device 200 can be set such that the downlink signal to be transmitted to the terminal device 100 and the uplink signal transmitted from the terminal device 100 are generated with one or more predetermined parameters in a predetermined time length. In a case where a plurality of predetermined parameters is used, signals generated using the predetermined parameters are multiplexed by a predetermined method.

For example, the predetermined method includes frequency division multiplexing (FDM), time division multiplexing (TDM), code division multiplexing (CDM), spatial division multiplexing (SDM), and/or the like.

A plurality of types of combinations of predetermined parameters set in the NR cell can be defined in advance as parameter sets.

FIG. 23 is a diagram illustrating an example of parameter sets regarding a transmission signal in an NR cell according to the embodiment of the present technology. In the example in FIG. 23, the parameters regarding a transmission signal included in a parameter set are a subframe interval, the number of subcarriers per resource block in the NR cell, the number of symbols per subframe, and a CP length type. The CP length type is a type of the CP length used in the NR cell.

For example, a CP length type 1 corresponds to the normal CP in the LTE, and a CP length type 2 corresponds to the extended CP in the LTE.

A parameter set regarding a transmission signal in the NR cell can be individually defined for the downlink and the uplink. Furthermore, a parameter set regarding a transmission signal in the NR cell can be independently set for the downlink and the uplink.

Figure 24:
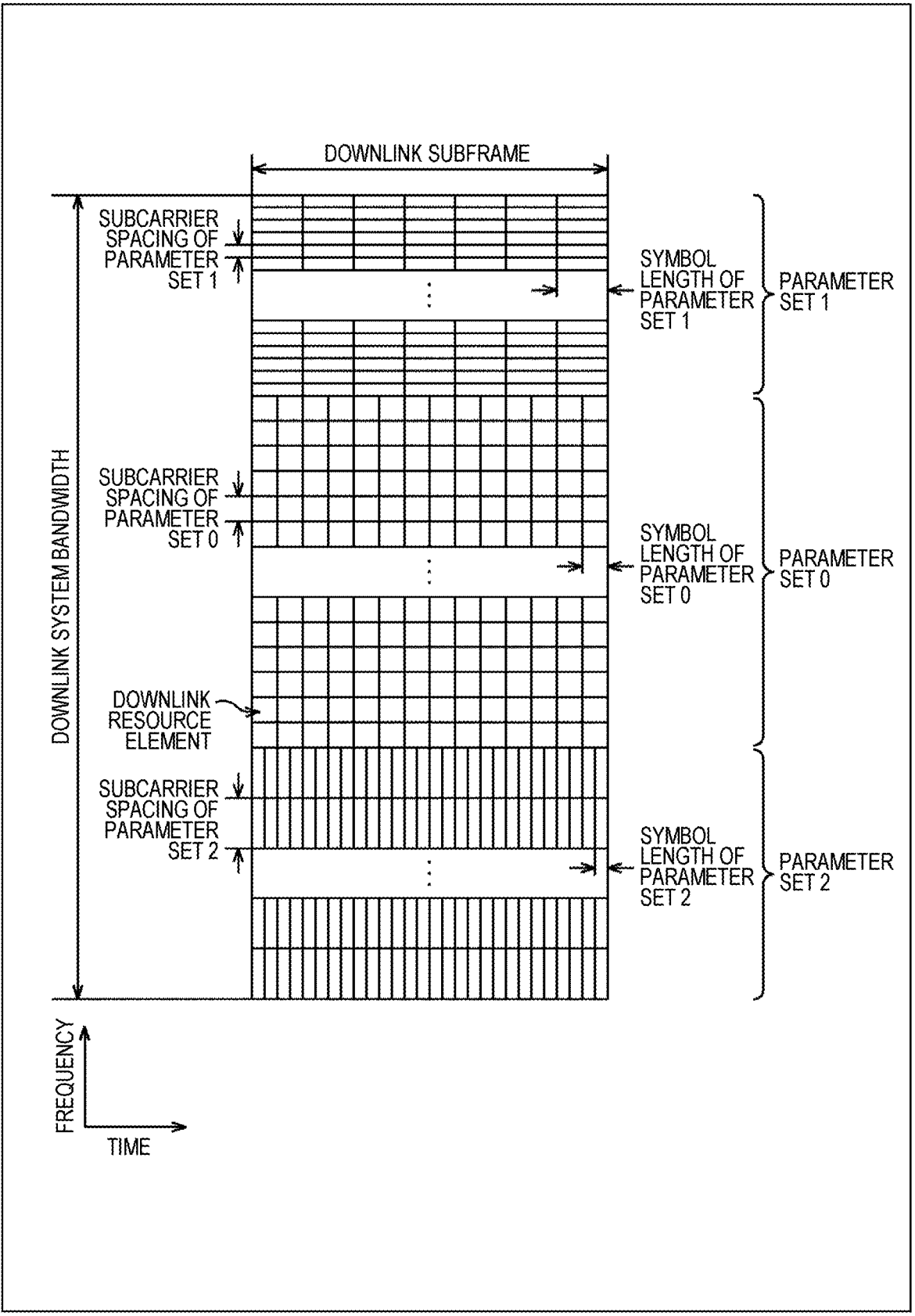
FIG. 24 is a diagram illustrating an example of an NR downlink subframe according to the embodiment of the present technology.

FIG. 24 is a diagram illustrating an example of the downlink subframe of the NR according to the embodiment of the present technology. In the example in FIG. 24, signals generated using a parameter set 1, a parameter set 0, and a parameter set 2 are subjected to FDM in a cell (system bandwidth).

The diagram illustrated in FIG. 24 is also called NR downlink resource grid. The base station device 200 can transmit an NR physical downlink channel and/or an NR physical downlink signal in the downlink subframe to the terminal device 100. The terminal device 100 can receive the NR physical downlink channel and/or the NR physical downlink signal in the downlink subframe from the base station device 200.

Figure 25:
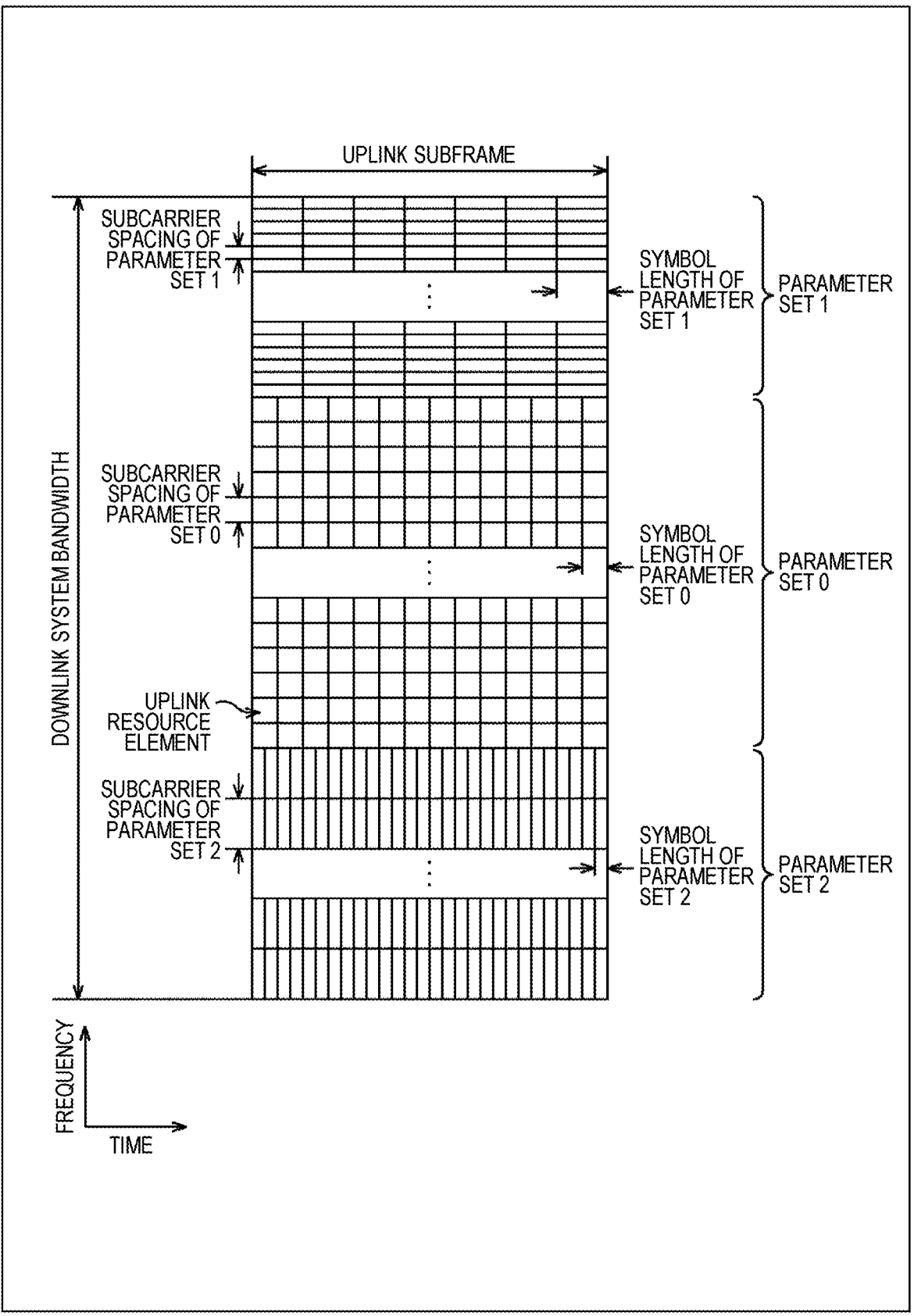
FIG. 25 is a diagram illustrating an example of an NR uplink subframe according to the embodiment of the present technology.

FIG. 25 is a diagram illustrating an example of an NR uplink subframe according to the embodiment of the present technology. In the example in FIG. 25, signals generated using a parameter set 1, a parameter set 0, and a parameter set 2 are subjected to FDM in a cell (system bandwidth).

The diagram illustrated in FIG. 25 is also called NR uplink resource grid. The base station device 200 can transmit an NR physical uplink channel and/or an NR physical uplink signal in the uplink subframe to the terminal device 100. The terminal device 100 can receive the NR physical uplink channel and/or the NR physical uplink signal in the uplink subframe from the base station device 200.

(Physical Channel and Physical Signal)

In the embodiment of the present technology, a physical channel and a physical signal are used. The physical channel includes a physical downlink channel, a physical uplink channel, and a physical sidelink channel. The physical signal includes a physical downlink signal, a physical uplink signal, and a sidelink physical signal.

The physical channel and the physical signal in the LTE are also called LTE physical channel and LTE physical signal, respectively. The physical channel and the physical signal in the NR are also called NR physical channel and NR physical signal, respectively. The LTE physical channel and the NR physical channel can be defined as different physical channels.

The LTE physical signal and the NR physical signal can be defined as different physical signals. In the description of the embodiment of the present technology, the LTE physical channel and the NR physical channel are also simply referred to as physical channels, and the LTE physical signal and the NR physical signal are also simply referred to as physical signals.

That is, the description for physical channels can be applied to both the LTE physical channel and the NR physical channel. The description for physical signals can be applied to both the LTE physical signal and the NR physical signal.

The physical downlink channel includes a physical broadcast channel (PBCH), a physical control format indicator channel (PCFICH), a physical hybrid automatic repeat request indicator channel (PHICH), a physical downlink control channel (PDCCH), an enhanced physical downlink control channel (enhanced PDCCH (EPDCCH)), a machine type communication (MTC) physical downlink control channel (MTC PDCCH (MPDCCH)), a relay physical downlink control channel (Relay PDCCH (R-PDCCH)), a physical downlink shared channel (PDSCH), and a physical multicast channel (PMCH), and the like.

The physical downlink signal includes a synchronization signal (SS), a downlink reference signal (DL-RS), a detection signal (discovery signal (DS)), and the like.

The synchronization signal includes a primary synchronization signal (PSS), a secondary synchronization signal (SSS), and the like.

The reference signal in the downlink includes a cell-specific reference signal (CRS), a UE-specific reference signal associated with PDSCH (PDSCH-DMRS), a demodulation reference signal associated with EPDCCH (EPDCCH-DMRS), a positioning reference signal (PRS), a channel state information-reference signal (CSI-RS), a tracking reference signal (TRS), and the like.

The PDSCH-DMRS is also called URS related to PDSCH or simply called UE-specific reference signal (URS). The EPDCCH-DMRS is also called DMRS related to EPDCCH or simply called DMRS. The PDSCH-DMRS and EPDCCH-DMRS are also simply called DL-DMRSs or downlink demodulation reference signals. The CSI-RS includes non-zero power CSI-RS (NZP CSI-RS). Furthermore, downlink resources include zero power CSI-RS (ZP CSI-RS), channel state information-interference measurement (CSI-IM), and the like.

The physical uplink channels include a physical uplink shared channel (PUSCH), a physical uplink control channel (PUCCH), and a physical random access channel (PRACH), and the like. The physical uplink signal includes an uplink reference signal (UL-RS).

The uplink reference signal includes an uplink demodulation signal (UL-DMRS), a sounding reference signal (SRS), and the like. The UL-DMRS is associated with transmission of the PUSCH or the PUCCH. The SRS is not associated with the transmission of the PUSCH or the PUCCH.

The physical sidelink channel includes a physical sidelink broadcast channel (PSBCH), a physical sidelink control channel (PSCCH), a physical sidelink discovery channel (PSDCH), a physical sidelink shared channel (PSSCH), and the like.

The physical channel and the physical signal are also simply called channel and signal. That is, the physical downlink channel, the physical uplink channel, and the physical sidelink channel are also called downlink channel, uplink channel, and sidelink channel, respectively. The physical downlink signal, the physical uplink signal, and the physical sidelink signal are also called downlink signal, uplink signal, and sidelink signal, respectively.

BCH, MCH, UL-SCH, DL-SCH, SL-DCH, SL-BCH, and SL-SCH are transport channels. A channel used in a medium access control (MAC) layer is called transport channel. The unit of the transport channel used in the MAC layer is also called transport block (TB) or MAC protocol data unit (MAC PDU).

In the MAC layer, hybrid automatic repeat request (HARQ) control is performed for each transport block. The transport block is a unit of data that the MAC layer delivers to a physical layer. In the physical layer, transport blocks are mapped to codewords, and encoding is performed for each codeword. Note that the downlink reference signal and the uplink reference signal are also simply called reference signals (RS).

(LTE Physical Channel and LTE Physical Signal)

As described above, the description for the physical channel and the physical signal can also be applied to the LTE physical channel and the LTE physical signal, respectively. The LTE physical channel and the LTE physical signal are called as follows.

An LTE physical downlink channel includes LTE-PBCH, LTE-PCFICH, LTE-PHICH, LTE-PDCCH, LTE-EPDCCH, LTE-MPDCCH, LTE-R-PDCCH, LTE-PDSCH, LTE-PMCH, and the like. An LTE physical downlink signal includes LTE-SS, LTE-DL-RS, LTE-DS, and the like. The LTE-SS includes LTE-PSS, LTE-SSS, and the like. The LTE-RS includes LTE-CRS, LTE-PDSCH-DMRS, LTE-EPDCCH-DMRS, LTE-PRS, LTE-CSI-RS, LTE-TRS, and the like.

An LTE physical uplink channel includes LTE-PUSCH, LTE-PUCCH, LTE-PRACH, and the like. An LTE physical uplink signal includes LTE-UL-RS. The LTE-UL-RS includes LTE-UL-DMRS, LTE-SRS, and the like.

An LTE physical sidelink channel includes LTE-PSBCH, LTE-PSCCH, LTE-PSDCH, LTE-PSSCH, and the like. An LTE physical sidelink signal includes LTE-SL-SS, LTE-SL-DS, LTE-SL-RS, and the like. The LTE-SL-SS includes LTE-SL-PSS, LTE-SL-SSS, and the like. The LTE-SL-RS includes LTE-SL-DMRS, LTE-SL-SRS, LTE-SL-CSI-RS, and the like.

(NR Physical Channel and NR Physical Signal)

As described above, the description for the physical channel and the physical signal can also be applied to the NR physical channel and the NR physical signal, respectively. The NR physical channel and the NR physical signal are called as follows.

An NR physical downlink channel includes NR-PBCH, NR-PCFICH, NR-PHICH, NR-PDCCH, NR-EPDCCH, NR-MPDCCH, NR-R-PDCCH, NR-PDSCH, NR-PMCH, and the like. An NR physical downlink signal includes NR-SS, NR-DL-RS, NR-DS, and the like. The NR-SS includes NR-PSS, NR-SSS, and the like. The NR-RS includes NR-CRS, NR-PDSCH-DMRS, NR-EPDCCH-DMRS, NR-PRS, NR-CSI-RS, NR-TRS, and the like.

An NR physical uplink channel includes NR-PUSCH, NR-PUCCH, NR-PRACH, and the like. An NR physical uplink signal includes NR-UL-RS. The NR-UL-RS includes NR-UL-DMRS, NR-SRS, and the like.

An NR physical sidelink channel includes NR-PSBCH, NR-PSCCH, NR-PSDCH, NR-PSSCH, and the like. An NR physical sidelink signal includes NR-SL-SS, NR-SL-DS, NR-SL-RS, and the like. The NR-SL-SS includes NR-SL-PSS, NR-SL-SSS, and the like. The NR-SL-RS includes NR-SL-DMRS, NR-SL-SRS, NR-SL-CSI-RS, and the like.

(Physical Downlink Channel)

The PBCH is used for broadcasting master information block (MIB), which is broadcast information unique to a serving cell of the base station device 200. The PBCH is transmitted only in the subframe 0 in the radio frame. The MIB can be updated at 40 ms intervals. The PBCH is repeatedly transmitted with a period of 10 ms.

Specifically, initial transmission of the MIB is performed in the subframes 0 in radio frames that satisfy a condition that a remainder obtained by dividing system frame number (SFN) by 4 is 0, and re-transmission (repetition) of the MIB is performed in the subframes 0 in all the other radio frames. The SFN is a radio frame number (system frame number). The MIB is system information. For example, the MIB includes information indicating the SFN.

The PCFICH is used for transmitting information regarding the number of OFDM symbols used for transmitting PDCCH. An area indicated by the PCFICH is also called PDCCH area. Information transmitted using the PCFICH is also called control format indicator (CFI).

The PHICH is used for transmitting HARQ-ACK (HARQ indicator, HARQ feedback, and response information) indicating acknowledgement (ACK) or negative acknowledgement (NACK) for the uplink data (uplink shared channel (UL-SCH)) received by the base station device 200. For example, in a case where the terminal device 100 has received the HARQ-ACK indicating ACK, corresponding uplink data is not retransmitted.

For example, in a case where the terminal device 100 receives the HARQ-ACK indicating NACK, the terminal device 100 retransmits the corresponding uplink data in a predetermined uplink subframe. A certain PHICH is used to transmit the HARQ-ACK for certain uplink data. The base station device 200 transmits HARQ-ACKs for a plurality of uplink data included in the same PUSCH, using a plurality of PHICHs.

The PDCCH and the EPDCCH are used for transmitting downlink control information (DCI). Mapping of information bits of the downlink control information is defined as a DCI format.

The downlink control information includes a downlink grant and an uplink grant. The downlink grant is also called downlink assignment or downlink allocation.

The PDCCH is transmitted by a set of one or more consecutive control channel elements (CCEs). The CCE is includes nine resource element groups (REGs). The REG includes four resource elements. In a case where the PDCCH includes n consecutive CCEs, the PDCCH starts from a CCE that satisfies a condition that a remainder obtained by dividing i, which is an index (number) of the CCE, by n is 0.

The EPDCCH is transmitted by a set of one or more consecutive enhanced control channel elements (ECCEs). The ECCE includes a plurality of enhanced resource element groups (EREGs).

The downlink grant is used for PDSCH scheduling in a certain cell. The downlink grant is used for PDSCH scheduling in the same subframe as a subframe in which the downlink grant has been transmitted. The uplink grant is used for PUSCH scheduling in a certain cell. The uplink grant is used for single PUSCH scheduling in a subframe that is four or more subframes after a subframe in which the uplink grant has been transmitted.

Cyclic redundancy check (CRC) parity bits are added to the DCI. The CRC parity bits are scrambled by a radio network temporary identifier (RNTI). The RNTI is an identifier that can be defined or set according to the purpose of the DCI and the like. The RNTI is an identifier defined in advance in a specification, an identifier set as information unique to a cell, an identifier set as information unique to the terminal device 100, or an identifier set as information unique to a group belonging to the terminal device 100.

For example, in monitoring the PDCCH or EPDCCH, the terminal device 100 descrambles the CRC parity bits added to the DCI with a predetermined RNTI and identifies whether or not the CRC is correct. In a case where the CRC is correct, it is known that the DCI is DCI for the terminal device 100.

The PDSCH is used for transmitting downlink data (downlink shared channel (DL-SCH)). Furthermore, the PDSCH is also used for transmitting control information of an upper layer. The PMCH is used for transmitting multicast data (multicast channel (MCH)).

In the PDCCH area, a plurality of PDCCHs may be frequency-, time-, and/or space-multiplexed. In an EPDCCH area, a plurality of EPDCCHs may be frequency-, time-, and/or space-multiplexed. In a PDSCH area, a plurality of PDCCHs may be frequency-, time-, and/or space-multiplexed. The PDCCH, PDSCH and/or EPDCCH may be frequency-, time-, and/or space-multiplexed.

(Physical Downlink Signal)

A synchronization signal is used by the terminal device 100 for synchronizing the frequency domain and/or the time domain of a downlink. The synchronization signal includes a primary synchronization signal (PSS) and a secondary synchronization signal (SSS).

The synchronization signal is arranged in a predetermined subframe in a radio frame. For example, in a TDD method, the synchronization signal is arranged in subframes 0, 1, 5, and 6 in the radio frame. In the FDD method, the synchronization signal is arranged in subframes 0 and 5 in the radio frame.

The PSS may be used for coarse frame/symbol timing synchronization (time domain synchronization) and cell group identification. The SSS may be used for more accurate frame timing synchronization and cell identification. That is, frame timing synchronization and cell identification can be performed by using the PSS and the SSS.

The downlink reference signal is used by the terminal device 100 for performing estimation of a propagation path of a physical downlink channel, propagation path correction, calculation of channel state information (CSI) of a downlink, and/or measurement of positioning of the terminal device 100.

The CRS is transmitted in the entire band of a subframe. The CRS is used for receiving (demodulating) PBCH, PDCCH, PHICH, PCFICH, and PDSCH. The CRS may be used by the terminal device 100 for calculating downlink channel state information. The PBCH, PDCCH, PHICH, and PCFICH are transmitted through an antenna port used for transmitting the CRS. The CRS supports a configuration of 1, 2 or 4 antenna port. The CRS is transmitted through one or more of antenna ports 0 to 3.

The URS related to the PDSCH is transmitted in a subframe and a band used for transmitting the PDSCH related to the URS. The URS is used for demodulating the PDSCH related to the URS. The URS related to the PDSCH is transmitted through one or more of antenna ports 5, 7 to 14.

The PDSCH is transmitted through an antenna port used for transmitting the CRS or URS on the basis of a transmission mode and a DCI format. A DCI format 1A is used for scheduling the PDSCH transmitted through an antenna port used for transmitting the CRS. A DCI format 2D is used for scheduling the PDSCH transmitted through an antenna port used for transmitting the URS.

The DMRS related to the EPDCCH is transmitted in a subframe and a band used for transmitting the EPDCCH related to the DMRS. The DMRS is used for demodulating the EPDCCH related with the DMRS. The EPDCCH is transmitted through an antenna port used for transmitting the DMRS. The DMRS related to the EPDCCH is transmitted through one or more of antenna ports 107 to 114.

The CSI-RS is transmitted in a set subframe. Resources for transmitting the CSI-RS are set by the base station device 200. The CSI-RS is used by the terminal device 100 for calculating downlink channel state information. The terminal device 100 performs signal measurement (channel measurement) using the CSI-RS.

The CSI-RS supports settings of some or all of antenna ports 1, 2, 4, 8, 12, 16, 24, and 32. The CSI-RS is transmitted through one or a plurality of antenna ports 15 to 46. Note that the supported antenna ports may be determined on the basis of the terminal device capability of the terminal device 100, the setting of the RRC parameter, and/or the set transmission mode.

The ZP CSI-RS resource is set by an upper layer. The ZP CSI-RS resource is transmitted with zero output power. That is, the ZP CSI-RS resource transmits nothing. The PDSCH and the EPDCCH are not transmitted with the resources set by the ZP CSI-RS. For example, the ZP CSI-RS resource is used by neighboring cells for transmitting the NZP CSI-RS.

Furthermore, for example, the ZP CSI-RS resource is used for measuring the CSI-IM. Furthermore, for example, the ZP CSI-RS resource is a resource with which a predetermined channel such as the PDSCH is not transmitted. In other words, the predetermined channel is (rate-matched, punctured, and) mapped except for the ZP CSI-RS resource.

The CSI-IM resource is set by the base station device 200. The CSI-IM resource is a resource used for measuring an interference in CSI measurement. The CSI-IM resource can be set to overlap with a part of the ZP CSI-RS resource.

For example, in a case where the CSI-IM resource is set to overlap with a part of the ZP CSI-RS resource, a signal from a cell for performing CSI measurement is not transmitted with the resource. In other words, base station device 200 does not transmit the PDSCH, the EPDCCH, or the like with the resource set by the CSI-IM. Therefore, the terminal device 100 can efficiently perform the CSI measurement.

MBSFN RS is transmitted in the entire band of a subframe used for transmitting the PMCH. The MBSFN RS is used for demodulating the PMCH. The PMCH is transmitted through an antenna port used for transmitting the MBSFN RS. The MBSFN RS is transmitted through the antenna port 4.

The PRS is used by the terminal device 100 for measuring the positioning of the terminal device 100. The PRS is transmitted through the antenna port 6.

The TRS can be mapped only to a predetermined subframe. For example, the TRS is mapped to the subframes 0 and 5. Furthermore, the TRS can have a similar configuration to a part or all of the CRS. For example, in each resource block, the position of the resource element to which the TRS is mapped can be set to the same as the position of the resource element to which the CRS of the antenna port 0 is mapped.

Furthermore, a sequence (value) used for the TRS can be determined on the basis of information set through PBCH, PDCCH, EPDCCH, or PDSCH (RRC signaling). The sequence (value) used for the TRS can be determined on the basis of parameters such as a cell ID (for example, a physical layer cell identifier) and a slot number. The sequence (value) used for the TRS can be determined by a method (formula) different from the sequence (value) used for the CRS of the antenna port 0.

(Physical Uplink Channel)

The PUCCH is a physical channel used for transmitting uplink control information (UCI). The uplink control information includes downlink channel state information (CSI), a scheduling request (SR) indicating a request for a PUSCH resource, and HARQ-ACK for downlink data (transport block (TB) or downlink-shared channel (DL-SCH)).

The HARQ-ACK is also called ACK/NACK, HARQ feedback, or response information. Furthermore, the HARQ-ACK for downlink data indicates ACK, NACK, or DTX.

The PUSCH is a physical channel used for transmitting uplink data (uplink-shared channel (UL-SCH)). Furthermore, the PUSCH may be used for transmitting the HARQ-ACK and/or the channel state information together with the uplink data. Furthermore, the PUSCH may be used for transmitting only the channel state information or only the HARQ-ACK and the channel state information.

The PRACH is a physical channel used for transmitting a random access preamble. The PRACH can be used by the terminal device 100 for being synchronized with the base station device 200 in the time domain. Furthermore, the PRACH is used for an initial connection establishment procedure (processing), a handover procedure, a connection re-establishment procedure, synchronization for uplink transmission (timing adjustment), and/or a request for PUSCH resources.

In a PUCCH area, a plurality of PUCCHs is frequency-, time-, space-, and/or code-multiplexed. In a PUSCH area, a plurality of PUSCHs may be frequency-, time-, space-, and/or code-multiplexed. The PUCCH and PUSCH may be frequency-, time-, space-, and/or code-multiplexed. The PRACH may be arranged in a single subframe or over two subframes. A plurality of PRACHs may be code-multiplexed.

(Physical Uplink Signal)

An uplink DMRS is related to transmission of the PUSCH or the PUCCH. The DMRS is time-multiplexed with the PUSCH or the PUCCH. The base station device 200 may use the DMRS for correcting the propagation path of the PUSCH or the PUCCH. In the description of the embodiment of the present technology, transmitting the PUSCH includes multiplexing the PUSCH and the DMRS and transmitting the multiplexed PUSCH.

In the description of the embodiment of the present technology, transmitting the PUCCH includes multiplexing the PUCCH and the DMRS and transmitting the multiplexed PUCCH. Note that the uplink DMRS is also called UL-DMRS. The SRS is not related to the transmission of the PUSCH or the PUCCH. The base station device 200 may use the SRS for measuring an uplink channel state.

The SRS is transmitted using the last SC-FDMA symbol in the uplink subframe. That is, the SRS is arranged in the last SC-FDMA symbol in the uplink subframe. The terminal device 100 can restrict simultaneous transmission of the SRS, the PUCCH, and the PUSCH and/or the PRACH in a certain SC-FDMA symbol of a certain cell.

The terminal device 100 can transmit the PUSCH and/or the PUCCH, using SC-FDMA symbols except for the last SC-FDMA symbol in a certain uplink subframe in a certain cell, and transmit the SRS, using the last SC-FDMA symbol in the uplink subframe. That is, the terminal device 100 can transmit the SRS, and the PUSCH and the PUCCH in a certain uplink subframe in a certain cell.

In the SRS, a trigger type 0 SRS and a trigger type 1 SRS are defined as SRSs having different trigger types. The trigger type 0SRS is transmitted in a case where a parameter related to the trigger type 0SRS is set by upper layer signaling.

The trigger type 1 SRS is transmitted in a case where a parameter related to the trigger type 1 SRS is set by upper layer signaling and transmission is requested by an SRS request included in the DCI format 0, 1A, 2B, 2C, 2D, or 4.

Note that the SRS request is included in both the FDD and the TDD for the DCI format 0, 1A, or 4, and is included only in the TDD for the DCI format 2B, 2C, or 2D. In a case where transmission of the trigger type 0 SRS and transmission of the trigger type 1 SRS occur in the same subframe of the same serving cell, the transmission of the trigger type 1 SRS is given priority.

(Physical Sidelink Channel)

The PSBCH is used for broadcasting master information block sidelink (MIB-SL), which is broadcast information unique to a physical sidelink channel of a serving cell of the base station device 200. The PSBCH is transmitted together with PSSS, SSSS, and SL-DMRS as a sidelink synchronization subframe SLSS in a radio frame. The MIB-SL is system information.

For example, the MIB-SL includes information indicating the SFN (such as directFrameNumber and directSubFrameNumber), information indicating the frequency bandwidth of the physical sidelink channel (such as sl-bandwidth), information indicating cell coverage where the transmission terminal device is present (such as inCoverage), and information indicating the physical sidelink channel configuration in the case of the TDD (such as tdd-ConfigSL).

The PSCCH is used for transmitting sidelink control information (SCI). Mapping of information bits of the sidelink control information is defined as an SCI format. The sidelink control information includes sidelink grant. The sidelink grant is also called sidelink assignment or sidelink allocation.

The PSCCH is transmitted by a set of one or a plurality of consecutive control channel elements (CCEs). The CCE is includes nine resource element groups (REGs). The REG includes four resource elements. In a case where the PSCCH includes n consecutive CCEs, the PSCCH starts from a CCE that satisfies a condition that a remainder obtained by dividing i, which is an index (number) of the CCE, by n is 0.

The sidelink grant is used for PSSCH scheduling in a certain cell. The sidelink grant is used for PSSCH scheduling in the same subframe as a subframe in which the sidelink grant has been transmitted.

Cyclic redundancy check (CRC) parity bits are added to the SCI. The CRC parity bits are scrambled by a radio network temporary identifier (RNTI). The RNTI is an identifier that can be defined or set according to the purpose of the SCI and the like. The RNTI is an identifier defined in advance in a specification, an identifier set as information unique to a cell, an identifier set as information unique to the terminal device 100, an identifier set as information unique to a group belonging to the terminal device 100, or an identifier set as information unique to a sidelink.

For example, in monitoring the PSCCH, the terminal device 100 descrambles the CRC parity bits added to the SCI with a predetermined RNTI and identifies whether or not the CRC is correct. In a case where the CRC is correct, it is known that the SCI is SCI for the terminal device 100.

The PSSCH is used for transmitting sidelink data (sidelink shared channel (SL-SCH)). Furthermore, the PSSCH is also used for transmitting control information of an upper layer.

In a PSCCH area, a plurality of PSCCHs may be frequency-, time-, and/or space-multiplexed. In the PSSCH area, a plurality of PSSCHs may be frequency-, time-, and/or space-multiplexed. The PSSCH and/or the PSCCH may be frequency-, time-, and/or space-multiplexed.

(Physical Sidelink Signal)

A sidelink synchronization signal is used by the terminal device 100 for synchronizing the frequency domain and/or the time domain of a sidelink. The synchronization signal includes a primary sidelink synchronization signal (PSSS) and a secondary sidelink synchronization signal (SSSS). The synchronization signal is arranged in a predetermined subframe in a radio frame.

For example, in the frequency domain, the synchronization signal is arranged in 62 resource elements around the center of a target frequency band. Furthermore, in the time domain, the synchronization signal is arranged in one or more consecutive symbols. For example, the PSSS is arranged in the first and second symbols in the subframe (or the first and second symbols in the first slot), and the SSSS is arranged in the eleventh and twelfth symbols (or the fourth and fifth symbols of the second slot).

The PSSS may be used for coarse frame/symbol timing synchronization (time domain synchronization). The SSSS may be used for more accurate frame timing synchronization than the PSSS.

The downlink reference signal is used for performing estimation of the propagation path of the physical sidelink channel by the terminal device 100, channel path correction (channel equalization/compensation), calculation of channel state information (CSI) of a sidelink, and/or measurement of positioning of the terminal device 100.

The SL-DMRS is transmitted in a subframe and a frequency band used for transmitting a channel (PSBCH, PSDCH, PSCCH, PSSCH, or the like) related to the SL-DMRS. The SL-DMRS is used for demodulating a channel related to the SL-DMRS.

The SL-CSI-RS is transmitted in a set subframe. Resources for transmitting the SL-CSI-RS are set by the base station device 200 or the terminal device 100. The SL-CSI-RS is used by the terminal device 100 for calculating channel state information of the sidelink. The terminal device 100 performs signal measurement (channel measurement) using the SL-CSI-RS.

The SL-CSI-RS supports settings of some or all of the antenna ports 1, 2, 4, 8, 12, 16, 24, and 32. The SL-CSI-RS is transmitted through one or a plurality of the antenna ports 15 to 46. Note that the supported antenna ports may be determined on the basis of the terminal device capability of the terminal device 100, the setting of the RRC parameter, and/or the set transmission mode.

The SL-SRS is transmitted using a predetermined symbol in a sidelink subframe. For example, the SL-SRS is arranged in the last symbol in the subframe. The terminal device 100 can transmit the PSSCH and/or the PSCCH, using symbols except the last symbol in a certain sidelink subframe of a certain cell, and transmit the SL-SRS, using the last symbol in the sidelink subframe. That is, the terminal device 100 can transmit the SL-SRS, and the PSSCH and the PSCCH, in a certain sidelink subframe of a certain cell.

In the SL-SRS, trigger type 0SL-SRS and trigger type 1SL-SRS are defined as SL-SRSs having different trigger types. The trigger type 0SL-SRS is transmitted in a case where a parameter related to the trigger type 0SL-SRS is set by upper layer signaling.

The trigger type 1SL-SRS is transmitted in a case where a parameter related to the trigger type 1SL-SRS is set by upper layer signaling and transmission is requested by an SL-SRS request included in the DCI format. In a case where transmission of the trigger type 0SL-SRS and transmission of the trigger type 1SL-SRS occur in the same subframe of the same serving cell, the transmission of the trigger type 1SL-SRS is given priority.

The PSSCH is transmitted through an antenna port used for transmitting the SL-DMRS on the basis of a transmission mode and a DSI format.

(Setting of Physical Sidelink Channel)

Hereinafter, details of allocation of a sidelink resource pool in the NR will be described.

In sidelink communication within cell coverage, the sidelink resource pool in the NR can dynamically set. An instruction on the sidelink resource pool in the NR is given by the base station using the NR-PDCCH. That is, the NR-DCI included in the NR-PDCCH gives an instruction on resource blocks and subframes for transmitting/receiving the NR-PSCCH, NR-PSSCH, and sidelink ACK/NACK channels.

(Dynamic Resource Pool Allocation of Sidelink)

Figure 26:
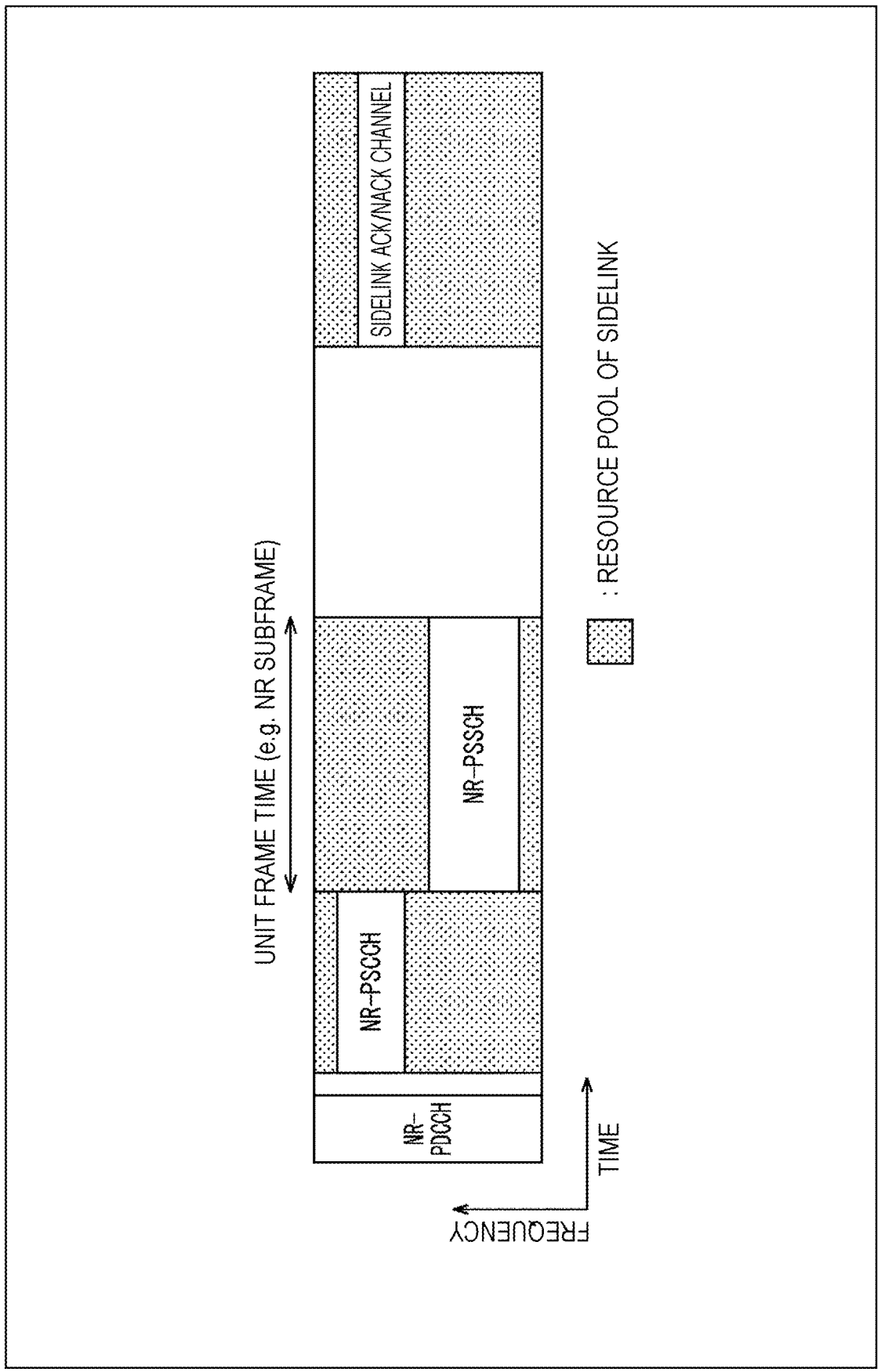
FIG. 26 is a diagram illustrating an example of dynamic resource pool allocation of a sidelink according to the embodiment of the present technology.

FIG. 26 is a diagram illustrating an example of dynamic resource pool allocation of a sidelink according to the embodiment of the present technology.

The first terminal device 100 sets, by NR-PDCCH, three subsequent subframes including a subframe in which the NR-PDCCH is transmitted as a resource pool for sidelink communication. The first terminal device 100 performs reception/transmission switching and waits for a gap time for processing of generating the NR-PSCCH and NR-PSSCH, and then the NR-PSCCH to a second terminal device 100, using the resource pool specified by the NR-PDCCH.

Moreover, the first terminal device 100 transmits the NR-PSSCH scheduled according to an NR-SCI format included in the NR-PSCCH to the second terminal device 100, using the resource pool specified by the NR-PDCCH. Lastly, the second terminal device 100 waits for a gap time for processing of generating a sidelink ACK/NACK channel, and then transmits information of an ACK/NACK response to the NR-PSSCH transmitted from the first terminal device 100, using the sidelink ACK/NACK channel to the first terminal device 100, using the resource pool specified by the NR-PDCCH.

As an example of the instruction of a time resource pool by the NR-PDCCH, an instruction on a time resource used for the sidelink communication is given from the NR-PDCCH to a predetermined subframe as a sidelink resource pool in a case where the DCI giving an instruction on the sidelink communication is included in the NR-PDCCH. The first terminal device 100 recognizes the time resource pool from the subframe that has received the DCI giving an instruction on the sidelink communication. The predetermined subframe may be set in advance such as three subframes, for example, or may be set from an upper layer such as an SIB or a dedicated RRC message.

As an example of the instruction of the time resource pool by the NR-PDCCH, as the time resource used for the sidelink communication, information giving an instruction on a subframe is included in the DCI giving an instruction on the sidelink communication included in the NR-PDCCH, and an instruction on a resource pool is given on the basis of the information. The first terminal device 100 recognizes the time resource pool from the information giving an instruction on the subframe. Examples of a method of giving an instruction on a subframe include a subframe number, the number of subframes from the NR-PDCCH to the time resource pool, and the like.

As an example of an instruction of a frequency resource by the NR-PDCCH, an instruction on the frequency resource used for the sidelink communication is given on the basis of resource allocation information that is one of parameters of the DCI giving an instruction on the sidelink communication included in the NR-PDCCH. The first terminal device 100 recognizes that a resource block on which an instruction is given by the resource allocation information is a resource pool. The resource allocation information is information indicating at least a resource for transmitting the NR-PSCCH.

Note that the resource allocation information may be individually given in notification as information indicating a resource for transmitting the NR-PSCCH, information indicating a resource for transmitting the NR-PSSCH, and information indicating a resource for transmitting a sidelink ACK/NACK channel.

Note that the resource for transmitting the NR-PSSCH and the resource for transmitting the sidelink ACK/NACK channel may be associated with information indicating the resource for transmitting the NR-PSCCH. For example, the frequency resource for transmitting the NR-PSSCH may be the same as the frequency resource for transmitting the NR-PSCCH.

Note that an instruction on a resource pool of a plurality of NR component carriers may be given from one NR-PDCCH. For example, a resource pool used for the sidelink communication of the primary cell and the secondary cell of the NR may be set from the NR-PDCCH transmitted in the primary cell of the NR.

Note that subframes and resource blocks for which the instruction of the resource pool by the NR-PDCCH is possible may be restricted by upper layer information. The upper layer information is, for example, terminal-specific setting information by a dedicated RRC message or the like, or broadcast information such as an SIB. Candidates for the time and frequency resources are set by the upper layer information, and an instruction on a subframe and a resource block that can be actually used as a resource pool is given from the candidates by the DCI giving an instruction on the sidelink communication included in the NR-PDCCH.

The NR-PDCCH including the information regarding the sidelink resource pool is favorably transmitted specifically for a terminal device or for a terminal device group. That is, the NR-PDCCH including sidelink resource pool information is favorably arranged in a search space determined according to terminal device-specific information such as C-RNTI or in a search space determined according to terminal device group-specific information.

As an example of NR-PSCCH monitoring by the second terminal device 100, the second terminal device 100 constantly monitors both the NR-PDCCH and the NR-PSCCH. In a case of detecting the NR-PDCCH addressed to the second terminal device 100, the second terminal device 100 transitions to uplink transmission processing or downlink reception processing or NR-PSCCH transmission processing, otherwise, attempts monitoring the NR-PSCCH.

In this case, for the second terminal device 100, a plurality of resource candidates (NR-PSCCH candidates) having a possibility of transmitting the NR-PSCCH is set from an upper layer or is set in advance. The second terminal device 100 attempts blind decoding of the NR-PSCCH in the set NR-PSCCH candidate.

Setting information of the NR-PSCCH candidate is broadcasted to the second terminal device 100, using a dedicated RRC message in a case where the second terminal device 100 is in an RRC connection state with the base station device 200, and is given in notification to the second terminal device 100, using the NR sidelink broadcast channel (NR-PSBCH) transmitted by the first terminal device 100 in a case where the second terminal device 100 is not in the RRC connection state with the base station device 200.

The setting information included in the NR-PSBCH is information set by the base station device 200 in a case where the first terminal device 100 is present inside a cell, and is information set in advance in a case where the first terminal device 100 is present outside the cell.

Note that an instruction on the resource pool for transmitting the NR-PSBCH may also be given by the NR-PDCCH. The method of giving an instruction on a resource pool for transmitting the NR-PSBCH may be similar to the method of giving an instruction on a resource pool for transmitting the NR-PSCCH.

As another example of monitoring the NR-PSCCH by the second terminal device 100, the second terminal device 100 can receive the NR-PDCCH specifying a resource pool in a case where the second terminal device 100 is present inside the cell. In the case of receiving the NR-PDCCH, the second terminal device 100 attempts decoding of the NR-PSCCH in the resource for transmitting the NR-PSCCH on the basis of the resource pool information included in the NR-PDCCH, otherwise waits for monitoring processing until the next unit frame.

This eliminates the need to perform multiple attempts to decode the NR-PSCCH in one unit frame, so that effects such as low power consumption of the terminal device 100 and simplification of a receiver can be expected.

(Dynamic Resource Pool Allocation of Sidelink)

Figure 27:
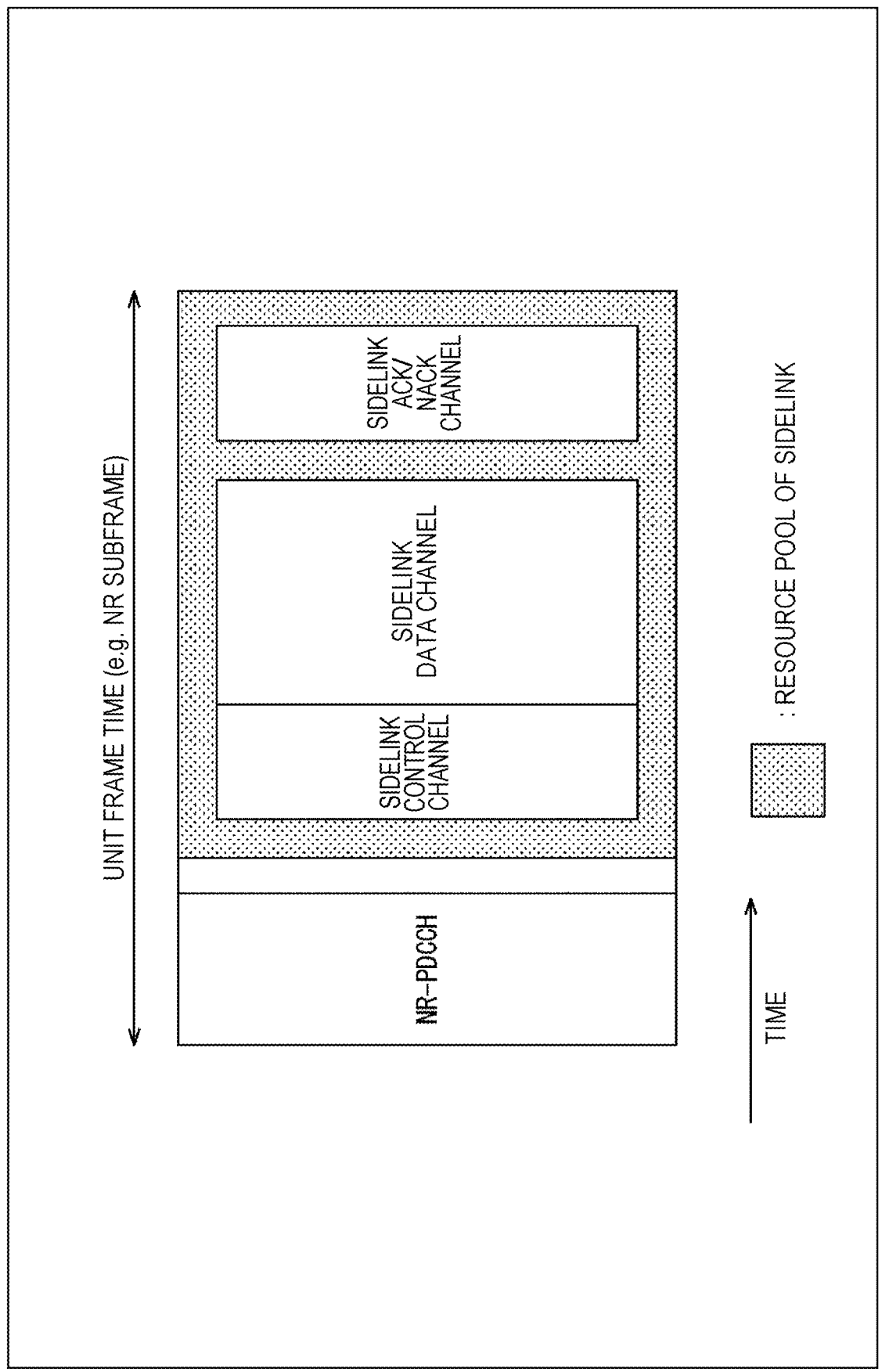
FIG. 27 is a diagram illustrating an example of dynamic resource pool allocation of a sidelink according to the embodiment of the present technology.

FIG. 27 is a diagram illustrating an example of dynamic resource pool allocation of a sidelink according to the embodiment of the present technology.

In a case where self-contained transmission is possible in the sidelink communication, which is different from FIG. 26 above, transmission and reception of the NR-PSCCH, the NR-PSSCH, and the sidelink ACK/NACK channel can be completed in a sidelink transmission resource pool allocated within a predetermined transmission/reception time (for example, the unit frame time), as illustrated in FIG. 27.

After reception of the NR-PDCCH, the first terminal device 100 recognizes the sidelink resource pool on the basis of the DCI (first sidelink DCI) giving an instruction on the sidelink communication included in the NR-PDCCH. Then, the first terminal device 100 transmits the NR-PSCCH and the NR-PSSCH, using the sidelink resource pool on which an instruction is given by the first sidelink DCI. After reception of the NR-PSCCH transmitted from the first terminal device 100, the second terminal device 100 attempts decoding of the NR-PSSCH on the basis of information included in the NR-PSCCH.

The first terminal device 100 can determine the channel length of the NR-PSSCH on the basis of information regarding the time resource of the sidelink included in the first sidelink DCI. Alternatively, the first terminal device 100 can recognize the time resource of the sidelink included in the NR-PDCCH on the basis of the information regarding the channel length of the NR-PSSCH included in the first sidelink DCI.

Thereby, the self-contained transmission becomes possible in the sidelink communication, and the resource use efficiency of the system becomes favorable by performing flexible resource control.

(Dynamic Resource Pool Allocation of Sidelink)

Figure 28:
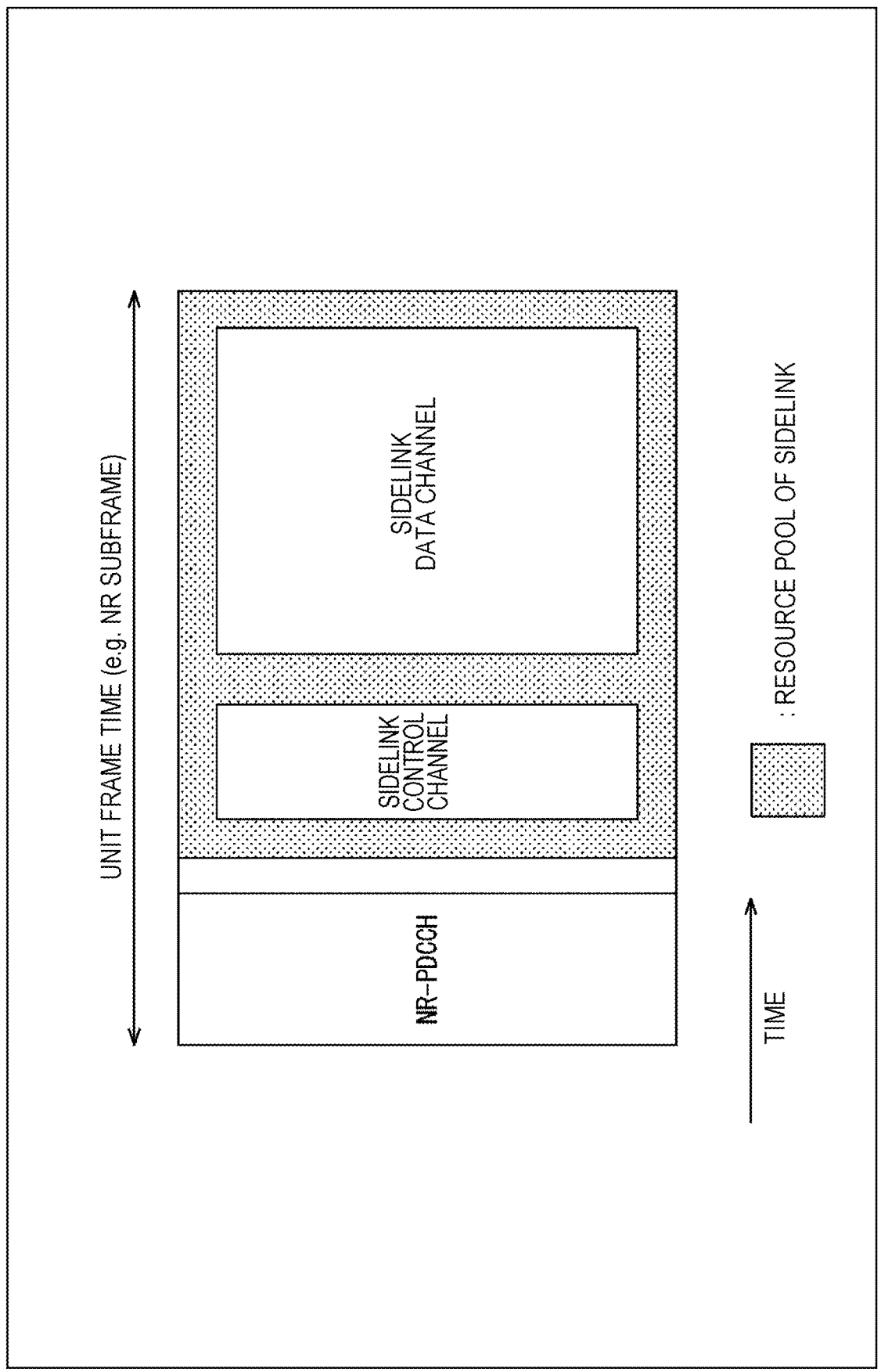
FIG. 28 is a diagram illustrating an example of dynamic resource pool allocation of a sidelink according to the embodiment of the present technology.

FIG. 28 is a diagram illustrating an example of dynamic resource pool allocation of a sidelink according to the embodiment of the present technology.

As a difference from FIG. 27 described above, the first terminal device 100 instructs the second terminal device 100 on scheduling information of NR-PSSCH transmission from the second terminal device 100, using the NR-PSCCH. The second terminal device 100 waits for a gap time for NR-PSCCH reception processing and NR-PSSCH transmission processing, and then transmits the NR-PSSCH on the basis of information on which an instruction is given by the NR-PSSCH.

Thereby, in particular, even in a case where the second terminal device 100 is present outside the cell, the base station device 200 can dynamically control the resources for the sidelink communication used by the second terminal device 100 and the resource use efficiency of the system becomes favorable, by going through the first terminal device 100.

The DCI (second sidelink DCI) giving an instruction on the sidelink communication included in the NR-PSCCH transmitted in FIG. 28 is different from the first sidelink DCI giving an instruction on the sidelink communication included in the NR-PSCCH transmitted in FIG. 27.

The DCI giving an instruction on the sidelink communication included in the NR-PSCCH transmitted in FIG. 27 is DCI for the first terminal device 100 scheduling the resources for transmitting the NR-PSCCH and the NR-PSSCH for the second terminal device 100, whereas the DCI giving an instruction on the sidelink communication included in the NR-PSCCH transmitted in FIG. 28 is DCI for the first terminal device 100 scheduling the resources for transmitting the NR-PSCCH for the second terminal device 100 and for the second terminal device 100 scheduling the resources for transmitting the NR-PSSCH scheduled by the NR-PSCCH for the first terminal device 100.

Furthermore, the SCI (first SCI) included in the NR-PSCCH transmitted in FIG. 27 and SCI (second SCI) included in the NR-PSCCH transmitted in FIG. 28. The first SCI is used for instructing the second terminal device 100 to receive the NR-PSSCH transmitted from the first terminal device 100, and the second SCI is used for instructing the second terminal device 100 to transmit the NR-PSSCH directed to the first terminal device 100.

(Dynamic Resource Pool Allocation of Sidelink)

Figure 29:
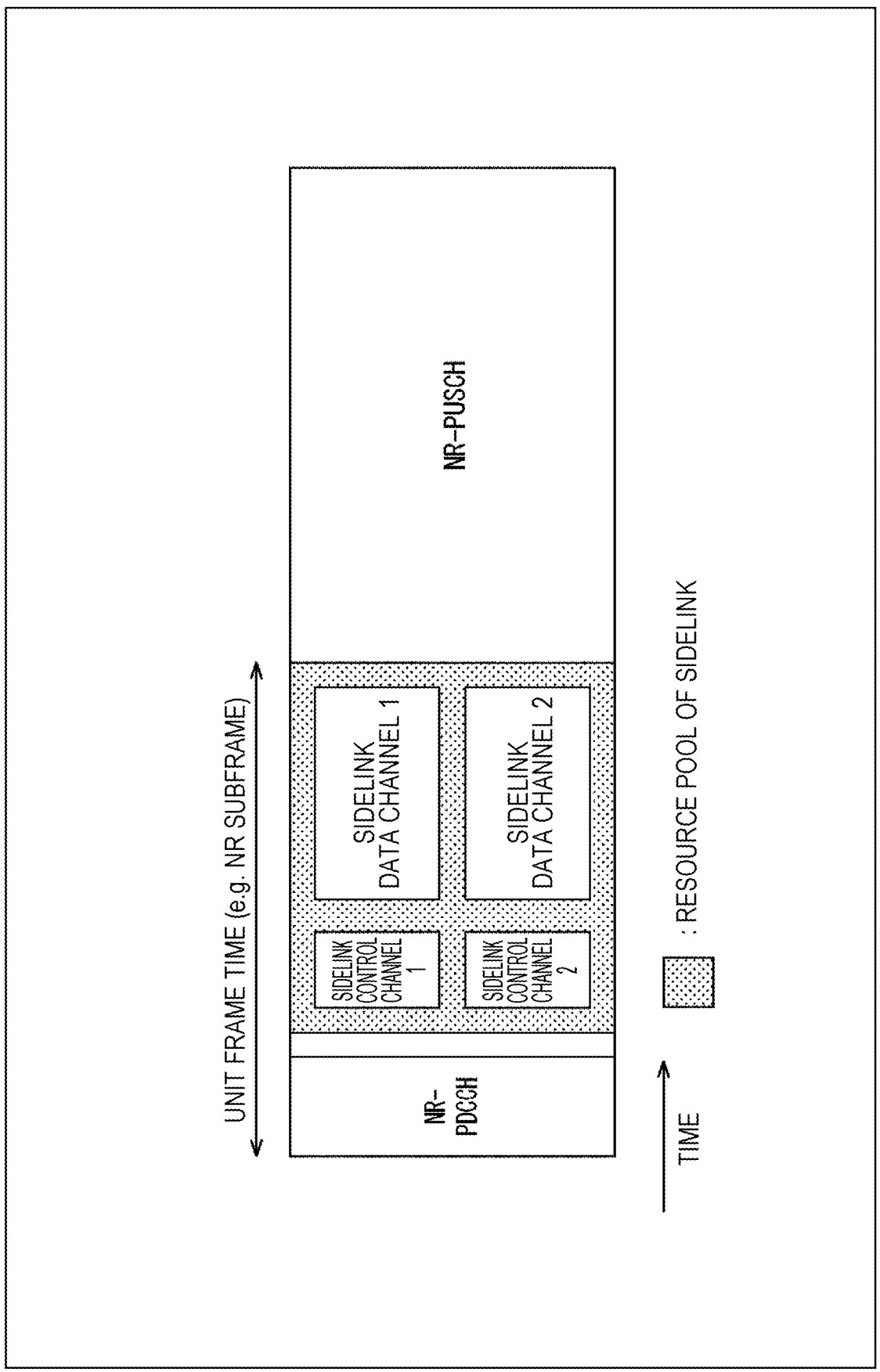
FIG. 29 is a diagram illustrating an example of dynamic resource pool allocation of a sidelink according to the embodiment of the present technology.

FIG. 29 is a diagram illustrating an example of dynamic resource pool allocation of a sidelink according to the embodiment of the present technology.

FIG. 29 assumes terminal device relay. In FIG. 29, scheduling of the NR-PUSCH is further performed, in addition to the instruction of the sidelink resource pool by the NR-PDCCH in FIG. 28 above. Similarly to FIG. 28, the first terminal device 100 instructs the second terminal device 100 to transmit the NR-PSSCH by the NR-PSCCH, and receives the SL-SCH from the second terminal device 100.

Then, first terminal device 100 transmits the received SL-SCH included in NR-PUSCH to the base station device 200. Thereby, scheduling of the sidelink resource pool and the NR-PUSCH can be performed by one NR-PDCCH. Therefore, low-latency terminal device relay can be implemented while reducing overhead due to the NR-PDCCH.

(Dynamic Resource Pool Allocation of Sidelink)

Figure 30:
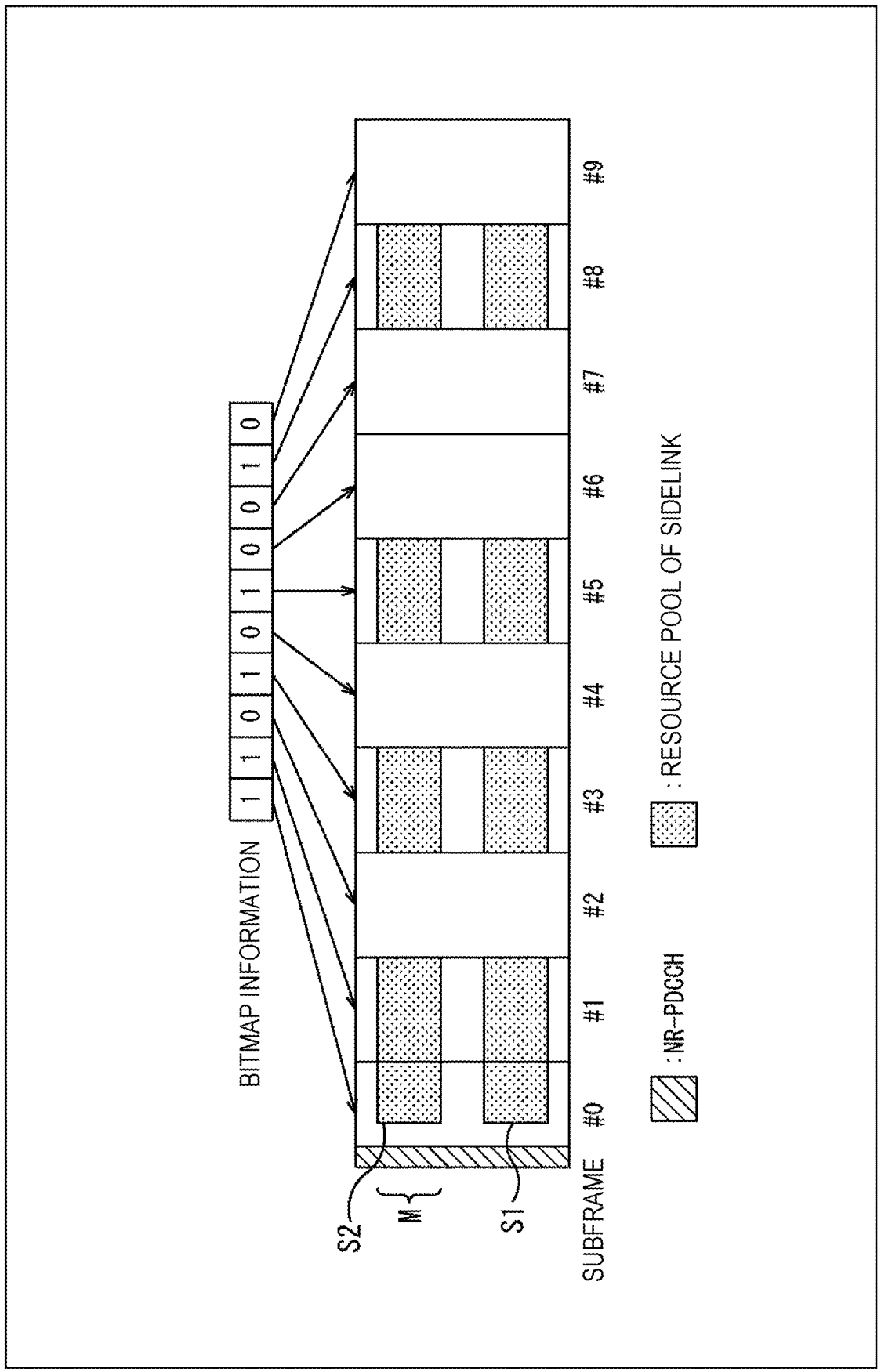
FIG. 30 is a diagram illustrating an example of dynamic resource pool allocation of a sidelink according to the embodiment of the present technology.

FIG. 30 is a diagram illustrating an example of dynamic resource pool allocation of a sidelink according to the embodiment of the present technology.

FIG. 30 illustrates the sidelink resource pool in a radio frame unit by the NR-PDCCH. Transmission is performed in subframe #0.

An instruction on information on the resource pool of the sidelink included in the NR-PDCCH is given according to bitmap information giving an instruction on a subframe in which a resource pool of a sidelink is set by 1 or 0, a start position S1 of the resource block, an end position S2 of the resource block, and the number of consecutive resource blocks M.

The NR-PDCCH including the sidelink resource pool information is favorably commonly sent to terminals. That is, the NR-PDCCH including the sidelink resource pool information is favorably located in a search space common to terminal devices.

In a case where the terminal device 100 has received the NR-PDCCH including the sidelink resource pool information in the subframe #0, a resource pool is set using the resource pool information in radio frames that have received the NR-PDCCH. Meanwhile, in the case where the terminal device 100 has received the NR-PDCCH including the sidelink resource pool information in the subframe #0, it is assumed that no resource pool is set between the radio frames.

(Details of Channel State Information)

The terminal device 100 reports the CSI to the base station device 200. The time and frequency resources used for reporting the CSI are controlled by the base station device 200. In the terminal device 100, setting regarding the CSI is performed by the RRC signaling from the base station device 200. In the terminal device 100, one or more CSI processes are set in a predetermined transmission mode. The CSI reported by the terminal device 100 corresponds to a CSI process.

For example, a CSI process is a unit of control or setting related to the CSI. Each of the CSI processes can independently set settings for CSI-RS resources, CSI-IM resources, settings for periodic CSI report (for example, reporting period and offset), and/or settings for aperiodic CSI report.

The CSI includes channel quality indicator (CQI), precoding matrix indicator (PMI), precoding type indicator (PTI), rank indicator (RI), and/or CSI-RS resource indicator (CRI). The RI indicates the number of transmission layers (rank number). The PMI is information indicating a precoding matrix defined in advance. The PMI indicates one precoding matrix by one or two pieces of information. The PMI using two pieces of information is also called first PMI and second PMI.

The CQI is information indicating a combination of a modulation method and a coding rate that are defined in advance. The CRI is information (single instance) indicating one CSI-RS resource selected from the CSI-RS resources in a case where two or more CSI-RS resources are set in one CSI process. The terminal device 100 reports the CSI recommended to the base station device 200. The terminal device 100 reports a CQI satisfying predetermined received quality for each transport block (codeword).

In the CRI report, one CSI-RS resource is selected from the set CSI-RS resources. In a case where CRI is reported, the reported PMI, CQI and RI are calculated (selected) on the basis of the reported CRI. For example, in a case where the set CSI-RS resources are each precoded, the terminal device 100 reports the CRI, so that precoding (beam) suitable for the terminal device 100 is reported.

Subframes (reporting instances) capable of periodic CSI reporting are determined according to a reporting period and a subframe offset set by upper layer parameters (a CQIPMI index, an RI index, and a CRI index).

Note that the parameters of the upper layer can be independently set for the subframe set for measuring the CSI. In a case where only one piece of information is set for a plurality of subframe sets, the information can be shared by the subframe sets. In each serving cell, one or more periodic CSI reports are set by upper layer signaling.

A CSI report type supports a PUCCH CSI report mode. The CSI report type is also called PUCCH report type. Type 1 report supports CQI feedback for a terminal selection subband. Type 1a report supports a subband CQI and a second PMI feedback.

Type 2, Type 2b, and Type 2c reports support wideband CQI and PMI feedback. Type 2a report supports wideband PMI feedback. Type 3 reports support RI feedback. Type 4 report supports wideband CQI feedback. Type 5 report supports RI and wideband PMI feedback.

Type 6 report supports RI and PTI feedback. Type 7 report supports CRI and RI feedback. Type 8 report supports CRI and RI and wideband PMI feedback. Type 9 report supports CRI and RI and PTI feedback. Type 10 report supports CRI feedback.

In the terminal device 100, information regarding the CSI measurement and CSI report is set by the base station device 200. The CSI measurement is performed on the basis of a reference signal and/or reference resources (for example, the CRS, CSI-RS, and CSI-IM resources, and/or DRS). The reference signal used for the CSI measurement is determined on the basis of settings of the transmission mode or the like. The CSI measurement is performed on the basis of channel measurement and interference measurement. For example, the channel measurement measures power of a desired cell. The interference measurement measures power other than the power of the desired cell and noise power.

For example, in the CSI measurement, the terminal device 100 performs the channel measurement and the interference measurement on the basis of the CRS. For example, in the CSI measurement, the terminal device 100 performs the channel measurement on the basis of the CSI-RS, and performs the interference measurement on the basis of the CRS. For example, in the CSI measurement, the terminal device 100 performs the channel measurement on the basis of the CSI-RS, and performs the interference measurement on the basis of the CSI-IM resource.

The CSI processes are set as information unique to the terminal device 100 by upper layer signaling. The terminal device 100 has one or more CSI processes and performs the CSI measurement and the CSI report on the basis of the settings of the CSI processes. For example, in a case where a plurality of CSI processes is set, the terminal device 100 independently reports a plurality of CSIs based on those CSI processes.

Each CSI process includes settings for cell state information, a CSI process identifier, setting information about the CSI-RS, setting information about the CSI-IM, a subframe pattern set for CSI report, setting information for periodic CSI report, and/or setting information for aperiodic CSI report. Note that the settings for the cell state information may be common to the plurality of CSI processes.

The terminal device 100 uses the CSI reference resource to perform the CSI measurement. For example, the terminal device 100 measures the CSI of a case where the PDSCH is transmitted, using a group of downlink physical resource blocks indicated by the CSI reference resource. In a case where CSI subframe sets are set by upper layer signaling, each CSI reference resource belongs to one of the CSI subframe sets and does not belong to both of the CSI subframe sets.

In the frequency direction, the CSI reference resource is defined by a group of downlink physical resource blocks corresponding to a band associated with a measured CQI value.

In a layer direction (spatial direction), the CSI reference resource is defined by the RI and PMI given by the measured CQI. That is, in the layer direction (spatial direction), the CSI reference resource is defined by the RI and PMI assumed or generated at the time of measuring the CQI.

In the time direction, the CSI reference resource is defined by one or more predetermined downlink subframes. Specifically, the CSI reference resource is defined by valid subframes that are a predetermined number before a subframe for reporting the CSI. The predetermined number of subframes defining the CSI reference resource is determined on the basis of the transmission mode, the frame configuration type, the number of CSI processes to be set, and/or a CSI report mode.

For example, in a case where one CSI process and a periodic CSI report mode are set for the terminal device 100, the predetermined number of subframes that define the CSI reference resource is a minimum value of four or larger, of valid downlink subframes.

A valid subframe is a subframe that satisfies a predetermined condition. A downlink subframe in a certain serving cell is considered to be valid in a case where some or all of the following conditions are satisfied.

(1) A valid downlink subframe is determined on the basis of RRC parameters regarding an ON state and an OFF state. In the terminal device 100, a valid downlink subframe is a subframe in the ON state.

(2) A valid downlink subframe is set as a downlink subframe in the terminal device 100.

(3) A valid downlink subframe is not a multimedia broadcast multicast service single frequency network (MBSFN) subframe in a predetermined transmission mode.

(4) A valid downlink subframe is not included in a range of a measurement interval (measurement gap) set in the terminal device 100.

(5) A valid downlink subframe is an element or a part of a CSI subframe set linked to the periodic CSI report at the time of setting the CSI subframe for the terminal device 100 in the periodic CSI report.

(6) A valid downlink subframe is an element or a part of a CSI subframe set linked to the downlink subframe associated with a corresponding CSI request in the DCI format of the uplink in the aperiodic CSI report for the CSI process. Under the conditions, the predetermined transmission mode, the plurality of CSI processes, and the CSI subframe set for the CSI process are set in the terminal device 100.

(Details of Resource Allocation)

The base station device 200 can use a plurality of methods as a method of allocating the PDSCH and/or PUSCH resources to the terminal device 100. The resource allocation method includes dynamic scheduling, semi-persistent scheduling, multi-subframe scheduling, and cross-subframe scheduling.

In the dynamic scheduling, one piece of DCI is used for performing resource allocation in one subframe. Specifically, the PDCCH or EPDCCH in a certain subframe performs scheduling for the PDSCH in the certain subframe. The PDCCH or EPDCCH in a certain subframe performs scheduling for the PUSCH in a predetermined subframe after the certain subframe.

In the multi-subframe scheduling, one piece of DCI is used for performing resource allocation in one or more subframes. Specifically, the PDCCH or EPDCCH in a certain subframe performs scheduling for the PDSCH in one or more subframes that are a predetermined number after the certain frame. The PDCCH or EPDCCH in a certain subframe performs scheduling for the PUSCH in one or more subframes that are a predetermined number after the certain subframe. The predetermined number can be an integer greater than or equal to zero.

The predetermined number may be defined in advance or may be determined on the basis of physical layer signaling and/or RRC signaling. In the multi-subframe scheduling, consecutive subframes may be scheduled, or subframes having a predetermined period may be scheduled. The number of subframes to be scheduled may be defined in advance or may be determined on the basis of physical layer signaling and/or RRC signaling.

In the cross-subframe scheduling, one piece of DCI is used for performing resource allocation in one subframe. Specifically, the PDCCH or EPDCCH in a certain subframe performs scheduling for the PDSCH in one subframe that is a predetermined number after the certain subframe. The PDCCH or EPDCCH in a certain subframe performs scheduling for the PUSCH in one subframe that is a predetermined number after the certain subframe.

The predetermined number can be an integer greater than or equal to zero. The predetermined number may be defined in advance or may be determined on the basis of physical layer signaling and/or RRC signaling. In the cross-subframe scheduling, consecutive subframes may be scheduled, or subframes having a predetermined period may be scheduled.

In the semi-persistent scheduling (SPS), one piece of DCI is used for performing resource allocation in one or more subframes. In a case where information regarding the SPS is set by the RRC signaling and the terminal device 100 detects the PDCCH or EPDCCH for enabling the SPS, the terminal device 100 enables processing regarding SPS and receives predetermined PDSCH and/or PUSCH on the basis of settings for the SPS.

In a case where the terminal device 100 detects the PDCCH or EPDCCH for releasing the SPS when the SPS is valid, the terminal device 100 releases (disables) the SPS and stops receiving the predetermined PDSCH and/or PUSCH. The release of the SPS may be performed on the basis of a case where a predetermined condition is satisfied. For example, in a case where a predetermined number of idle transmission data is received, the SPS is released. The idle transmission of data for releasing the SPS corresponds to MAC protocol data unit (PDU) including a zero MAC service data unit (SDU).

The information regarding the SPS by RRC signaling includes information regarding a scheduled period (interval) of the SPS C-RNTI that is the RNTI of the SPS, and the PDSCH, information regarding a scheduled period (interval) of the PUSCH, information regarding settings for release the SPS, and/or a HARQ process number in the SPS. The SPS is supported only for primary cells and/or primary secondary cells.

(Details of LTE Downlink Resource Element Mapping)

Figure 31:
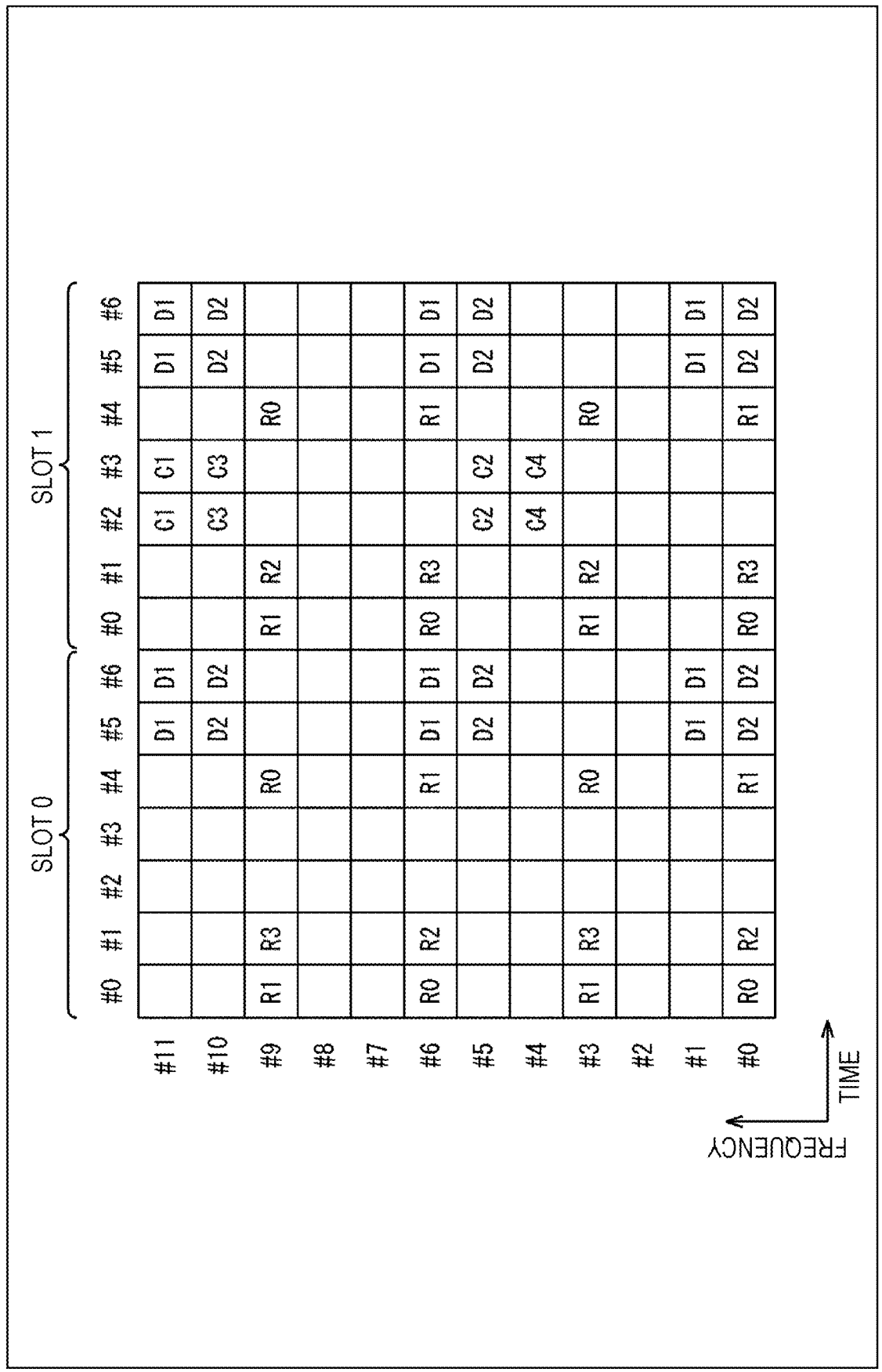
FIG. 31 is a diagram illustrating an example of LTE downlink resource element mapping according to the embodiment of the present technology.

FIG. 31 is a diagram illustrating an example of LTE downlink resource element mapping according to the embodiment of the present technology.

This example illustrates a set of resource elements in one resource block pair in a case where the number of OFDM symbols in one resource block and one slot is seven. Furthermore, the first seven OFDM symbols in the time direction in the resource block pair are called slot 0 (first slot). The latter seven OFDM symbols in the time direction in the resource block pair are also called slot (second slot).

Furthermore, the OFDM symbols in each slot (resource block) are represented by OFDM symbol numbers 0 to 6, respectively. Furthermore, subcarriers in the frequency direction in the resource block pair are represented by subcarrier numbers 0 to 11, respectively. Note that, in a case where the system bandwidth is configured by a plurality of resource blocks, the subcarrier numbers are allocated to be different over the system bandwidth.

For example, in a case where the system bandwidth is configured by six resource blocks, subcarriers to which subcarrier numbers 0 to 71 are allocated are used. Note that, in the description of the embodiment of the present technology, a resource element (k, l) is a resource element represented by a subcarrier number k and an OFDM symbol number 1.

Resource elements denoted by R0 to R3 indicate cell-specific reference signals of the antenna ports 0 to 3, respectively. Hereinafter, the cell-specific reference signals of the antenna ports 0 to 3 are also called cell-specific RSs (CRSS). In this example, the CRS has four antenna ports, but the number of the antenna ports can be changed. For example, the CRS can use one antenna port or two antenna ports. Furthermore, the CRS can be shifted in the frequency direction on the basis of the cell ID. For example, the CRS can be shifted in the frequency direction on the basis of a remainder obtained by dividing the cell ID by six.

Resource elements denoted by C1 to C4 indicate transmission path state measurement reference signals (CSI-RSs) of the antenna ports 15 to 22. The resource elements denoted by C1 and C2 indicate CSI-RSs of the CDM groups 1 to 4, respectively. The CSI-RS includes an orthogonal sequence (orthogonal code) using a Walsh code and a scramble code using a pseudo-random sequence. Furthermore, the CSI-RSs are code-division multiplexed in the CDM group by orthogonal codes such as Walsh codes. Furthermore, the CSI-RSs are frequency-division multiplexed (FDM) between CDM groups.

The CSI-RSs of antenna ports 15 and 16 are mapped to C1. The CSI-RSs of antenna ports 17 and 18 are mapped to C2. The CSI-RSs of antenna ports 19 and 20 are mapped to C3. The CSI-RSs of antenna ports 21 and 22 are mapped to C4.

A plurality of antenna ports is defined for the CSI-RS. The CSI-RS can be set as a reference signal corresponding to eight antenna ports 15 to 22. Furthermore, the CSI-RS can be set as a reference signal corresponding to four antenna ports 15 to 18. Furthermore, the CSI-RS can be set as a reference signal corresponding to two antenna ports 15 and 16.

Furthermore, the CSI-RS can be set as a reference signal corresponding to one antenna port 15. The CSI-RS can be mapped to some subframes, and can be mapped to every plurality of subframes, for example. A plurality of mapping patterns for CSI-RS resource elements is defined. Furthermore, the base station device 200 can set a plurality of CSI-RSs for the terminal device 100.

The CSI-RS can reduce transmission power to zero. A CSI-RS with the transmission power of zero is also called zero power CSI-RS. The zero power CSI-RS is set independently of the CSI-RSs of the antenna ports 15 to 22. Note that the CSI-RSs of the antenna ports 15 to 22 are also called non-zero power CSI-RSs.

The base station device 200 sets the CSI-RS as control information unique to the terminal device 100 through the RRC signaling. In the terminal device 100, the CSI-RS is set by the base station device 200 through the RRC signaling. Furthermore, in the terminal device 100, a CSI-IM resource that is a resource for measuring interference power can be set. The terminal device 100 generates feedback information, using the CRS, CSI-RS, and/or CSI-IM resource on the basis of the settings by the base station device 200.

The resource elements denoted by D1 and D2 indicate DL-DMRSs of the CDM groups 1 and 2, respectively. The DL-DMRS is configured using an orthogonal sequence (orthogonal code) using a Walsh code and a scramble sequence using a pseudo-random sequence. Furthermore, the DL-DMRS is independent for each antenna port and can be multiplexed in each resource block pair. The DL-DMRSs are orthogonal to each other between antenna ports by CDM and/or FDM.

The DL-DMRSs are code-division multiplexed (CDM) by respective orthogonal codes in a CDM group. The DL-DMRSs are mutually frequency-division multiplexed (FDM) between CDM groups. The DL-DMRSs in the same CDM group are mapped to the same resource element. In the DL-DMRS in the same CDM group, different orthogonal sequences are used between antenna ports, and the orthogonal sequences are orthogonal to each other.

For the DL-DMRS for PDSCH, some or all of the eight antenna ports (antenna ports 7 to 14) can be used. That is, the PDSCH associated with the DL-DMRS can perform MIMO transmission up to eight ranks. For the DL-DMRS for EPDCCH, some or all of the four antenna ports (antenna ports 107 to 110) can be used. Furthermore, the DL-DMRS can change the spreading code length of the CDM and the number of resource elements to be mapped according to the rank number of the associated channel.

The DL-DMRS for PDSCH transmitted via the antenna ports 7, 8, 11, and 13 is mapped to the resource element denoted by D1. The DL-DMRS for PDSCH transmitted via the antenna ports 9, 10, 12, and 14 is mapped to resource element denoted by D2. Furthermore, the DL-DMRS for EPDCCH transmitted via the antenna ports 107 and 108 is mapped to the resource element denoted by D1. The DL-DMRS for EPDCCH transmitted via the antenna ports 109 and 110 is mapped to the resource element denoted by D2.

(Details of Downlink Resource Element Mapping of NR)

Figure 32:
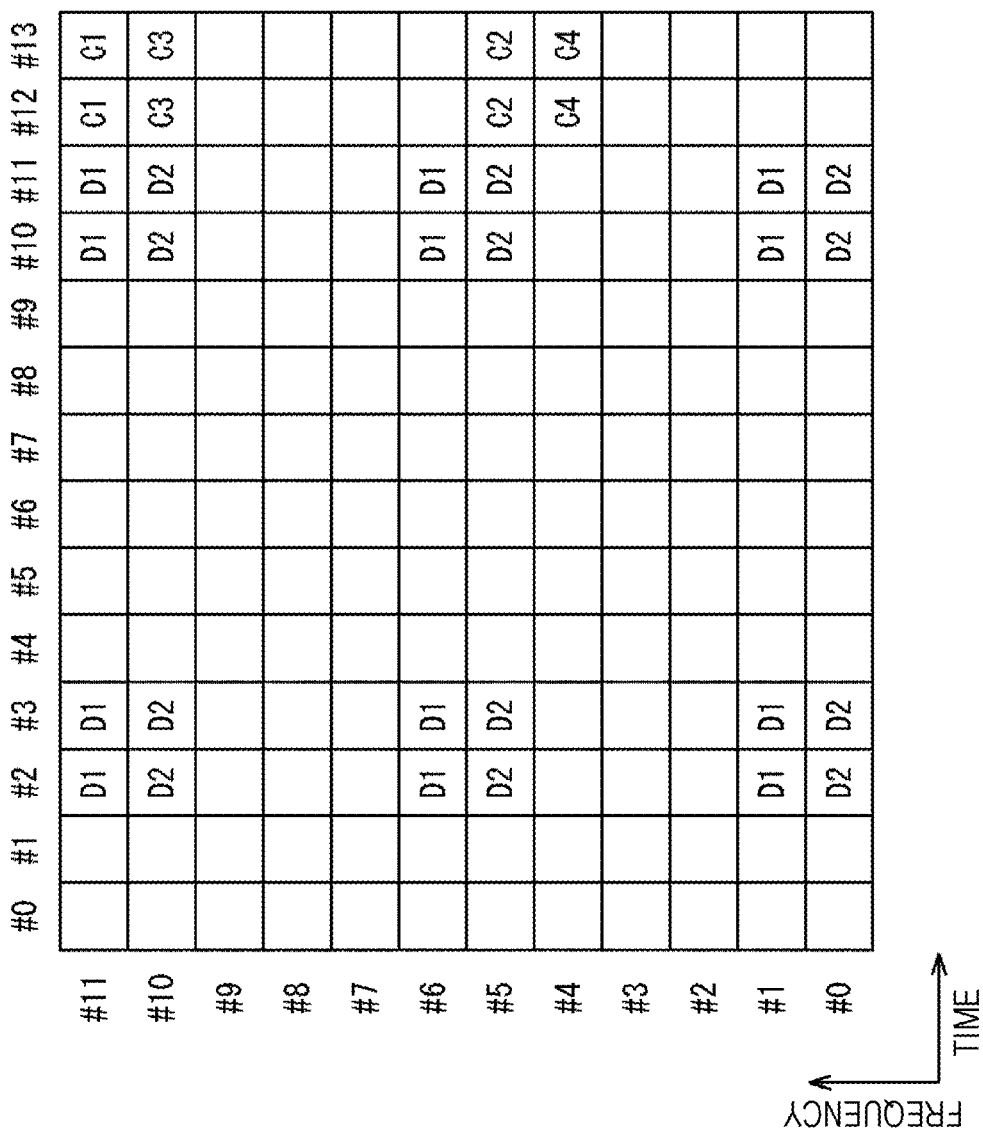
FIG. 32 is a diagram illustrating an example of NR downlink resource element mapping according to the embodiment of the present technology.

FIG. 32 is a diagram illustrating an example of NR downlink resource element mapping according to the embodiment of the present technology.

FIG. 32 illustrates a set of resource elements in a predetermined resource in a case of using the parameter set 0. The predetermined resource illustrated in FIG. 32 is a resource having the same time length and frequency bandwidth as one resource block pair in the LTE.

In the NR, the predetermined resource is also called NR resource block (NR-RB). The predetermined resource can be used as a unit of NR-PDSCH or NR-PDCCH allocation, a unit for defining mapping of a predetermined channel or a predetermined signal to a resource element, a unit in which a parameter set is set, or the like.

In the example in FIG. 32, the predetermined resource includes fourteen OFDM symbols represented by the OFDM symbol numbers 0 to 13 in the time direction and twelve subcarriers represented by the subcarrier numbers 0 to 11 in the frequency direction. In a case where the system bandwidth is configured by a plurality of predetermined resources, the subcarrier numbers are allocated over the system bandwidth.

Resource elements denoted by C1 to C4 indicate transmission path state measurement reference signals (CSI-RSs) of the antenna ports 15 to 22. The resource elements denoted by D1 and D2 indicate DL-DMRSs of the CDM groups 1 and 2, respectively.

(Details of Downlink Resource Element Mapping of NR)

Figure 33:
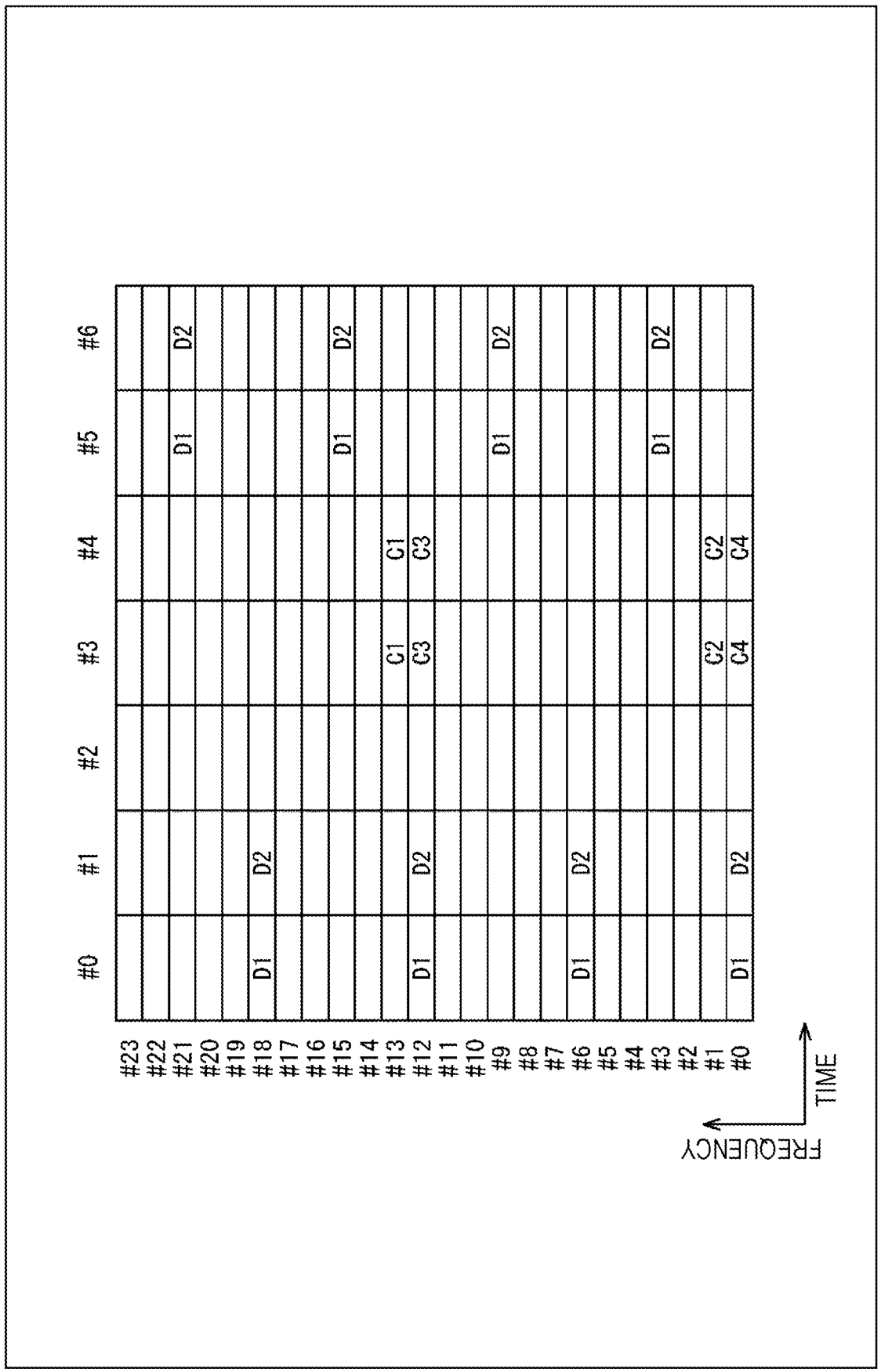
FIG. 33 is a diagram illustrating an example of NR downlink resource element mapping according to the embodiment of the present technology.

FIG. 33 is a diagram illustrating an example of NR downlink resource element mapping according to the embodiment of the present technology.

FIG. 33 illustrates a set of resource elements in a predetermined resource in a case of using the parameter set 1. The predetermined resource illustrated in FIG. 33 is a resource having the same time length and frequency bandwidth as one resource block pair in the LTE.

In the example in FIG. 33, the predetermined resource includes seven OFDM symbols represented by the OFDM symbol numbers 0 to 6 in the time direction and twenty-four subcarriers represented by the subcarrier numbers 0 to 23 in the frequency direction. In a case where the system bandwidth is configured by a plurality of predetermined resources, the subcarrier numbers are allocated over the system bandwidth.

Resource elements denoted by C1 to C4 indicate transmission path state measurement reference signals (CSI-RSs) of the antenna ports 15 to 22. The resource elements denoted by D1 and D2 indicate DL-DMRSs of the CDM groups 1 and 2, respectively.

(Details of Downlink Resource Element Mapping of NR)

Figure 34:
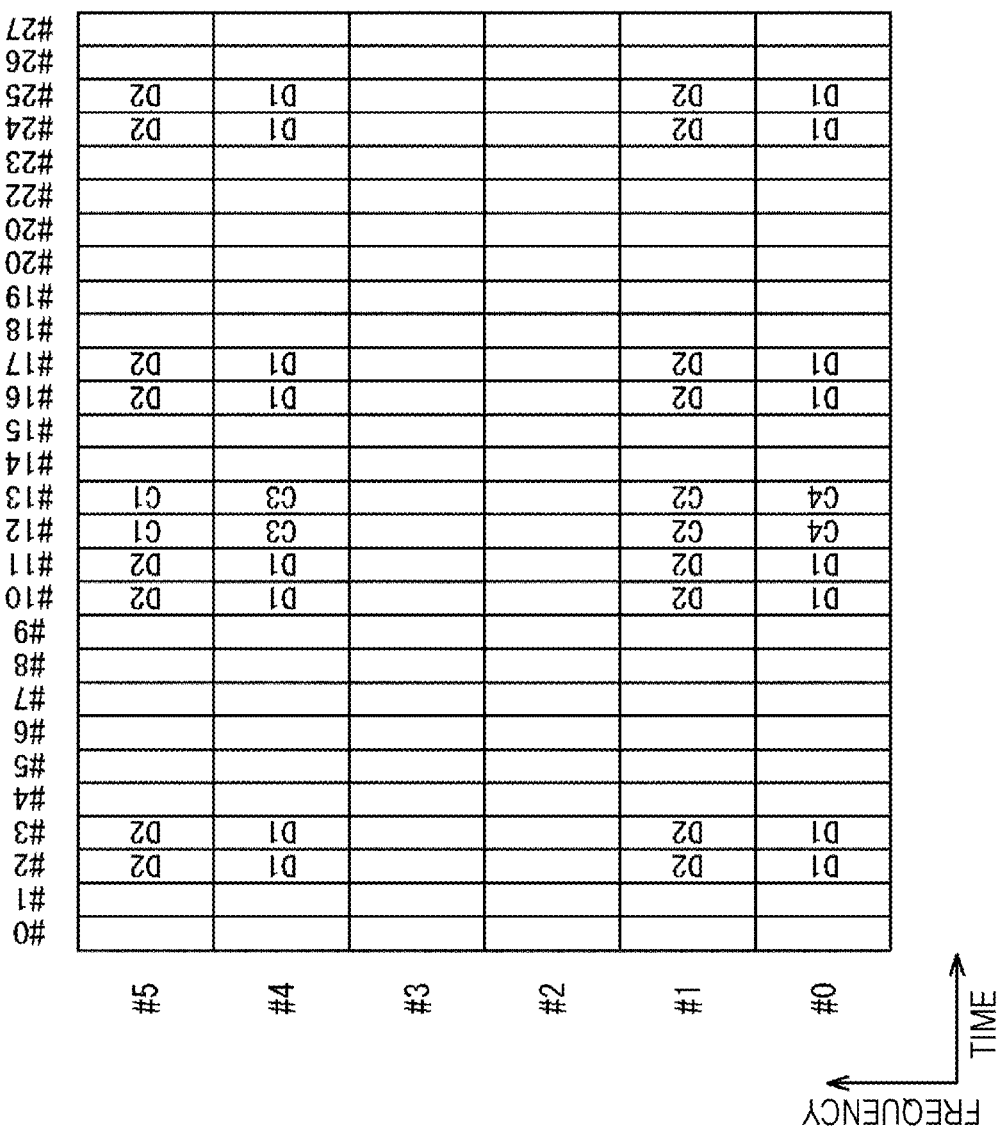
FIG. 34 is a diagram illustrating an example of NR downlink resource element mapping according to the embodiment of the present technology.

FIG. 34 is a diagram illustrating an example of NR downlink resource element mapping according to the embodiment of the present technology.

FIG. 34 illustrates a set of resource elements in a predetermined resource in a case of using the parameter set 1. The predetermined resource illustrated in FIG. 34 is a resource having the same time length and frequency bandwidth as one resource block pair in the LTE.

In the example in FIG. 34, the predetermined resource includes twenty-eight OFDM symbols represented by the OFDM symbol numbers 0 to 27 in the time direction and six subcarriers represented by the subcarrier numbers 0 to 6 in the frequency direction. In a case where the system bandwidth is configured by a plurality of predetermined resources, the subcarrier numbers are allocated over the system bandwidth.

Resource elements denoted by C1 to C4 indicate transmission path state measurement reference signals (CSI-RSs) of the antenna ports 15 to 22. The resource elements denoted by D1 and D2 indicate DL-DMRSs of the CDM groups 1 and 2, respectively.

(Introduction of Radio Resource Gap for Physical Sidelink Channel)

To perform communication between terminals (D2D: Device-to-Device, SL: Sidelink, ProSe: Proximity Services) in a cellular mobile communication system, it is necessary to secure resources for a physical sidelink channel from physical radio resources (typically, the frequency resources and time resources, moreover, space, codes, power, interleave, and the like) included in the cellular mobile communication system.

Examples of physical resources of the cellular mobile communication system include the uplink radio resources and downlink radio resources. These may be prepared with different frequency resources in the FDD system or may be prepared with different time resources in the TDD system, for example.

A case of setting a sidelink channel in the uplink radio resources of the cellular mobile communication system (or in a form where the uplink radio resources partially overlap), a case of setting a sidelink channel in the downlink radio resources of the cellular mobile communication system (or in a form where the downlink radio resources partially overlap), and a case of setting a sidelink channel in the radio resources of unlicensed bands are assumed.

Here, as the unlicensed bands, for example, industrial, scientific and medical (ISM) bands such as 900 MHz frequency band, 2.4 GHz frequency band, 5 GHz frequency band, and 60 GHz frequency band, a dedicated short range communications (DSRC) frequency band, a frequency band for TV white spaces (TVWS), a frequency band for licensed shared access (LSA), a frequency band for federal spectrum access system (SAS), and the like can be included.

In a case of setting a sidelink channel in the uplink radio resources, there is a possibility that the sidelink channel and the sidelink signal transmitted/received between the terminal devices 100 reach the base station device 200 that receives the uplink channel, and there is a possibility that the sidelink channel and the sidelink signal interference with the uplink channel and the uplink signal. In a case where the received power of the sidelink channel and the sidelink signal in the base station is excessively large even if the sidelink channel and the sidelink signal do not directly interfere with the uplink channel and the uplink signal, an effective dynamic range of reception performance of the base station device 200 is reduced, and the reception performance of the uplink channel and the uplink signal is deteriorated.

As a method of avoiding such interference and deterioration, transmission power control equivalent to transmission power of the uplink channel and the uplink signal is applied to the sidelink channel and the sidelink signal, whereby the received power of the channels and signals in the base station device 200 can be made substantially equal.

Meanwhile, in a case of setting a sidelink channel in the downlink radio resources, there is a possibility that the sidelink channel and the sidelink signal transmitted/received between the terminal devices 100 reach the base station device 200 that receives the downlink channel, and there is a possibility that the sidelink channel and the sidelink signal interfere and deteriorate the downlink channel and the downlink signal, as in the previous example.

It is very difficult to avoid such interference and degradation using the same transmission power control as in the previous example. For example, in a case where there is a plurality of terminal devices 100 that receives the downlink channel and the downlink signal, even if the transmission power control is performed with reference to the received power of a certain terminal device 100, the received power of another terminal device 100 may not become appropriate. As a result, the interference and deterioration occur.

Figure 35:
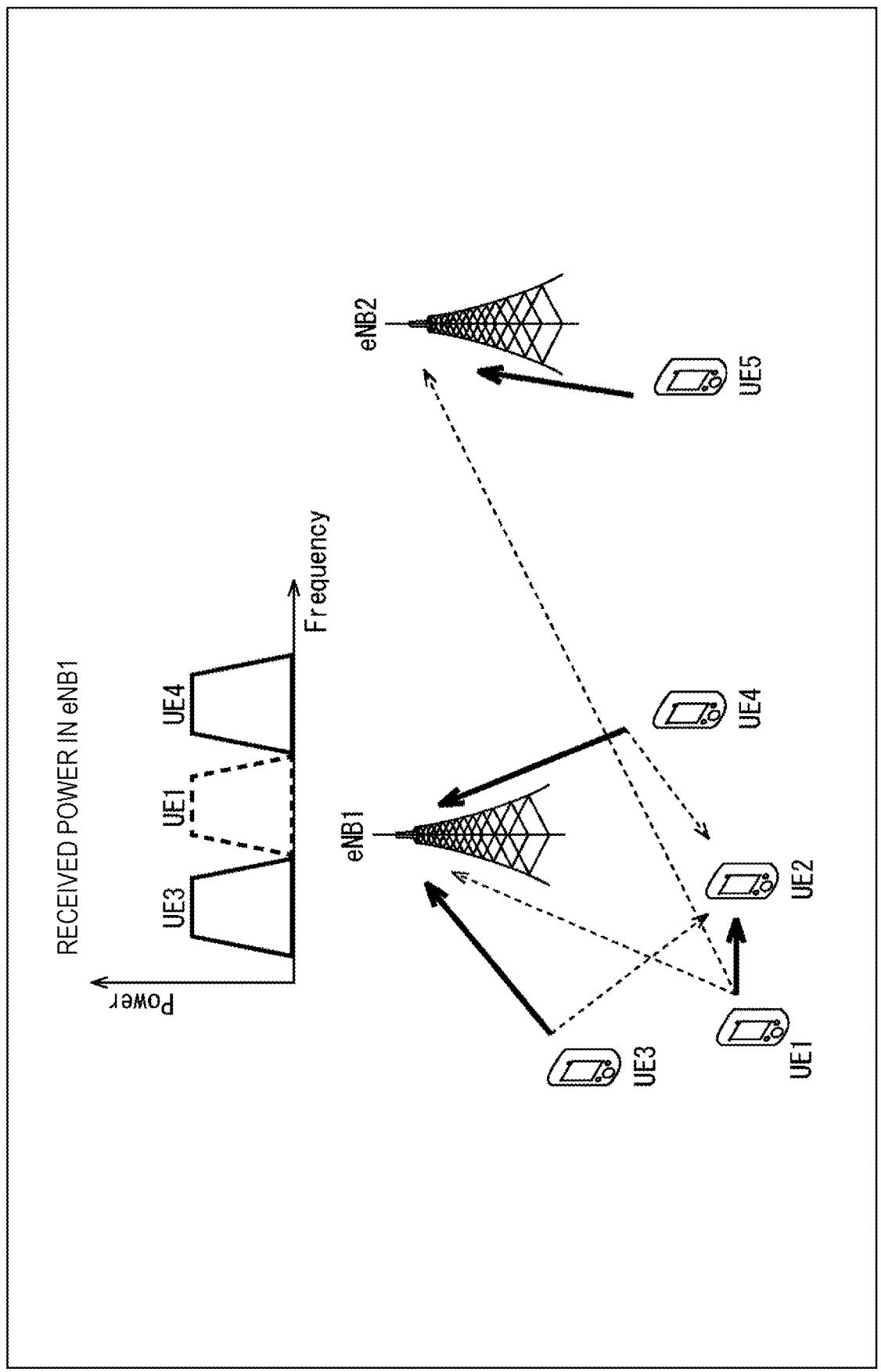
FIG. 35 is a diagram illustrating an example of received power of a reception signal in the base station device in a case of setting a sidelink channel in an uplink resource according to the embodiment of the present technology.

FIG. 35 is a diagram illustrating an example of received power of a reception signal in the base station device 200 in a case of setting a sidelink channel in uplink resources according to the embodiment of the present technology.

As illustrated in FIG. 35, in the case of setting a sidelink in the uplink sources, it is not necessary to insert a radio resource gap (for example, a frequency resource gap (gap carrier) or a time resource gap) between the uplink channel and the sidelink channel because the terminal device 100 is basically synchronized with the base station device 200 in time and frequency. That is, the case of using all the uplink sources as the uplink channel and the case of using part of the uplink resources as the sidelink channel are same for a transmission device.

Figure 36:
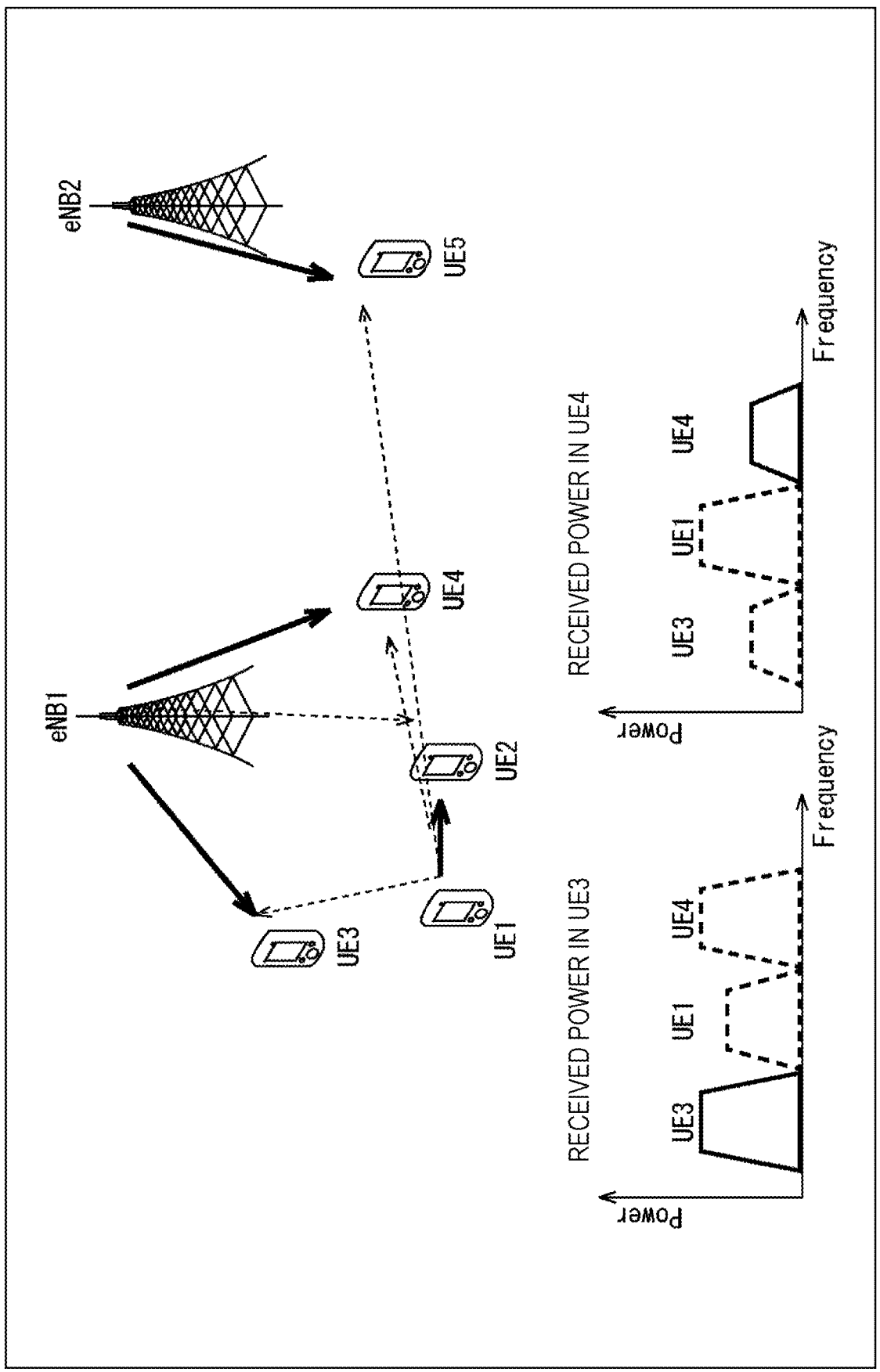
FIG. 36 is a diagram illustrating an example of received power of a reception signal in the base station device in a case of setting a sidelink channel in a downlink resource according to the embodiment of the present technology.

Note that FIG. 36 illustrates an example of received power of a reception signal in the base station device 200 in a case of setting a sidelink channel in downlink resources according to the embodiment of the present technology.

Figure 37:
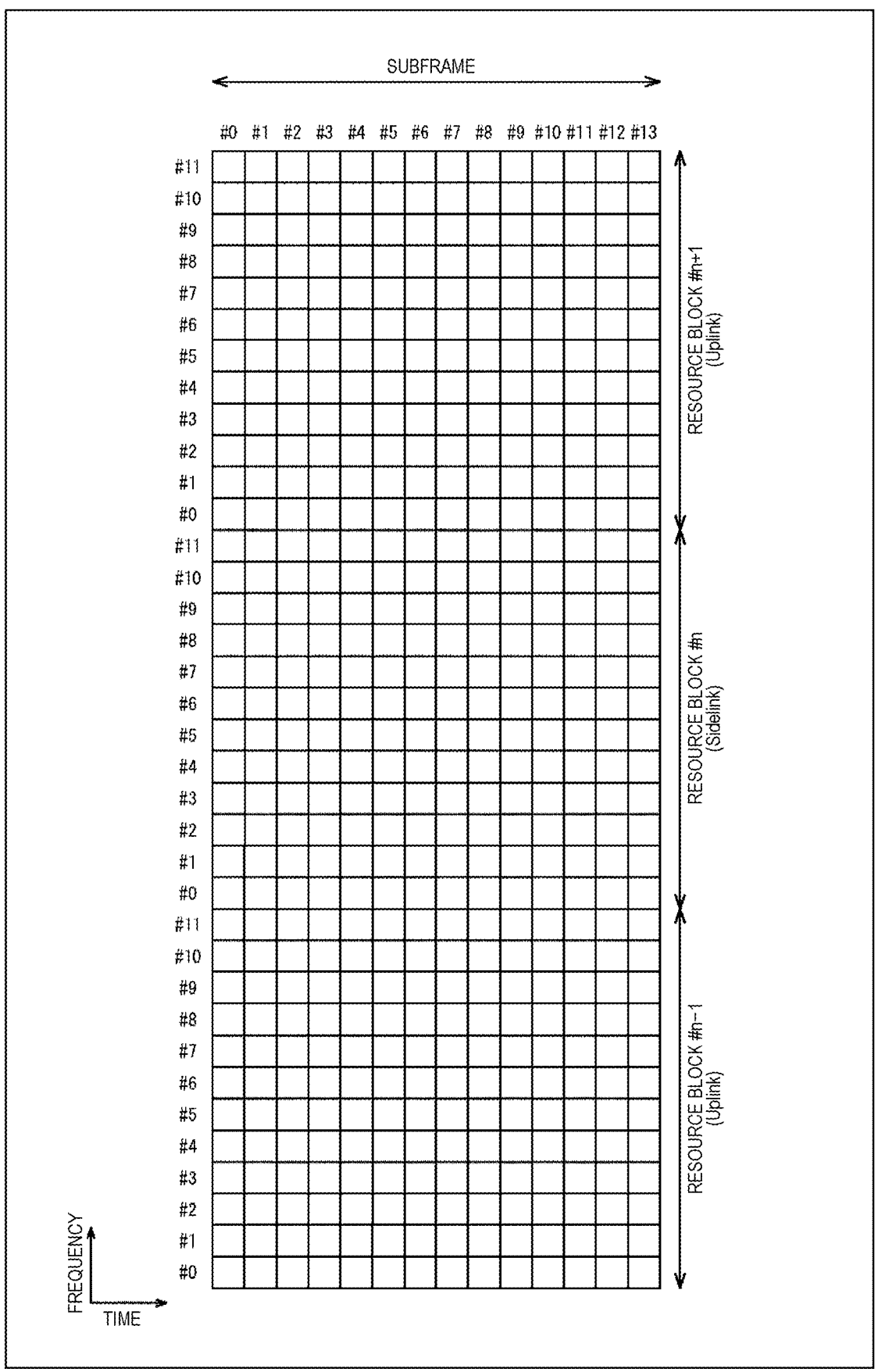
FIG. 37 is a diagram illustrating an example of frequency-time resource allocation in a case of setting a sidelink channel in an uplink resource according to the embodiment of the present technology.

FIG. 37 is a diagram illustrating an example of frequency-time resource allocation in a case of setting a sidelink channel in uplink resources according to the embodiment of the present technology.

As illustrated in FIG. 37, in a case of setting an uplink channel, a sidelink channel, and an uplink channel for resource blocks continuous in the frequency direction, it is not necessary to insert the radio resource gap even at a boundary where different channels (here, the uplink channel and the sidelink channel) are set.

In a case of setting a sidelink channel with the radio resources of unlicensed bands, operation is performed on the basis of listen-before-talk (LBT), carrier sense, and carrier sense multiple access (CSMA). Therefore, unlike the previous case of using the uplink and downlink radio resources, a certain terminal device 100 transmits a signal over a frequency channel (component carrier).

Therefore, the uplink channel and the sidelink channel, or the downlink channel and the sidelink channel are not set in resource blocks adjacent in the frequency direction. Therefore, in a certain time resource, it can be said that there is a one-to-one relationship between the transmission device and the reception device over the frequency channel.

To avoid or reduce the interference of the sidelink channel with the uplink channel, the downlink channel, and another sidelink channel, a radio resource gap is provided. As the radio resource gap, there are gap carriers to be introduced for the frequency resources (a gap frequency, a band gap, a gap subcarrier, a null band, a null carrier, a null subcarrier, and the like), and gap symbols to be introduced for the time resources (a gap section, a band section, a null section, a null symbol, and the like).

The gap carriers and the gap symbols correspond to a case where power allocated to the corresponding frequency resource and time resource is zero, that is, a case where no signal can be allocated. Furthermore, as another example, a case in which the power is allocated to the corresponding frequency resource and time resource, but the power is lower than other frequency resources and time resources also corresponds.

In the case of introducing a gap carrier into a sidelink channel, the introduction point is desirably an end in the frequency direction of a block of a predetermined frequency resource (for example, a resource block). This is to avoid or reduce the interference with other uplink channels, downlink channels, and sidelink channels that may be adjacent in the frequency direction.

Furthermore, the bandwidth of the gap carrier is desirably an integral multiple of a base subcarrier interval (subcarrier spacing). This is because, for example, in a case where a resource block is configured to be an integral multiple of the base subcarrier interval, the frequency resources other than the gap carrier can be used without waste as sidelink channels.

Furthermore, as another example of introducing a gap carrier into a sidelink channel, consider a case where a plurality of resource blocks that are continuous in the frequency direction is associated with a sidelink channel of the same terminal device 100. In this case, as one example of introducing a gap carrier, gap carriers can be introduced at both ends for each resource block.

Figure 38:
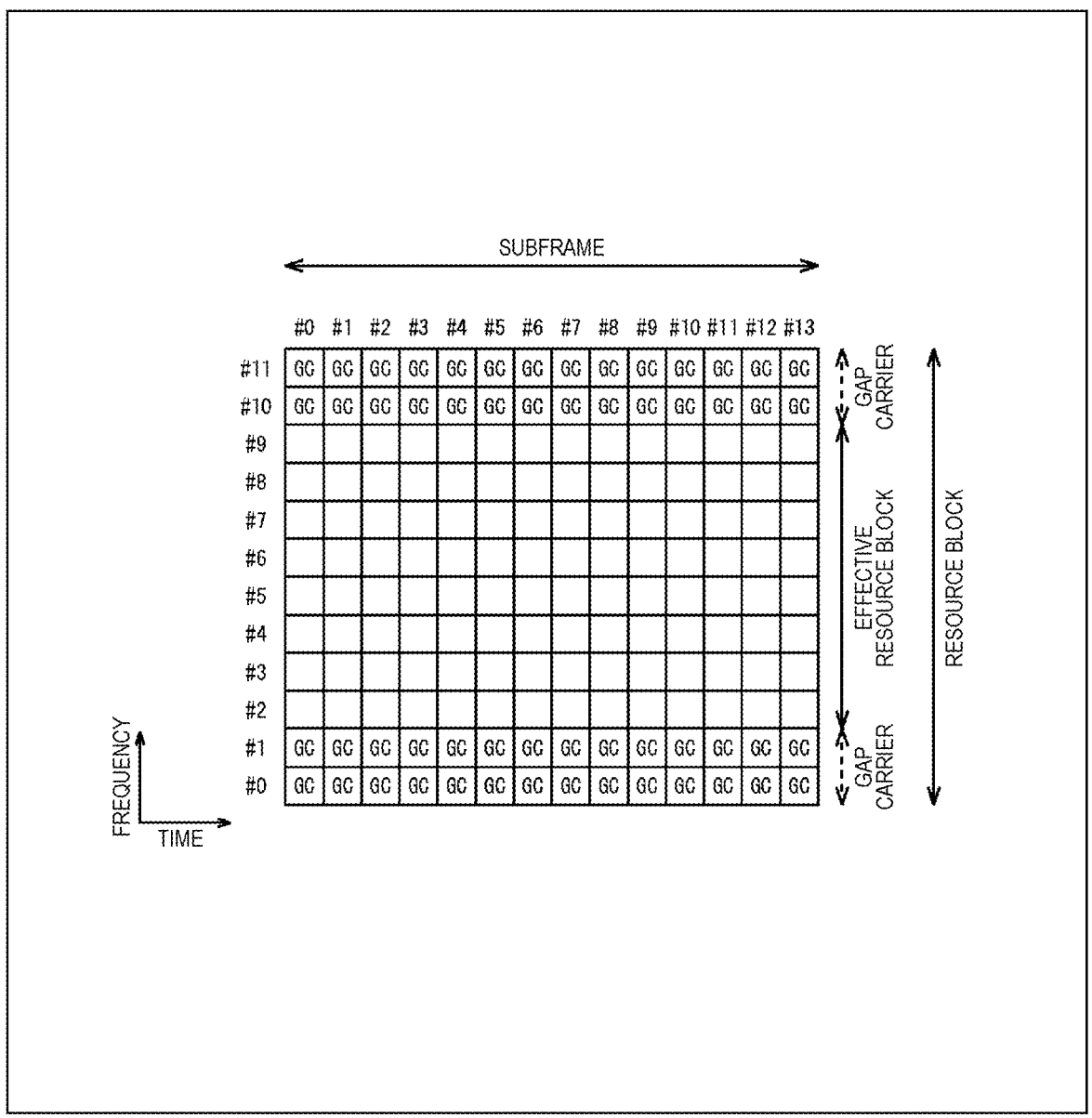
FIG. 38 is a diagram illustrating an example of introducing a gap carrier at an end of a predetermined frequency resource unit according to the embodiment of the present technology.

FIG. 38 is a diagram illustrating an example of introducing a gap carrier at an end of a predetermined frequency resource unit according to the embodiment of the present technology. In FIG. 38, for example, a gap carrier (GC) is arranged at an end of a frequency resource unit such as a resource block.

Furthermore, as another example, the number of gap carriers (bandwidth) can be reduced for a boundary resource portion of resource blocks that are continuous in the frequency direction.

Figure 39:
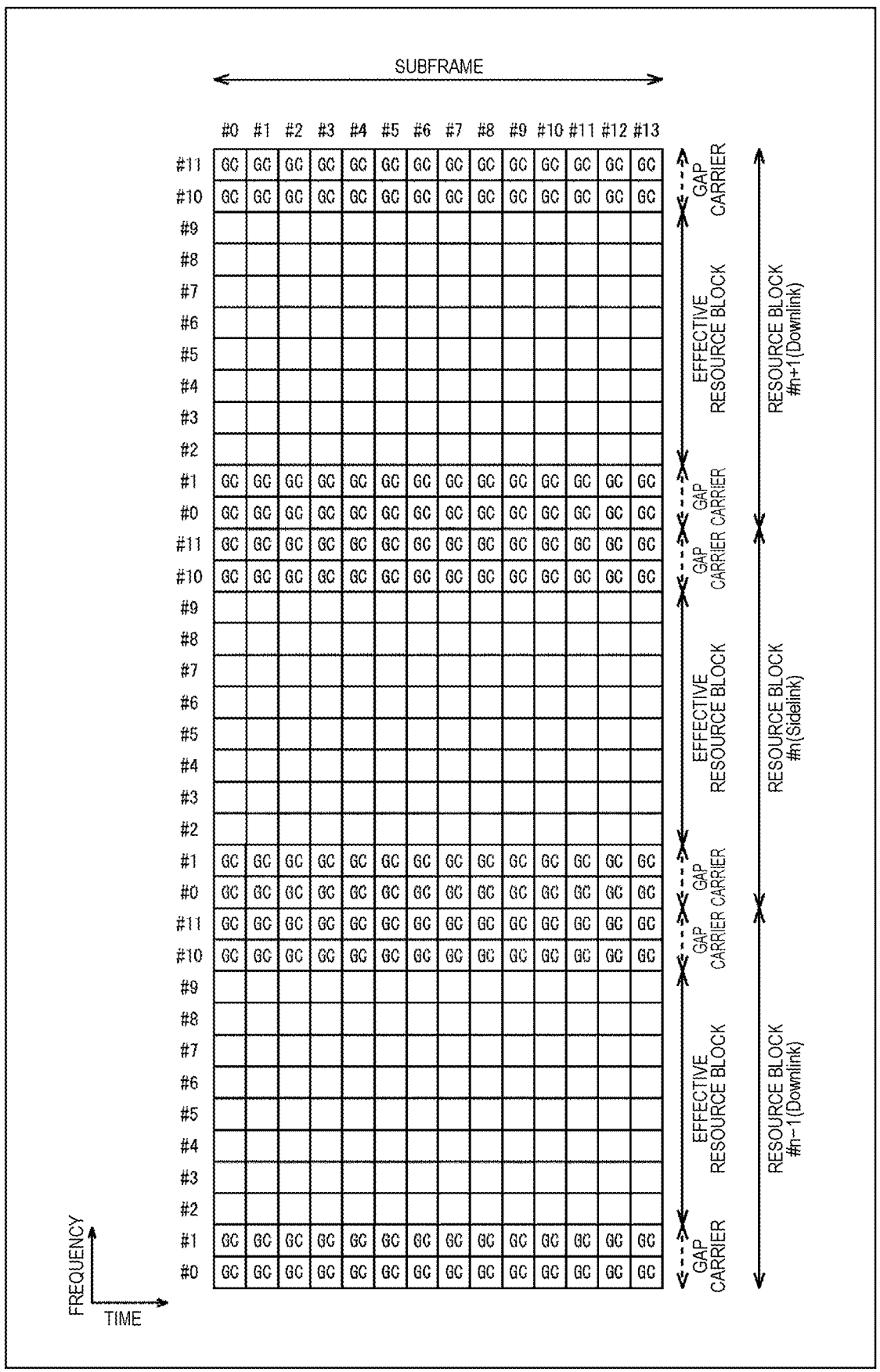
FIG. 39 is a diagram illustrating an example of frequency-time resource allocation in a case of setting a sidelink channel in a downlink resource according to the embodiment of the present technology.

FIG. 39 is a diagram illustrating an example of frequency-time resource allocation in a case of setting a sidelink channel in a downlink resource according to the embodiment of the present technology. In FIG. 39, in a case of setting a sidelink channel in the downlink resources, a radio resource gap is inserted between the downlink and the sidelink.

Moreover, in the case of reducing the number of gap carriers (bandwidth) for a boundary resource portion of resource blocks that are continuous in the frequency direction, the value can be made zero. This is because, in a case where consecutive resource blocks are associated with the same terminal device 100, interference does not easily occur between the corresponding resource blocks.

Figure 40:
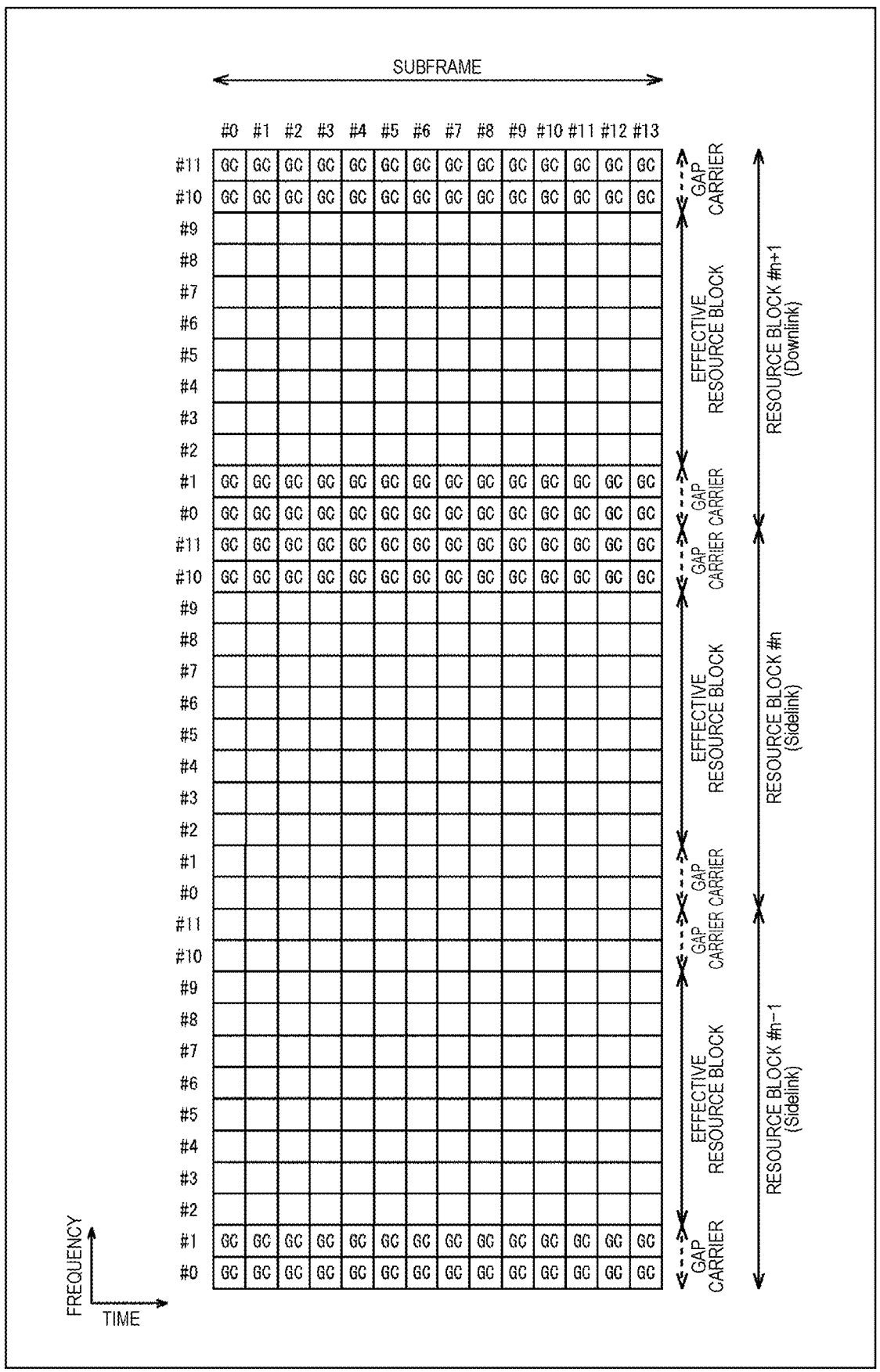
FIG. 40 is a diagram illustrating an example of frequency-time resource allocation in a case of setting resource blocks that are continuous in a frequency direction as sidelink channels according to the embodiment of the present technology.

FIG. 40 is a diagram illustrating an example of frequency-time resource allocation in a case of setting resource blocks that are continuous in a frequency direction as sidelink channels according to the embodiment of the present technology. In FIG. 40, in a case where the resource blocks continuous in the frequency direction are set for sidelink channels and associated with the same terminal, the gap carrier (GC) is zero at the boundary part continuous in the frequency direction.

Figure 41:
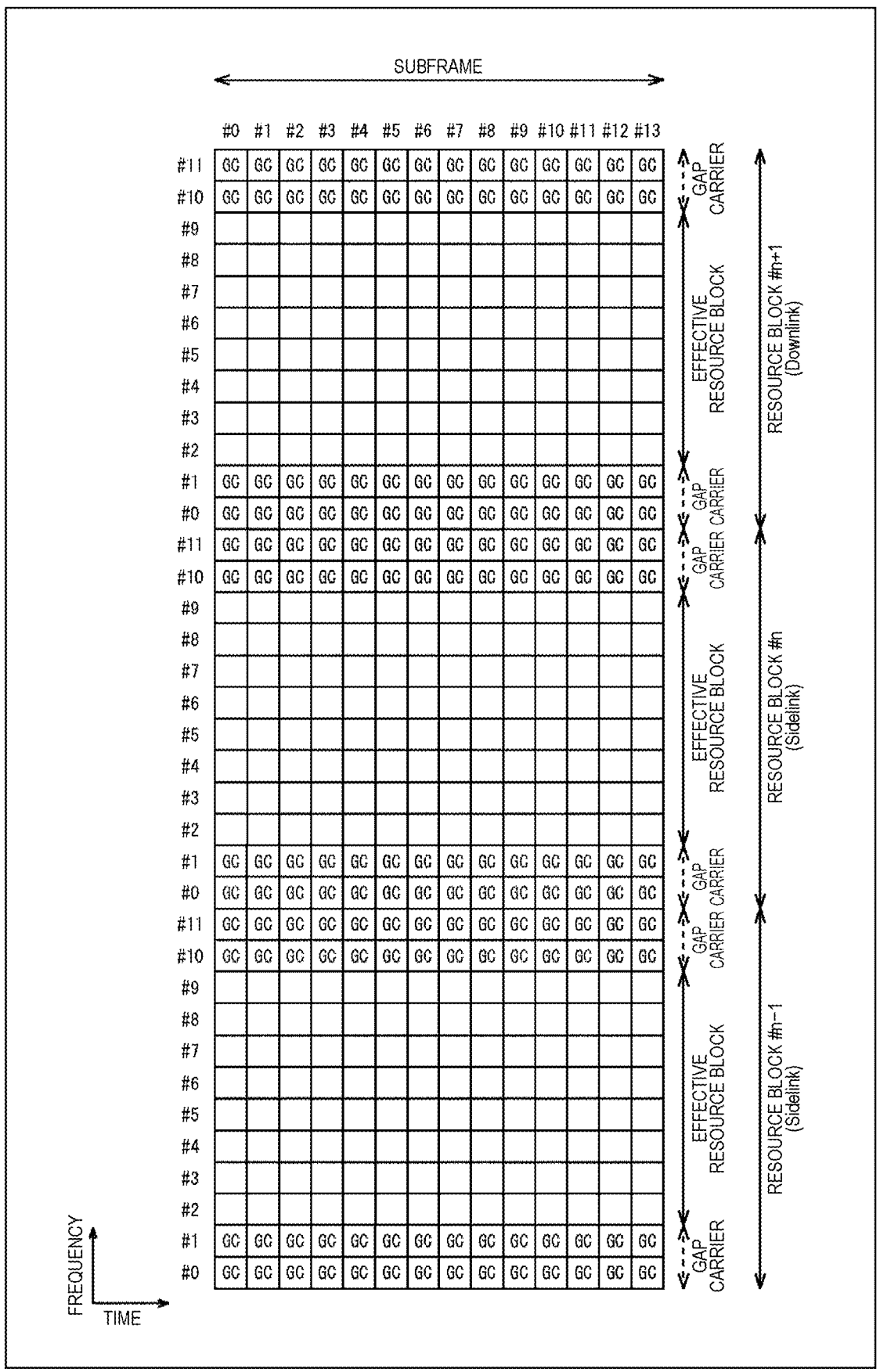
FIG. 41 is a diagram illustrating an example of frequency-time resource allocation in a case of setting resource blocks that are continuous in a frequency direction as sidelink channels according to the embodiment of the present technology.

Furthermore, even in the case where the sidelink channels are set to resource blocks that are continuous in the frequency direction, the radio resource gap is inserted at the boundary in a case where the continuous sidelink channels are associated with different terminal devices 100. FIG. 41 illustrates an example.

In FIG. 41, resource blocks #n−1 and #n are set as sidelinks. Here, the difference from FIG. 40 is that the sideink of the resource block #n−1 and the sidelink of the resource block #n are associated with different terminal devices 100, respectively. Since the terminal devices 100 may not be synchronized with each other with respect to transmission for the downlink resources, there is a possibility that the resistance to the interference due to synchronization offset can be increased by inserting the radio resource gap (gap carrier) in the case of using the downlink resources as sidelinks.

Regarding the value of the number of gap carriers (bandwidth), a predetermined value can be set (preconfigured, predetermined, or predefined) in advance, and can be introduced in association with the sidelink channel and Implicit. That is, when transmitting and receiving the sidelink channel, the terminal device 100 performs transmission and reception on the assumption that there is a gap carrier having a predetermined value.

Figure 42:
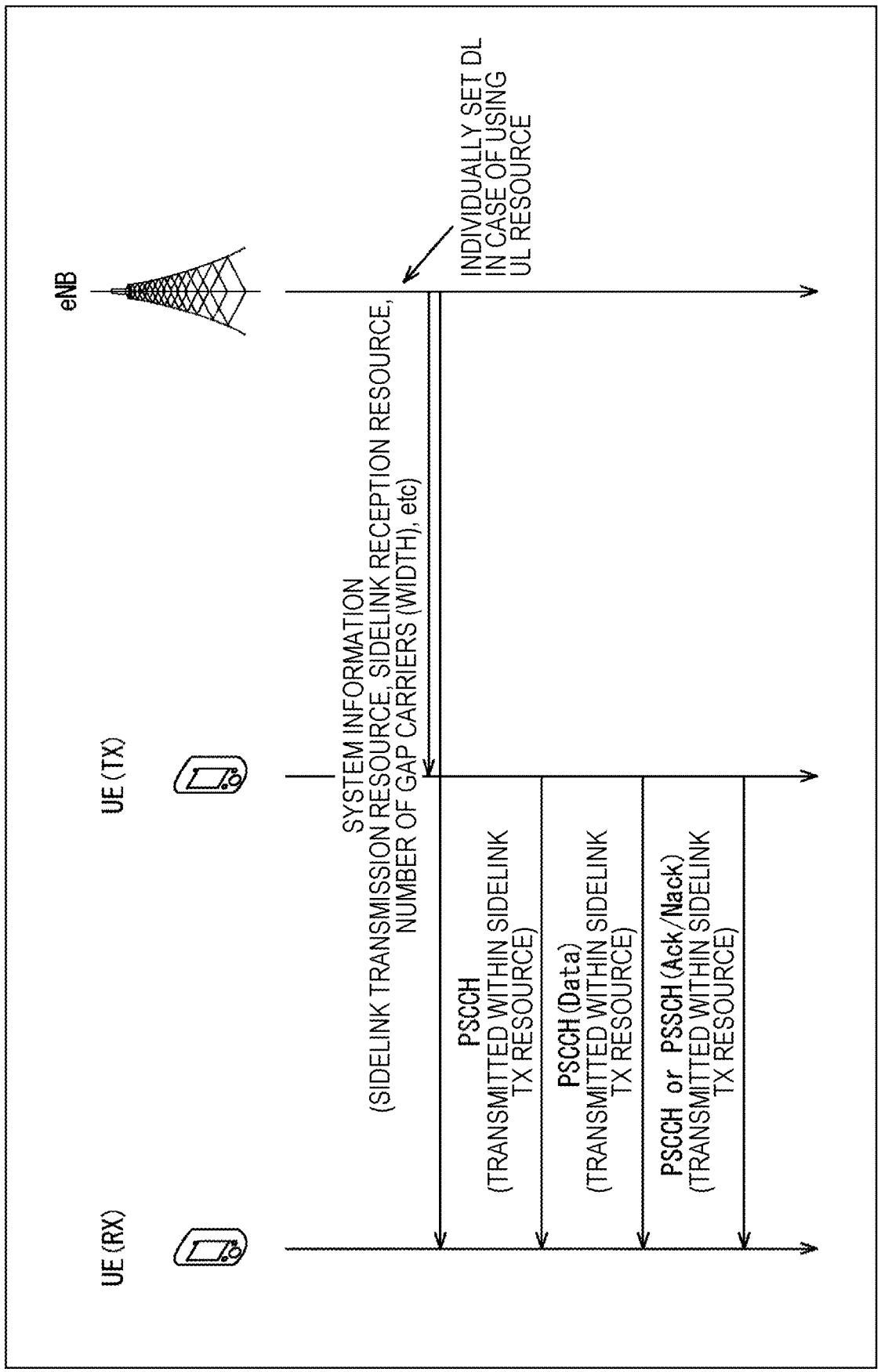
FIG. 42 is a diagram illustrating an example of a procedure for setting a resource and a gap area for a sidelink according to the embodiment of the present technology.

As another example of the value of the number of gap carriers (bandwidth), the value can be set and introduced to explicit by the base station device 200 that provides a cell of an area (in-coverage or in-network-coverage) where the terminal device 100 is present, as illustrated in FIG. 42.

In this case, the value can be given in notification and set as system information, using the downlink channel, from the base station device 200 to the terminal device 100.

For the value of the number of gap carriers (bandwidth), the sidelink channel set in the uplink resources, the sidelink channel set in the downlink resources, and the sidelink channel set in the unlicensed band resources can be independently set and introduced.

In this case, the value of the number of gap carriers (bandwidth) to be introduced into the sidelink channel set in the downlink resources is desirably equal to or larger than the value of the number of gap carriers (bandwidth) to be introduced into the sidelink channel set in the uplink resources. As described above, in the case of setting a sidelink channel in the downlink resource, avoidance or reduction of interference and deterioration is relatively difficult.

Regarding the radio resource gap, a gap in the time direction is also introduced in addition to a gap in the frequency direction (gap carrier).

Figure 43:
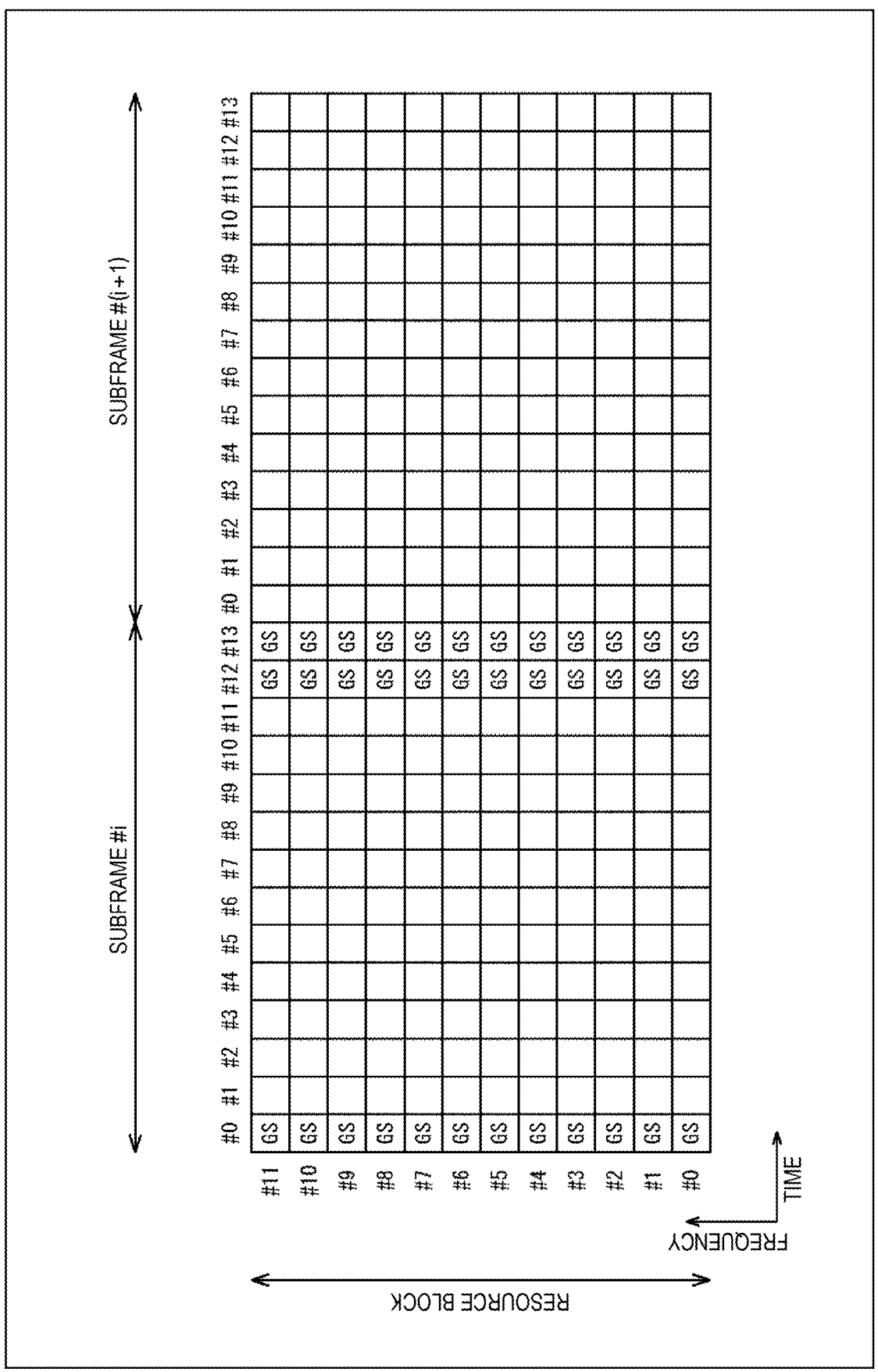
FIG. 43 is a diagram illustrating an example of insertion of a radio resource gap in a time direction in a sidelink channel according to the embodiment of the present technology.

As a gap in the time direction, a gap symbol (GS) for inserting a gap (a null symbol or a zero symbol) in symbol units is introduced for each subframe (or TTI). FIG. 43 illustrates an example of insertion of gap symbols.

The gap symbols are inserted before and after a subframe (or TTI). The number of gap symbols may be set to be different. For example, since interference of the sidelink channel with a rear channel (subframe or TTI) is a more important problem, the number of rear gap symbols may be set to be equal to or larger than the number of front gap symbols.

Furthermore, since interference of the sidelink channel with a temporally earlier sidelink channel (subframe or TTI) is less likely to occur, the number of front gap symbols may be set to zero. Furthermore, in a case where temporally continuous subframes (or TTIs) are associated with the same terminal device 100 and are set as sidelink channels, the gap symbol can be zero at the boundaries of the continuous subframes (or TTIs).

In a case where the temporally continuous subframes (or TTIs) are associated with different terminal devices 100, the value of the gap symbol is set to be larger than zero at the boundaries of the continuous subframes (or TTIs). In a case where the sidelink channel and the uplink channel, or the sidelink channel and the downlink channel are temporally continuous, insertion of the gap symbol is desirably inside a resource on the sidelink channel.

Regarding the value of the number of gap symbols, a predetermined value can be set (preconfigured, predetermined, or predefined) in advance, and can be introduced in association with the sidelink channel and Implicit. That is, when transmitting and receiving the sidelink channel, the terminal device 100 performs transmission and reception on the assumption that there is a gap symbol having a predetermined value.

As another example of the value of the number of gap symbols, the value can be set and introduced to explicit by the base station device 200 that provides a cell of an area (in-coverage or in-network-coverage) where the terminal device 100 is present. In this case, the value can be given in notification and set as system information, using the downlink channel, from the base station device 200 to the terminal device 100.

For the value of the number of gap symbols (bandwidth), the sidelink channel set in the uplink resources, the sidelink channel set in the downlink resources, and the sidelink channel set in the unlicensed band resources can be independently set and introduced.

In this case, the value of the number of gap symbols to be introduced into the sidelink channel set in the downlink resources is desirably equal to or larger than the value of the number of gap symbols to be introduced into the sidelink channel set in the uplink resources. As described above, in the case of setting a sidelink channel in the downlink resource, avoidance or reduction of interference and deterioration is relatively difficult.

Note that the gap in the frequency direction and the gap in the time direction may be introduced separately or at the same time.

<3. Configuration of Computer>

Figure 44:
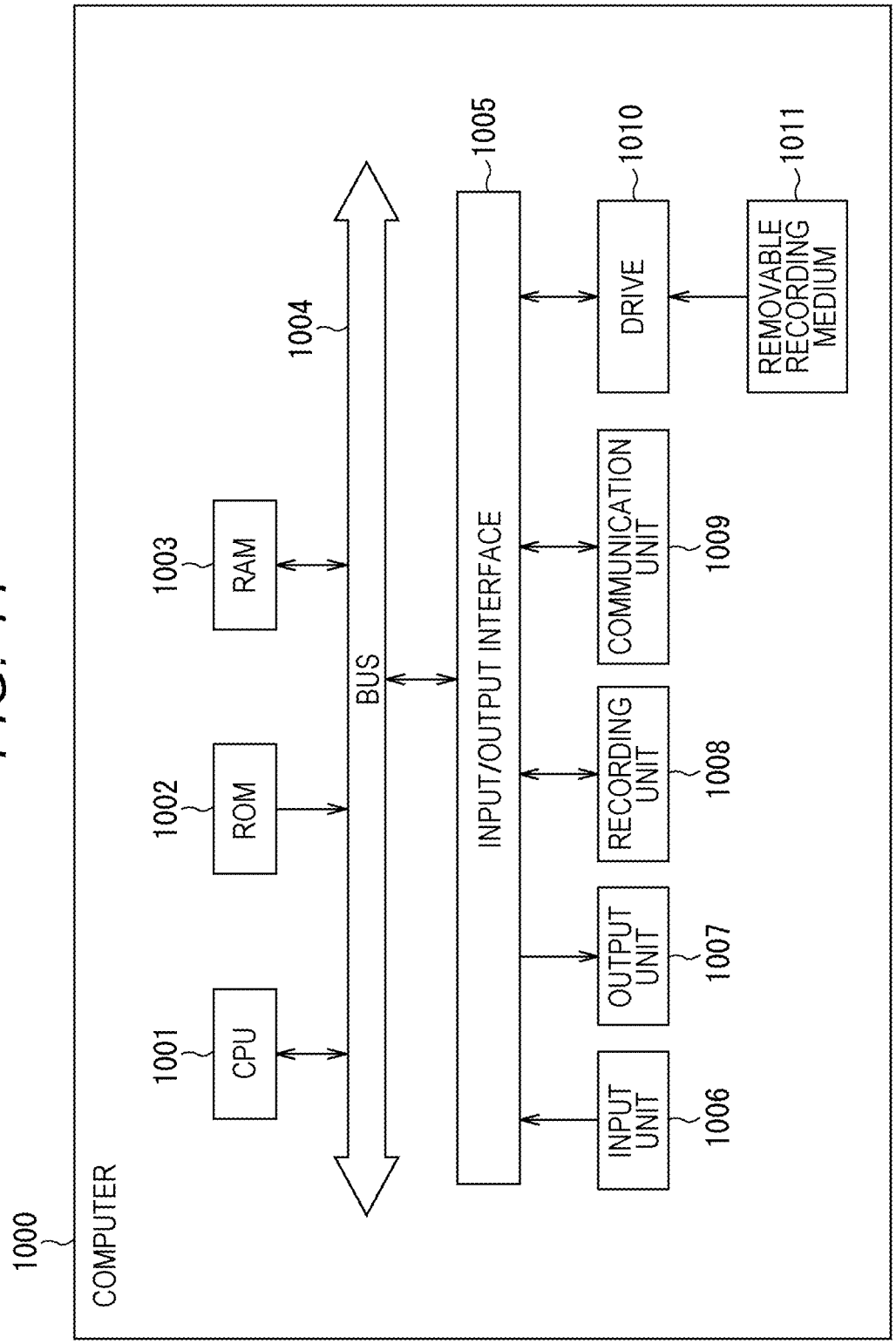
FIG. 44 is a diagram illustrating a configuration example of a computer.

The series of processing described above can be executed by hardware or software. In the case of executing the series of processing by software, a program that configures the software is installed in a computer. FIG. 44 is a diagram illustrating a configuration example of hardware of the computer that executes the above-described series of processing by a program.

In a computer 1000, a central processing unit (CPU) 1001, a read only memory (ROM) 1002, and a random access memory (RAM) 1003 are mutually connected by a bus 1004. Moreover, an input/output interface 1005 is connected to the bus 1004. An input unit 1006, an output unit 1007, a recording unit 1008, a communication unit 1009, and a drive 1010 are connected to the input/output interface 1005.

The input unit 1006 includes a keyboard, a mouse, a microphone, and the like. The output unit 1007 includes a display, a speaker, and the like. The recording unit 1008 includes a hard disk, a nonvolatile memory, and the like. The communication unit 1009 includes a network interface and the like. The drive 1010 drives a removable recording medium 1011 such as a magnetic disk, an optical disk, a magneto-optical disk, or a semiconductor memory.

In the computer 1000 configured as described above, the CPU 1001 loads the program recorded in the ROM 1002 or the recording unit 1008 to the RAM 1003 via the input/output interface 1005 and the bus 1004 and executes the program, so that the above-described series of processing is performed.

The program to be executed by the computer 1000 (CPU 1001) can be recorded on the removable recording medium 1011 as a package medium or the like, for example, and can be provided. Furthermore, the program can be provided via a wired or wireless transmission medium such as a local area network, the Internet, or digital satellite broadcasting.

In the computer 1000, the program can be installed to the recording unit 1008 via the input/output interface 1005 by attaching the removable recording medium 1011 to the drive 1010. Furthermore, the program can be received by the communication unit 1009 via a wired or wireless transmission medium and installed in the recording unit 1008. Other than the above method, the program can be installed in the ROM 1002 or the recording unit 1008 in advance.

Here, in the present specification, the processing performed by the computer in accordance with the program does not necessarily have to be performed in chronological order in accordance with the order described as the flowchart. In other words, the processing performed by the computer according to the program also includes processing executed in parallel or individually (for example, parallel processing or processing by an object). Furthermore, the program may be processed by one computer (processor) or distributed in and processed by a plurality of computers.

Note that embodiments of the present technology are not limited to the above-described embodiments, and various modifications can be made without departing from the gist of the present technology. For example, in the present technology, a configuration of cloud computing in which one function is shared and processed in cooperation by a plurality of devices via a network can be adopted.

Furthermore, the present technology can have the following configurations.

(1) A communication device including:

a control unit configured to control measurement of communication quality of a sidelink between the communication device and another communication device on the basis of information with which communication quality of wireless communication between the communication device and the another communication device is measurable.

(2)

The communication device according to (1), in which the control unit measures the communication quality of the sidelink on the basis of a radio wave propagation characteristic in the wireless communication between the communication device and the another communication device.

(3)

The communication device according to (1) or (2), further including:

a sensor configured to sense a surrounding environment at a time of measuring the communication quality of the sidelink.

(4)

The communication device according to any one of (1) to (3), in which the control unit controls the measurement of the communication quality of the sidelink on the basis of shared measurement information shared between the communication device and the another communication device.

(5)

The communication device according to (4), in which the shared measurement information includes information regarding a resource of wireless communication to be used at a time of measuring the communication quality of the sidelink.

(6)

The communication device according to (5), in which the shared measurement information includes at least one of a time resource or a frequency resource of the wireless communication.

(7)

The communication device according to (5) or (6), in which the control unit measures the communication quality of the sidelink by receiving a known reference signal transmitted from the another communication device, using the resource of wireless communication included in the shared measurement information.

(8)

The communication device according to (5) or (6), in which the control unit transmits a known reference signal, using the resource of wireless communication included in the shared measurement information.

(9)

The communication device according to any one of (5) to (8), in which the shared measurement information is given in notification from the another communication device or a base station device.

(10)

The communication device according to any one of (1) to (9), in which the control unit feeds back a measurement result of the communication quality of the sidelink.

(11)

The communication device according to (10), in which the control unit transmits the measurement result of the communication quality of the sidelink to a server device that collects the measurement result of the communication quality via a network.

(12)

The communication device according to (3), in which the sensor detects at least one piece of position information, motion information, image information, audio information, or weather information.

(13)

The communication device according to any one of (1) to (12), in which the communication device is built in or externally mounted to a vehicle, and the another communication device is built in or externally mounted to another vehicle.

(14)

A communication method including:

measuring communication quality of a sidelink between a first communication device and a second communication device on the basis of information with which communication quality of wireless communication between the first communication device and the second communication device is measurable; and collecting a measurement result of the measured communication quality of the sidelink.

(15)

A communication system including:

a first communication device;

a second communication device configured to measure communication quality of a sidelink between the first communication device and the second communication device on the basis of information with which communication quality of wireless communication between the first communication device and the second communication device is measurable; and a server device configured to collect a measurement result of the measured communication quality of the sidelink.

REFERENCE SIGNS LIST

10 Device layer
20 Core network
30 Network gateway
40 IP network
50 Service platform
60 Application server
100, 100A, 100B, 100V, 100U Terminal device
111 Central control unit
112 Vehicle unit
113 UI input unit
114 UI output unit
115 Application unit
116 Interface control unit
117 Wireless communication unit
118 Wired communication unit
142 Sensor
171 Communication control unit
200, 200A, 200B Base station device
350 OAM server
360 DB server
1000 Computer
1001 CPU

The invention claimed is:

1. A communication device comprising:

circuitry configured to control measurement report response in association with a sidelink between the communication device and another communication device based on measurement of surrounding environment of the communication device by a sensor, in addition to measurement information for communication quality of a link with a base station and communication quality of the sidelink with the other communication device, the sensor sensing the surrounding environment at a time of measuring the communication quality of the sidelink, and set a sidelink resource of the sidelink between the communication device and the other communication device, as a part of an uplink resource or a downlink resource, wherein a radio resource gap is inserted between a downlink channel and a sidelink channel corresponding to the sidelink, under a condition of setting the sidelink resource of the sidelink between the communication device and the other communication device as the part of the downlink resource.

2. The communication device according to claim 1, wherein the circuitry is configured to measure the communication quality of sidelink on a basis of a radio wave propagation characteristic in the wireless communication between the communication device and the other communication device.

3. The communication device according to claim 2, wherein the circuitry is configured to control the measurement report response in association with the sidelink on a basis of shared measurement information shared between the communication device and the other communication device.

4. The communication device according to claim 3, wherein the shared measurement information includes information regarding a resource of wireless communication to be used at a time of measuring the communication quality of the sidelink.

5. The communication device according to claim 4, wherein
the shared measurement information includes at least one of a time resource or a frequency resource of the wireless communication.

6. The communication device according to claim 4, wherein
the circuitry is configured to measure the communication quality of the sidelink by receiving a known reference signal transmitted from the other communication device, using the resource of wireless communication included in the shared measurement information.

7. The communication device according to claim 4, wherein
the circuitry is configured to transmit a known reference signal, using the resource of wireless communication included in the shared measurement information.

8. The communication device according to claim 4, wherein
the shared measurement information is given in notification from the other communication device or a base station device.

9. The communication device according to claim 1, wherein
the circuitry is configured to feed back a measurement result of the communication quality of the sidelink.

10. The communication device according to claim 9, wherein
the circuitry is configured to transmit the measurement result of the communication quality of the sidelink to a server device that collects the measurement result of the communication quality via a network.

11. The communication device according to claim 1, wherein
the sensor detects at least one piece of position information, motion information, image information, audio information, or weather information.

12. The communication device according to claim 1, wherein
the communication device is built in or externally mounted to a vehicle, and
the other communication device is built in or externally mounted to another vehicle.

13. The communication device according to claim 1, wherein
the radio resource gap is at least one of a frequency resource gap or a time resource gap.

14. The communication device according to claim 13, wherein
the frequency resource gap includes at least one of a gap frequency, a band gap, a gap subcarrier, a null band, a null carrier, and a null subcarrier.

15. The communication device according to claim 13, wherein
the time resource gap includes at least one of a gap section, a band section, a null section, a null symbol.

16. The communication device according to claim 1, wherein
the radio resource gap is inserted at an end in a frequency direction of a resource block of the sidelink.

17. A communication method comprising:
receiving measurement report response in association with a sidelink between a first communication device and a second communication device based on measurement of surrounding environment of the first communication device by a sensor, in addition to measurement information for communication quality of a link with a base station and communication quality of the sidelink between the first communication device and the second communication device, the sensor sensing the surrounding environment at a time of measuring the communication quality of the sidelink;
generating report message based on the measurement report response in association with the sidelink between the first communication device and the second communication device; and
setting a sidelink resource of the sidelink between the first communication device and the second communication device, as a part of an uplink resource or a downlink resource,
wherein a radio resource gap is inserted between a downlink channel and a sidelink channel corresponding to the sidelink, under a condition of setting the sidelink resource of the sidelink between the first communication device and the second communication device as the part of the downlink resource.

18. A communication system comprising:
a first communication device;
a second communication device configured to control measurement report response in association with a sidelink between the first communication device and the second communication device based on measurement of surrounding environment of the second communication device by a sensor, in addition to measurement information for communication quality of a link with a base station and communication quality of the sidelink between the first communication device and the second communication device, the sensor sensing the surrounding environment at a time of measuring the communication quality of the sidelink; and
a server device configured to generate report message based on the measurement report response in association with the sidelink and setting a sidelink resource of the sidelink between the first communication device and the second communication device, as a part of an uplink resource or a downlink resource,
wherein a radio resource gap is inserted between a downlink channel and a sidelink channel corresponding to the sidelink, under a condition of setting the sidelink resource of the sidelink between the first communication device and the second communication device as the part of the downlink resource.

* * * * *